US010332417B1

(12) United States Patent
Brown et al.

(10) Patent No.: US 10,332,417 B1
(45) Date of Patent: Jun. 25, 2019

(54) SYSTEM AND METHOD FOR ASSESSMENTS OF STUDENT DEFICIENCIES RELATIVE TO RULES-BASED SYSTEMS, INCLUDING BUT NOT LIMITED TO, ORTHO-PHONEMIC DIFFICULTIES TO ASSIST READING AND LITERACY SKILLS

(71) Applicant: Foundations in Learning, Inc., Iowa City, IA (US)

(72) Inventors: Carolyn J. Brown, Iowa City, IA (US); Gerald N. Zimmermann, Iowa City, IA (US)

(73) Assignee: Foundations in Learning, Inc., Iowa City, IA (US)

( * ) Notice: Subject to any disclaimer, the term of this patent is extended or adjusted under 35 U.S.C. 154(b) by 456 days.

(21) Appl. No.: 14/861,742

(22) Filed: Sep. 22, 2015

Related U.S. Application Data

(60) Provisional application No. 62/053,616, filed on Sep. 22, 2014.

(51) Int. Cl.
*G09B 7/00* (2006.01)
*G09B 17/00* (2006.01)
(Continued)

(52) U.S. Cl.
CPC .............. *G09B 19/00* (2013.01); *G09B 7/00* (2013.01); *G09B 17/003* (2013.01); *G09B 17/04* (2013.01)

(58) Field of Classification Search
CPC .......... G09B 17/04; G09B 19/00; G09B 7/00; G09B 17/003
See application file for complete search history.

(56) References Cited

U.S. PATENT DOCUMENTS 6,186,794 B1    2/2001  Brown et al.
6,206,700 B1    3/2001  Brown et al.
(Continued)

OTHER PUBLICATIONS

Apfelbaum, et. al., "Statistical Learing in Reading: Vaiability in Irrelevant Letters Helps Children Learn Phonics Skills", Developmental Psychology, Published Aug. 27, 2012, 10 pages.
(Continued)

*Primary Examiner* — Nathan Hillery
(74) *Attorney, Agent, or Firm* — McKee, Voorhees & Sease, PLC

(57) ABSTRACT

A method and tool to give a multi-dimensional profile of a student's individual difficulties regarding a rules-based system such as reading or literacy. A sub-set of rules of the rules-based system are selected. Tasks related to the rules are presented to the student via, for example, the internet. The tasks are varied according to at least a plurality of classifications of type of rule and a plurality of different task types. The sub-set of rules and number of classification and task types are limited to allow exposure of all tasks within a manageable assessment period. Data from student responses to the tasks, both accuracy and other attributes (e.g. word vs. non-word, speeded vs. non-speeded, and others) of responses, can be evaluated across tasks and classifications to give a quite specific picture or profile of the student's knowledge and skills regarding the rules-based system. This assists better and targeted intervention steps.

17 Claims, 60 Drawing Sheets

(51) Int. Cl.
*G09B 17/04* (2006.01)
*G09B 19/00* (2006.01)

(56) References Cited

U.S. PATENT DOCUMENTS

| | | | | |
|---|---|---|---|---|
| 2002/0001791 A1* | 1/2002 | Wasowicz | ................ | G09B 5/04 434/178 |
| 2002/0076677 A1* | 6/2002 | Wasowicz | ................ | G09B 5/04 434/178 |
| 2002/0164563 A1* | 11/2002 | Wasowicz | ................ | G09B 5/04 434/178 |
| 2004/0023191 A1 | 2/2004 | Brown et al. | | |
| 2004/0072131 A1* | 4/2004 | Wasowicz | ................ | G09B 5/04 434/178 |
| 2004/0115600 A1* | 6/2004 | Wasowicz | ................ | G09B 5/04 434/169 |
| 2004/0137412 A1* | 7/2004 | Wasowicz | ................ | G09B 5/04 434/178 |
| 2004/0175679 A1* | 9/2004 | Wasowicz | ................ | G09B 5/04 434/178 |
| 2005/0100875 A1* | 5/2005 | Best | ................ | G09B 7/02 434/362 |
| 2005/0106540 A1* | 5/2005 | Wasowicz | ................ | G09B 5/04 434/178 |
| 2006/0019227 A1* | 1/2006 | Hardwicke | ............ | G09B 19/00 434/262 |
| 2006/0127871 A1* | 6/2006 | Grayson | ................ | G09B 7/00 434/350 |
| 2006/0286533 A1* | 12/2006 | Hansen | ................ | G09B 7/00 434/323 |
| 2007/0172810 A1* | 7/2007 | McCallum | ............... | G09B 7/04 434/353 |
| 2008/0096171 A1* | 4/2008 | Movahhedi | ............ | G09B 19/00 434/178 |
| 2009/0068625 A1* | 3/2009 | Petro | ................ | G09B 1/00 434/160 |
| 2011/0117534 A1* | 5/2011 | Berger | ................ | G09B 7/02 434/350 |
| 2013/0224697 A1* | 8/2013 | McCallum | ......... | G06Q 30/0251 434/178 |
| 2014/0134591 A1* | 5/2014 | Berger | ................ | G09B 7/02 434/350 |

OTHER PUBLICATIONS

United States Patent and Trademark Office,"U.S. Appl. No. 13/026,048", filed Feb. 11, 2011.

* cited by examiner

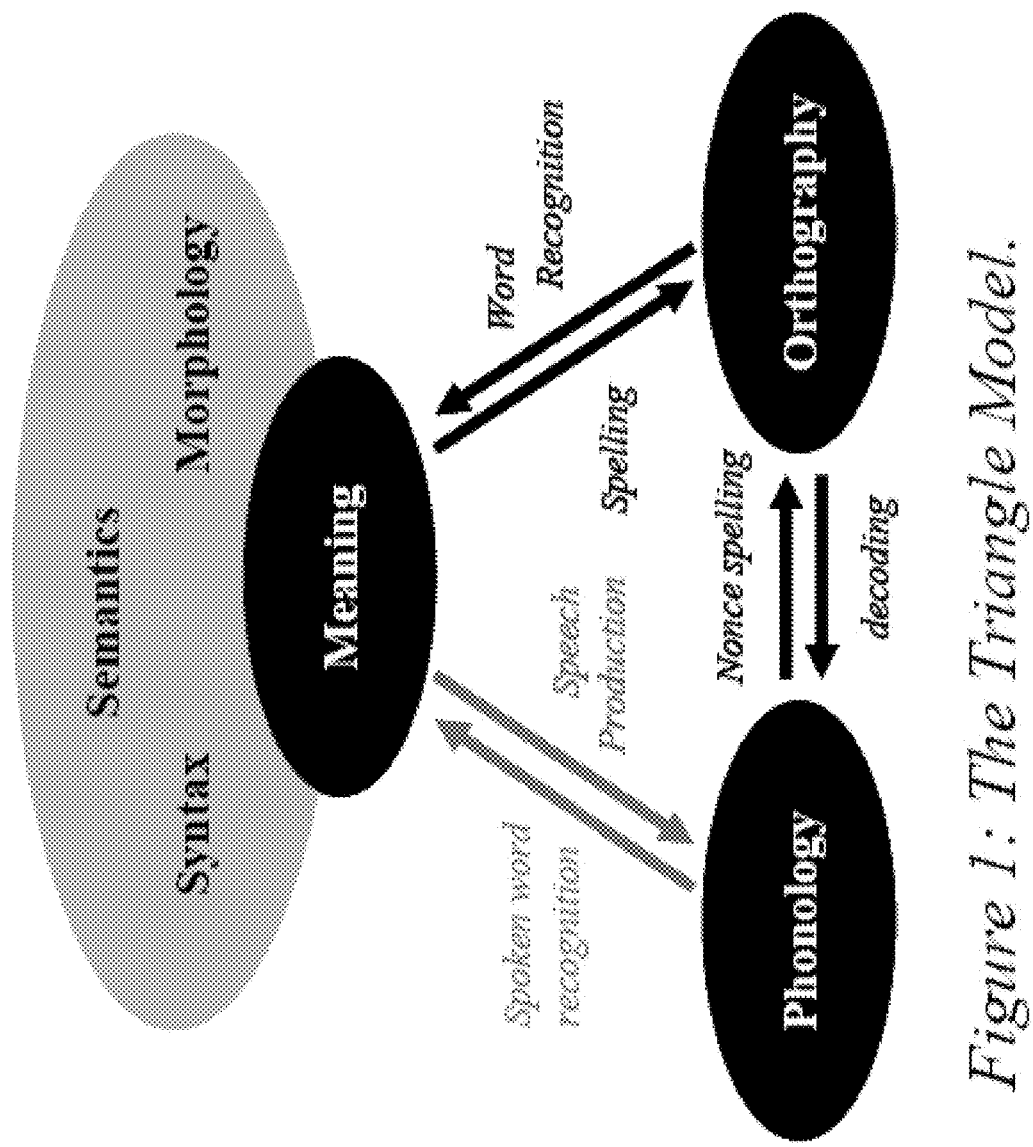
Figure 1: *The Triangle Model.*

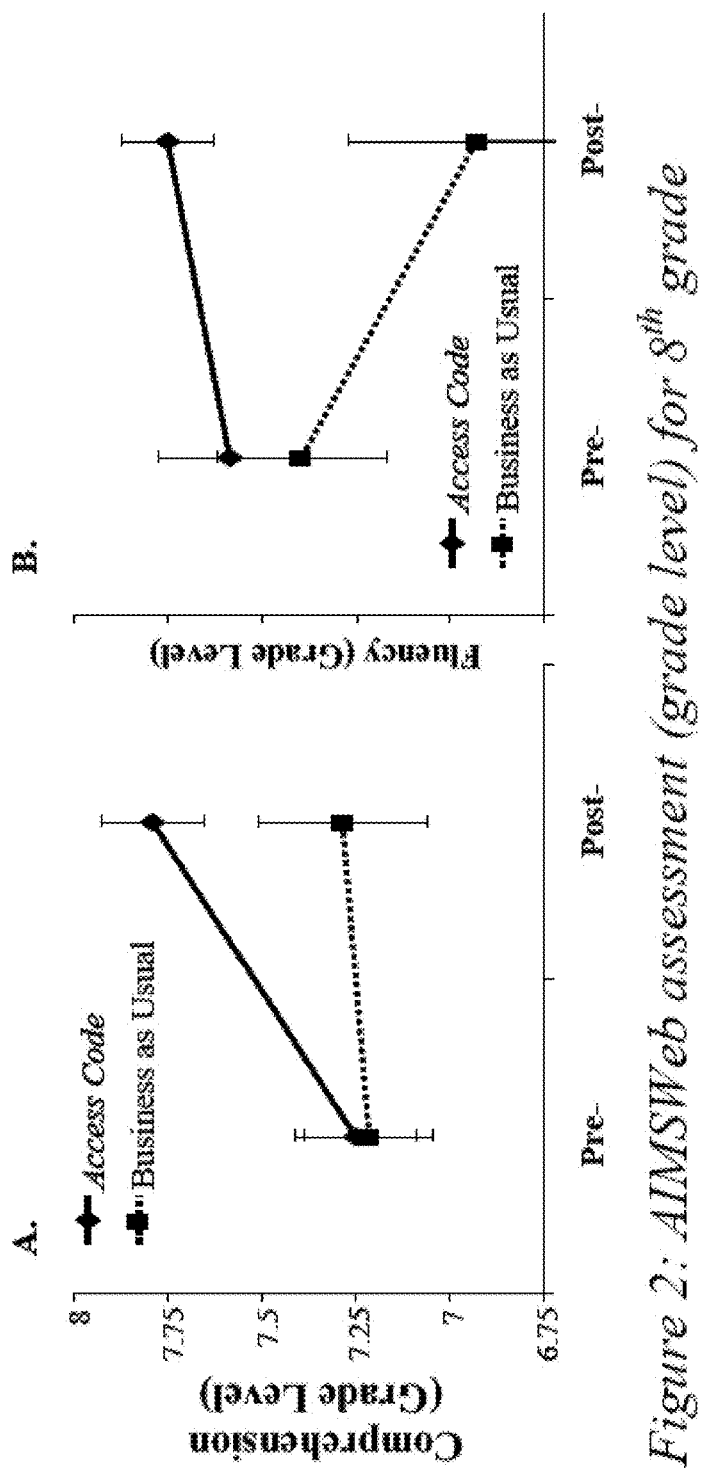
Figure 2: *AIMSWeb assessment (grade level) for 8th grade students treated with Access Code or Business as Usual.*

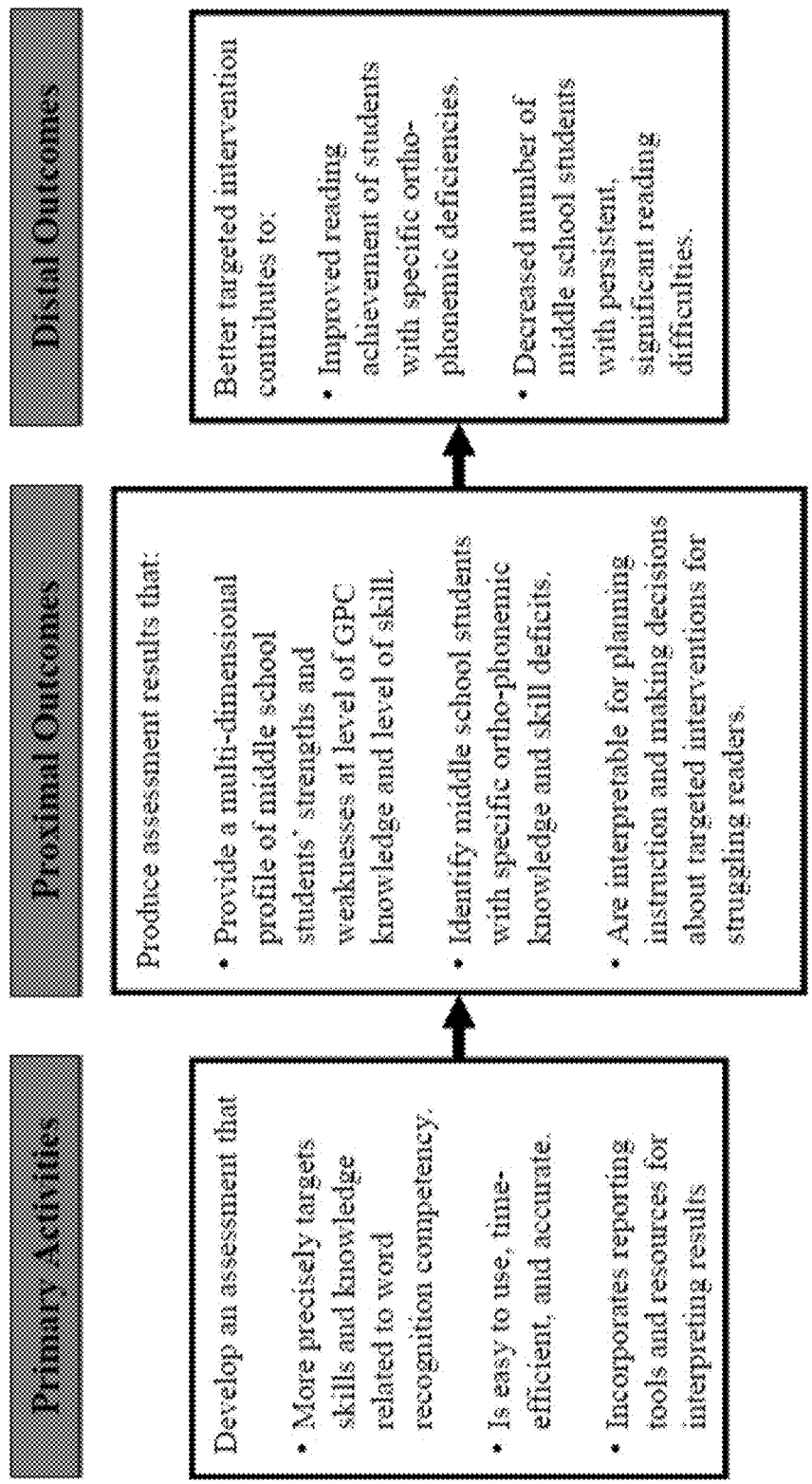
Figure 3: Theory of change.

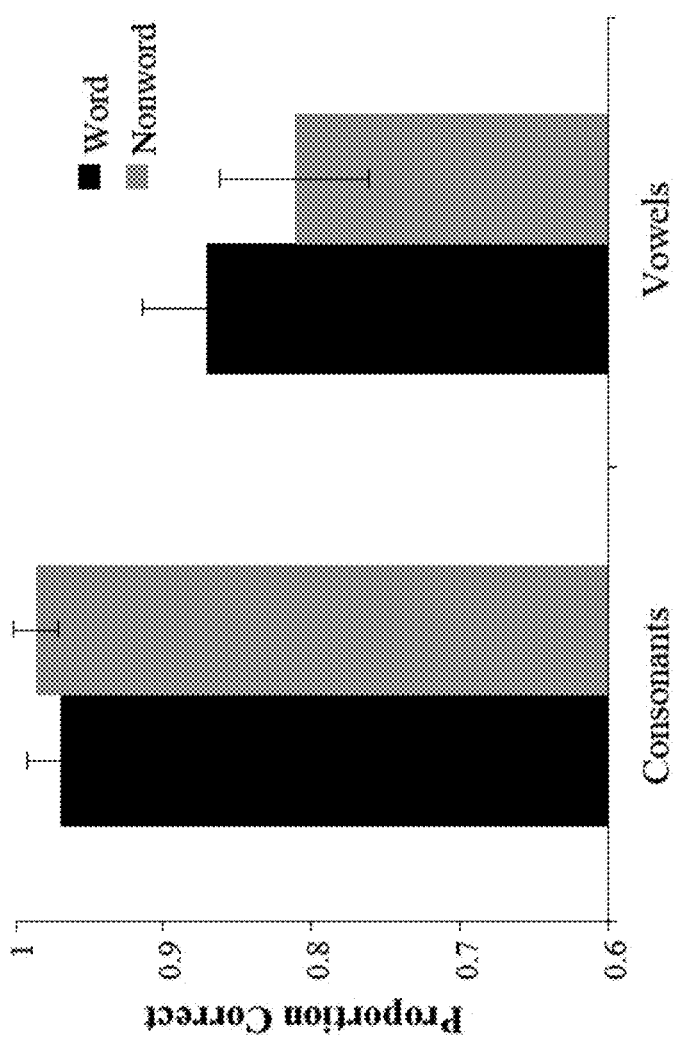
*Figure 4:* Results from testing the iASK prototype on 59 students. Shown is Fill in the Blank tasks for consonants and vowels. A two-way ANOVA revealed a main effect of consonant/vowel ($p<.0001$) and an interaction with word/non-word ($p<.0001$), such that only the vowels showed a decrement for non-words.

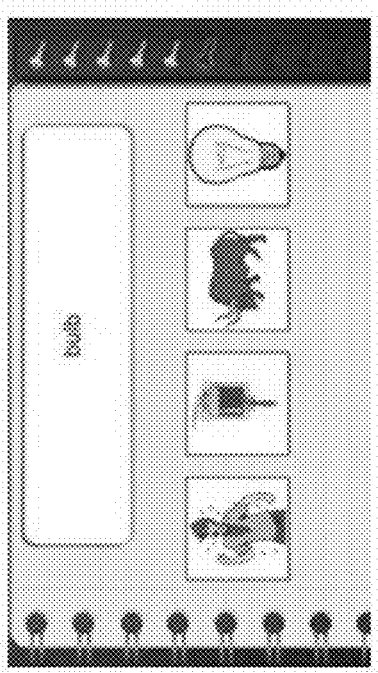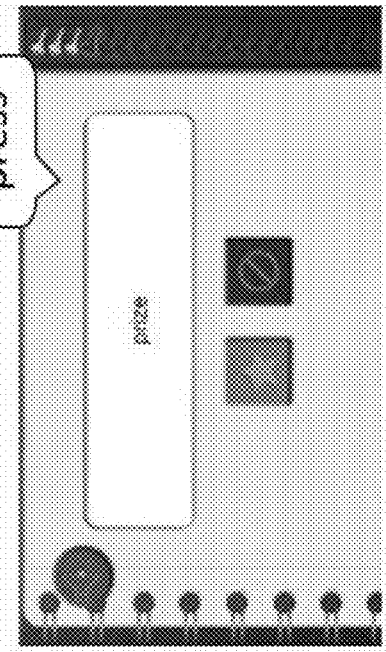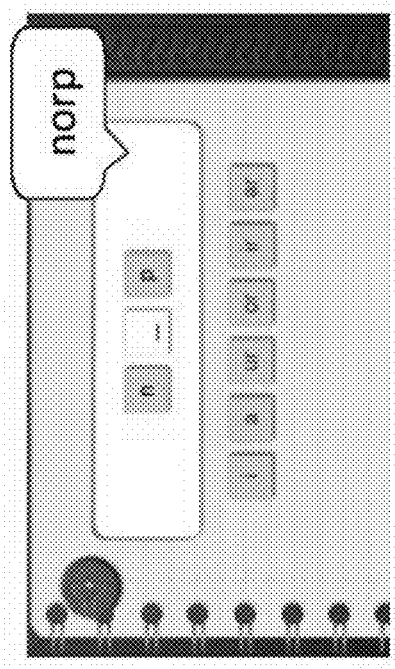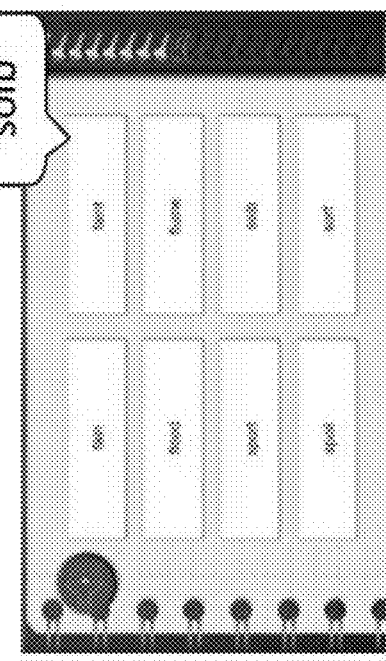
Figure 5: Example interfaces for four tasks (see Table 2)

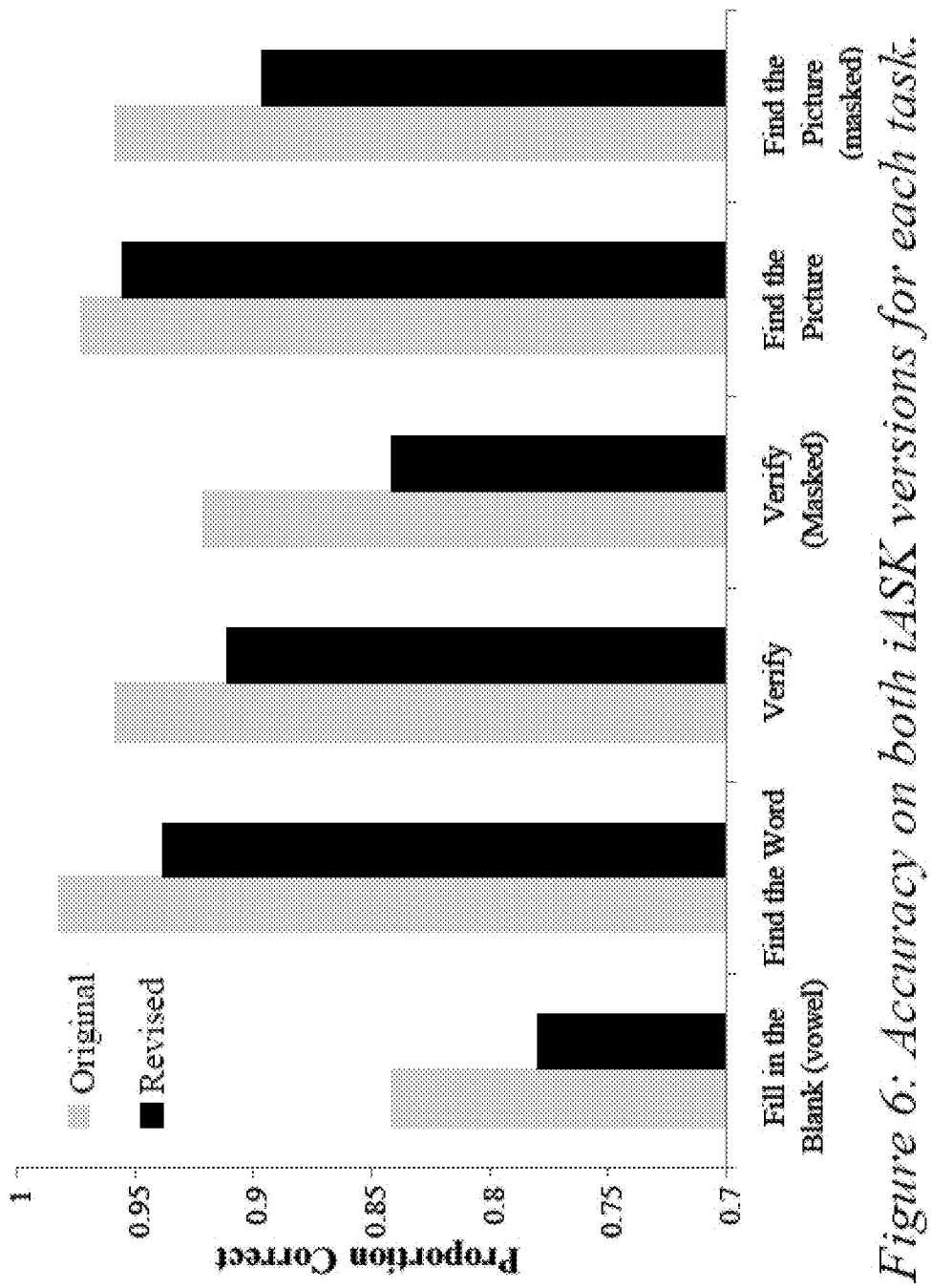
Figure 6: Accuracy on both iASK versions for each task.

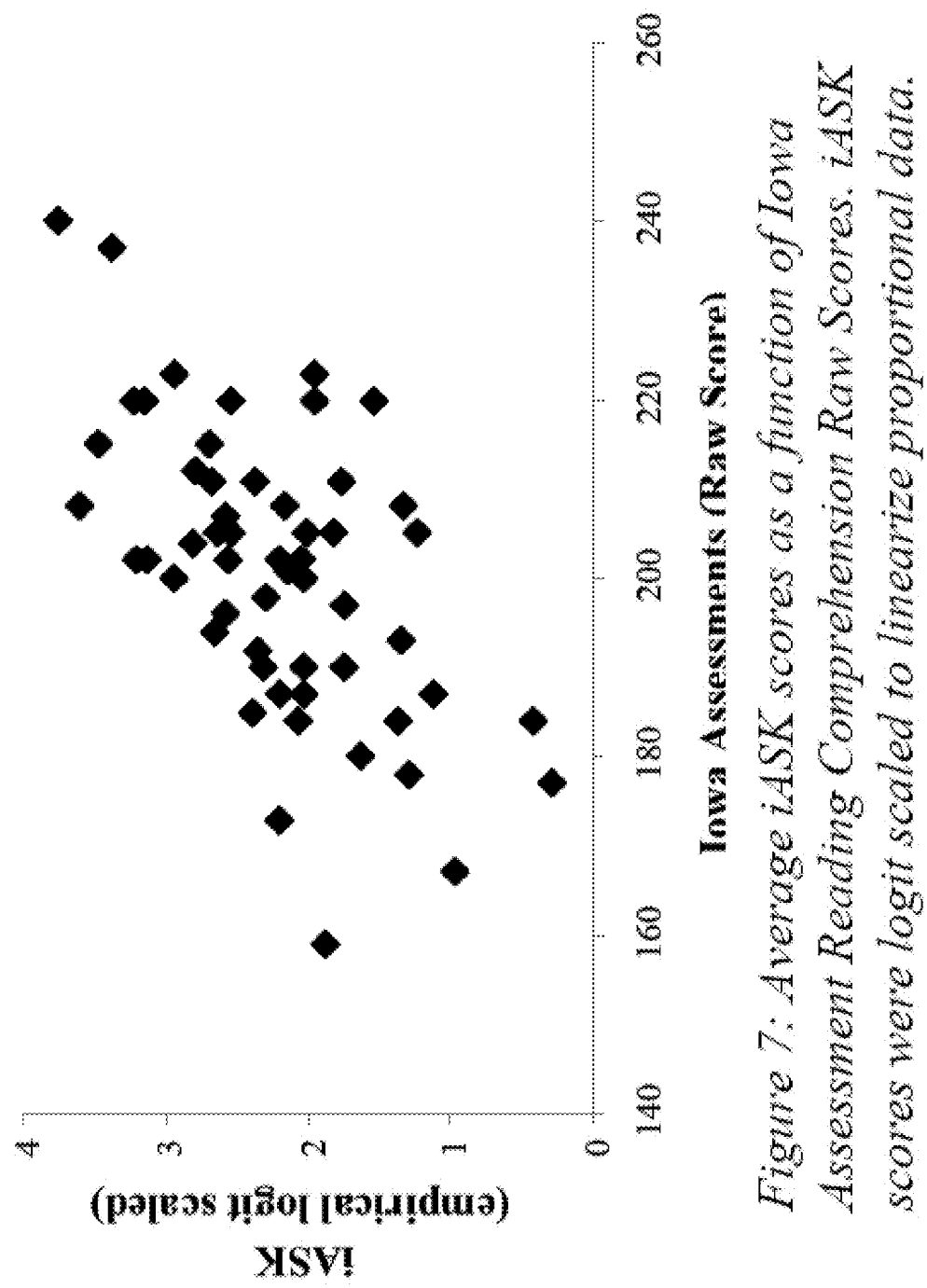
Figure 7: Average iASK scores as a function of Iowa Assessment Reading Comprehension Raw Scores. iASK scores were logit scaled to linearize proportional data.

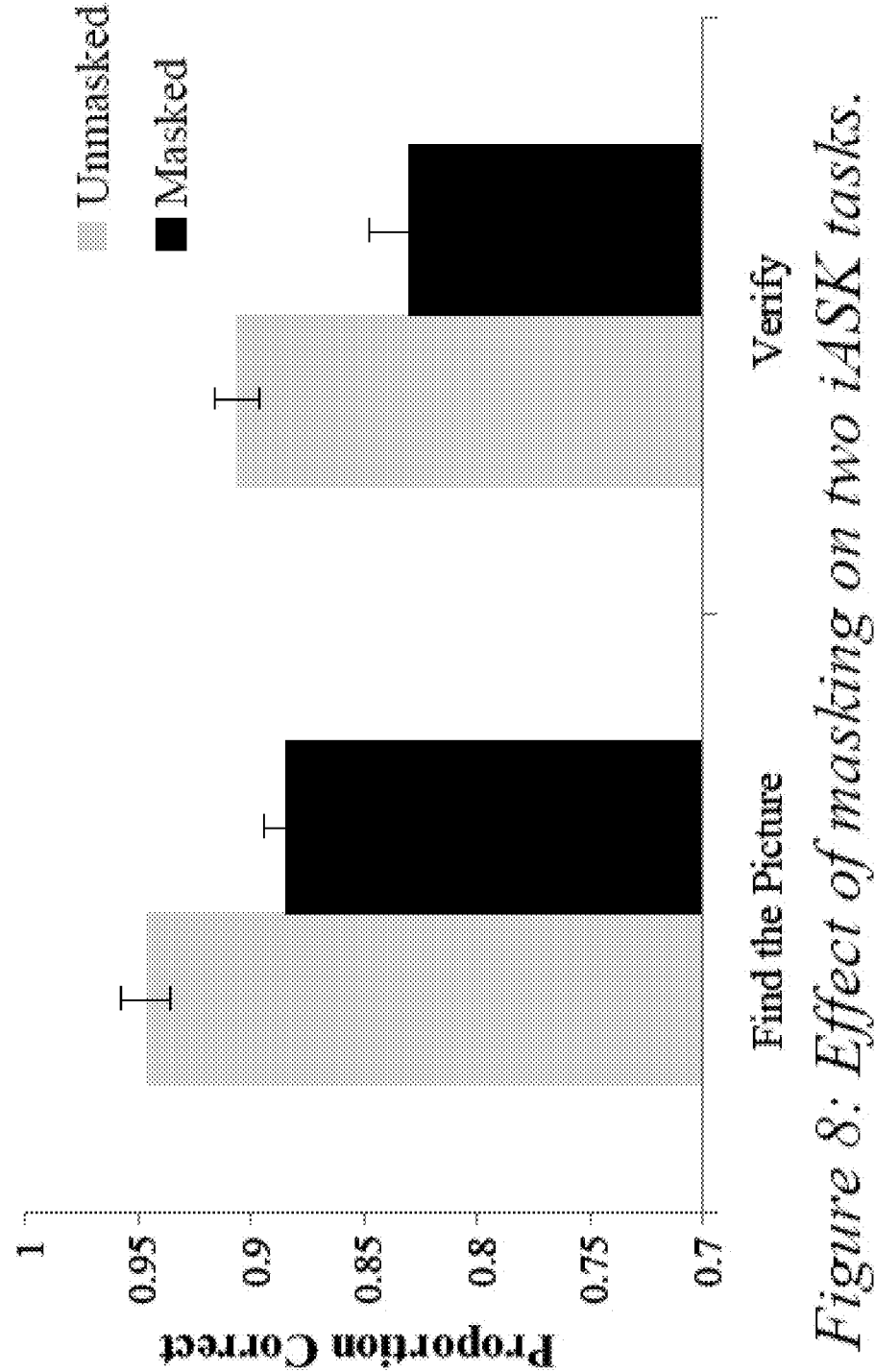
Figure 8: Effect of masking on two iASK tasks.

FIGURE 9B

Note: The small "e" in a square represents the "silent E" notation throughout the drawings.

TASK NAME: FILL IN THE BLANK (VOWEL)

TASK NAME: FILL IN THE BLANK (CONSONANT)

TASK NAME: FILL IN THE BLANK (MULTI-SYLLABIC)

TASK NAME: CHANGE THE WORD / NONWORD

TASK: FIND THE WORD / NONWORD

TASK NAME: WORD VERIFICATION

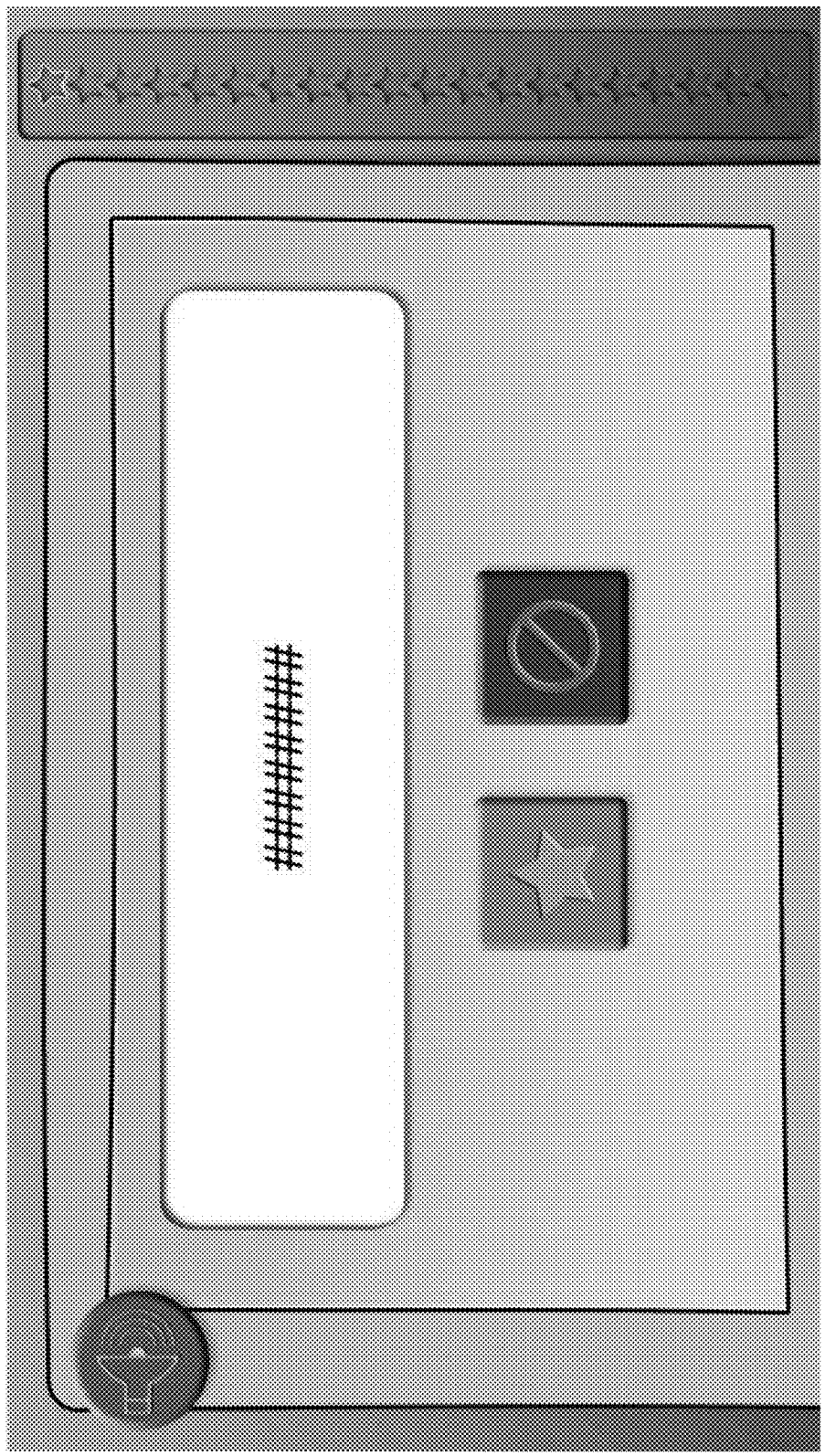

TASK NAME: PROSODY VERIFY

TASK: VERIFICTION (MULTI-SYLLABIC)

TASK NAME: PICTURE MATCHING (FIND THE PICTURE)

TASK NAME: PICTURE MATCHING (MASKED)

TASK NAME: PICTURE MATCHING (MASKED)

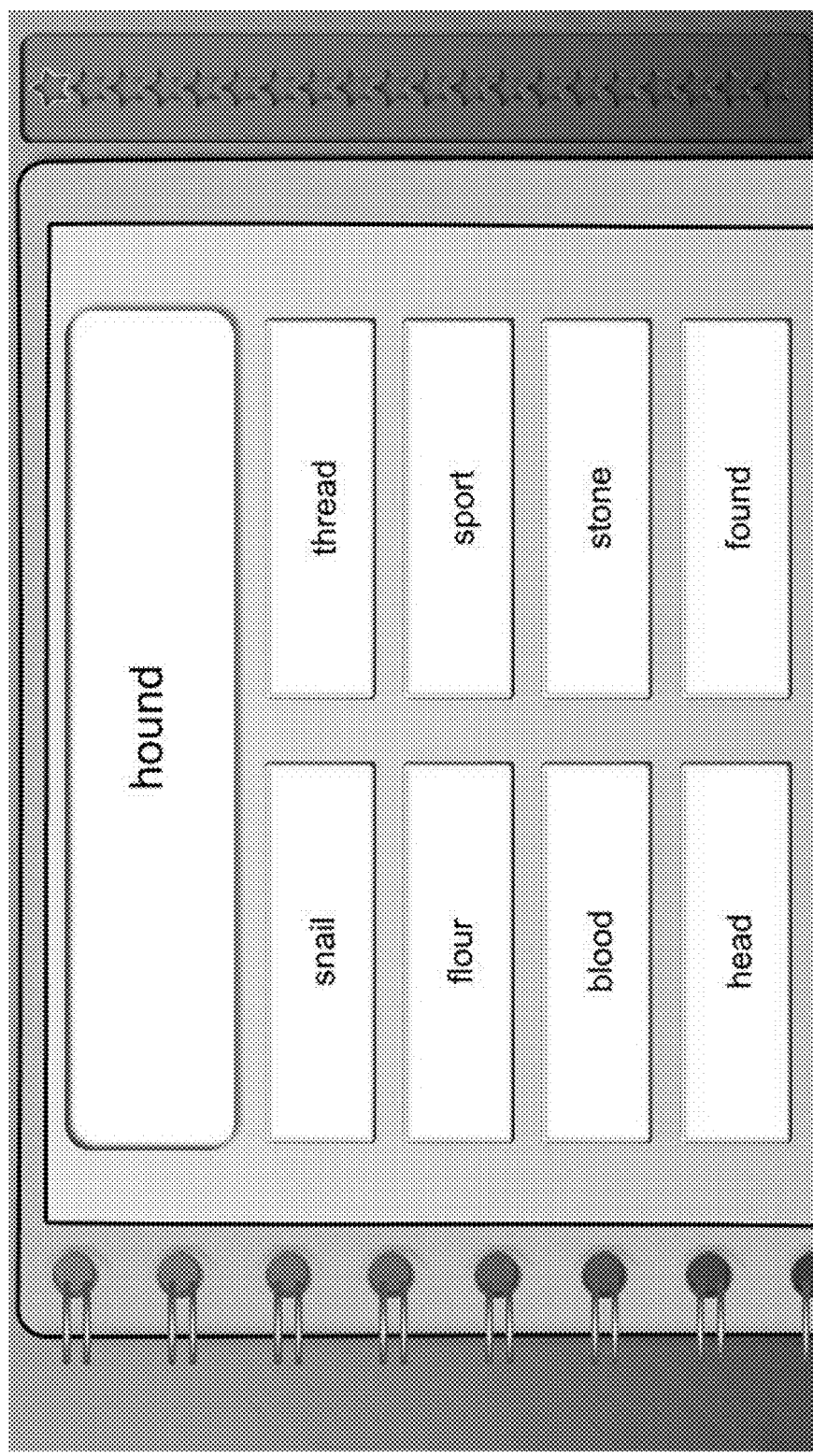
FIGURE 19A — TASK NAME: RHYME IDENTIFICATION

TASK NAME: RHYME IDENTIFICATION (MASKED)

TASK NAME: RHYME IDENTIFICATION (MASKED)

TASK NAME: SYLLABLE IDENTIFICATION: AUDITORY

TASK NAME: SYLLABLE IDENTIFICATION: VISUAL

TASK NAME: SYLLABIFICATION VERIFICATION

TASK NAME: SYLLABLE ORDER

TASK NAME: MAKE (OR SPELL) THE WORD

| Skills | | | | | | |
|---|---|---|---|---|---|---|
| Knowledge of Vowel Mapping | Auditory Word Recognition | Visual Word Recognition | Consonant Identification | Vowel Identification | Change Vowel | Verify Spelling |
| Short | | | | | | |
| Long | | | | | | |
| Digraphs | | | | | | |
| Exceptions | | | | | | |
| R-Controlled, Diphthongs | | | | | | |

FIGURE 25C

| Knowledge of Vowel Mapping | Auditory Word Recognition | Visual Word Recognition | Consonant Identification | Vowel Identification | Change Vowel | Verify Spelling |
|---|---|---|---|---|---|---|
| Short | ✓ | ✓ | ✓ | ✓ | ✓ | ✓ |
| Long | ✓ | ✓ | ✓ | ✓ | ✓ | |
| Digraphs | ✓ | | ✓ | | | ✓ |
| Exceptions | | ✓ | ✓ | | | |
| R-Controlled, Diphthongs | ✓ | ✓ | ✓ | | ✓ | ✓ |

Josh's Profile — Skills

| Knowledge of Vowel Mapping | Auditory Word Recognition | Visual Word Recognition | Consonant Identification | Vowel Identification | Change Vowel | Verify Spelling |
|---|---|---|---|---|---|---|
| Short | ✓ | ✓ | ✓ | ✓ | ✓ | ✓ |
| Long | ✓ | ✓ | ✓ | ✓ |  | ✓ |
| Digraphs | ✓ | ✓ | ✓ |  | ✓ | ✓ |
| Exceptions | ✓ |  | ✓ | ✓ | ✓ |  |
| R-Controlled, Diphthongs | ✓ |  | ✓ | ✓ | ✓ | ✓ |

SYSTEM AND METHOD FOR ASSESSMENTS OF STUDENT DEFICIENCIES RELATIVE TO RULES-BASED SYSTEMS, INCLUDING BUT NOT LIMITED TO, ORTHO-PHONEMIC DIFFICULTIES TO ASSIST READING AND LITERACY SKILLS

CROSS-REFERENCE TO RELATED APPLICATIONS

This application claims priority under 35 U.S.C. § 119 to provisional application Ser. No. 62/053,616 filed Sep. 22, 2014, herein incorporated by reference in its entirety.

BACKGROUND OF THE INVENTION

Field

The present invention relates to automated tools to assess or diagnose student deficiencies relative to a rules-based system. An example of a rules-based system is word recognition in reading and literacy.

Problems in Art

Literacy skills can be critical to individuals and societies. However, even in advanced countries, literacy proficiency is concerningly low. The inventors have dedicated much of their careers to developing products and techniques to address these concerns. See, e.g., issued U.S. Pat. Nos. 6,186,794 and 6,206,700, both entitled "Apparatus and Method for Interactive Adaptive Learning by an Individual Through at Least One of a Stimuli Presentation Device and a User Perceivable Display", and published U.S. Patent Application 2004/0023191 entitled "Adaptive Instructional Process and System to Facilitate Oral and Written Language Comprehension", each incorporated by reference herein in its entirety.

The literature is replete with different theories about how to teach reading and writing and improve literacy. Much concentration is on children. Early deficiencies are difficult to remediate later in life.

There are certainly academic aspects of ways to teach literacy. But there are also practical ones. For example, different students can have quite different learning experiences and needs. One "size" does not "fit all" when teaching reading. And an unfortunate practical reality is that rarely are there unlimited resources to address these needs. The vast majority of learning environments for children are public-funded schools. Dollars and teacher time are limited and usually must be distributed in group-learning form. This can be antithetical to individualized needs, particularly those children who have severe deficiencies.

The inventors have tried to address these realities. The above-mentioned patent filings involve not only discoveries and insights into teaching methodologies for improved outcomes, but leveraging of resources by novel ways of computerized presentation, monitoring, and evaluation of not only students but teachers of the students.

Recently, the inventors have designed another methodology and system. It can be used for conventional literacy teaching but also for interventions for students that have fallen well behind. Implemented under the trademark ACCESS CODE® (Foundations in Learning, Inc., Iowa City, Iowa, USA), it includes the insight that at least aspects of literacy may benefit from a different approach. Pending U.S. patent application Ser. No. 13/026,048, entitled "Apparatus, Method, and System for Teaching Phonics", incorporated by reference in its entirety herein, discusses applying Varied Practice Model (VPM) exercises in a computerized environment. Borrowed from cognitive science, the inventors design tasks that systematically vary task types, curriculum content and feedback to highlight for students important contrasts involved in literacy, both similarities and, importantly, differences in application of the rules by which we decode sounds into words and vice versa. A published study has looked at the efficacy of the patent-pending method and finds much promise. See Apfelbaum, et al., *Statistical Learning in Reading: Variability in Irrelevant Letters Helps Children Learn Phonics Skills*. Developmental Psychology: Advance online publication. DOI: 10.1037/a0029839 (2012, Aug. 27), incorporated by reference herein. The work has also been published at Dev Psychol, 2013 July; 49(7): 1348-65, incorporated by reference herein in its entirety.

While much work, including the above-mentioned patent filings by the inventors, has been addressed to improvements in outcomes for literacy deficiencies, less has been done on how to efficiently differentiate deficiencies in individuals. As discussed below, conventional assessments, including attempts to identify students with need of intervention, fall into two main categories. First, assessment by teachers based on observation of the student. Second, assessment by or based on competency tests such as standardized tests. As discussed below, each has its issues. The former relies on the skills, available time, and subjectivity of the teacher. The latter measure only gross competencies and do not lend themselves to identifying specific deficiencies student by student.

At least 50-60% of struggling readers in middle school cannot automatically read words. Many students learn to read simple text. But even after years of intervention, they cannot effortlessly transfer their knowledge and skills to more complex words and texts. Without this automaticity, comprehension suffers and school success is diminished.

The first step to help these students who lack automatic word recognition is to better define the problem. Many students struggle with automaticity, but they struggle for different reasons. These differences really matter, but they are not well conceptualized or identified by current assessments. To start, we need to distinguish between what these students know and how they use what they know.

This distinction allows us to view automaticity as a constellation of knowledge and skills that students have to assemble on-the-fly, flexibly, and rapidly.

Reading automatically requires both knowledge and skills, and if developing readers have gaps in either or both of these dimensions, they can breakdown. Teachers will be much more effective in planning an intervention that will be most effective when these gaps are identified in a student's profile. This aspect of reading can be compared to other activities that require automatic skills. Through lots of practice in a lot of varied experiences, the learner figures out how to easily navigate through many contexts. Through the combination of knowledge and skills, flexibility and automaticity are achieved.

The invention draws upon current learning models to identify what is missing in each student's profile.

Stated simply, before intervention is possible, identification of need of intervention must occur. And perhaps more importantly, a reliable, resource-effective, and deficiency-specific diagnostic is needed in this technical field for more effective intervention.

The need exists not only for reading and literacy skills, but other areas of learning. Examples are math and foreign languages.

Background of Problem

An extraordinary number of middle school students struggle with reading. The 2013 NAEP (NCES, 2013) found that 66% scored below Proficient, with 22% below Basic (the lowest performance category). A staggering 63% of students with disabilities performed below Basic. Thus, there are a large number of middle school students without sufficient reading skills to understand or learn from school texts. The stakes could not be higher. Adolescents with the poorest reading skills struggle in academic, social, and economic arenas and have bleak long-term outcomes (Blomberg, Bales, Mann, Piquero, & Berk, 2011; Fall & Roberts, 2012; Reed & Wexler, 2014; Wagner, Kutash, Duchnowski, Epstein, & Sumi, 2005).

Reading is a complex process, and not one skill but a constellation of skills. Even for an isolated word, there are multiple routes for accessing meaning from print (FIG. 1). Skilled readers map directly from print to meaning (right, diagonal path); but beginning readers may also map from orthography to phonology (what we term ortho-phonemic mapping, bottom horizontal path) and leverage the known mappings between phonology and meaning (spoken word recognition) to access meaning (Harm & Seidenberg, 1999; Seidenberg & McClelland, 1989). The ortho-phonemic route is crucial for learning to read. Orthography-to-meaning mappings are numerous (linking 26 letters to thousands of meanings) and arbitrary (similarly spelled words do not have similar meanings). Thus, they are hard to acquire, and do not generalize to new words. There are fewer ortho-phonemic mappings (26 letters to 44 phonemes) and they are more systematic (but not perfectly regular). They can be acquired quickly and support generalization. The success of phonics, which target these pathways, underscores their importance for early readers (De Graaf, Bosman, Hasselman, & Verhoeven, 2009; Edwards, 2008; Ehri, Nunes, Stahl, & Willows, 2001; McCandliss, Beck, Sandak, & Perfetti, 2003).

This orthographic-phonemic route is often seen as a bootstrap while young readers master direct mappings; consequently, many educators view it as less relevant to older readers. Yet 47% of struggling adolescent readers have deficits in word identification and fluency (Cirino et al., 2013; Hock et al., 2009). Educators may be surprised by the number of middle school students who struggle with these foundational skills. State or district testing in middle school focuses on comprehension, not on ortho-phonemic skills, and assessments are often not given because they must be individually administered by a person trained in assessment. Thus, for most middle school students, comprehension data may be all that are available, making it difficult to plan targeted interventions for those with serious difficulties with foundational skills (Fuchs, Fuchs, & Compton, 2004). Importantly, even when used, existing assessments mostly target broad competencies rather than specific skills that support these competencies. Focusing intervention on critical component skills, rather than broad competencies, will be more effective in building the automatic skills required to read proficiently (Archer, Gleason, & Vachon, 2003).

Studies support the efficacy of targeted ortho-phonemic interventions in middle school. Meta-analyses of phonics find a moderate effect (d»0.3) of phonics on comprehension in older elementary school and young middle school struggling readers (Edmonds et al., 2009; Ehri et al., 2001; Jeynes, 2008; Reed & Vaughn, 2010). Edwards (2008) conducted a small intervention for struggling high school students in which she first identified students' specific word-level difficulties (e.g., specific letter strings, multi-syllabic words) and provided a 7-week phonics intervention targeting them. Students gained about a grade level in oral reading fluency. This suggests that with sufficiently precise assessments, older struggling readers may benefit from targeted short-term phonics instruction. Similarly, Calhoon and Petscher (2013) examined intensive reading interventions for middle school students and found that those with the weakest decoding skills benefited from an approach in which decoding was the sole focus of the first 7 weeks before sequentially spelling, fluency, and comprehension. iASK builds on this premise: if these foundational skills can be established quickly, reading fluency and comprehension may then be improved for many students through normal text exposure and regular instruction.

Our work leads to a similar conclusion. For the last 10 years, FIL has developed Access Code, a 16-20 week intervention targeting word-level skills. Access Code derives from a similar theoretical model as iASK and uses a variety of procedural learning tasks to develop automatic word recognition. FIL and the UI team conducted a small randomized trial of Access Code in Bridgeport, Conn. (see McMurray, Brown, & Zimmermann, 2014, for a complete report). Twenty-four eighth grade students received Access Code for 13 weeks; 28 received Business as Usual. Students were tested before the intervention and at the end of the semester with AIMSweb (Shinn & Shinn, 2002). In comprehension, the Access Code group gained more than half a grade relative to controls (FIG. 2A; p=0.039 for the time-of-test·treatment interaction). For fluency, students maintained their ability while the control group lost half a grade (FIG. 2B; p=0.015). This suggests that a targeted ortho-phonemic intervention can be an efficient way to achieve gains in both fluent word recognition and comprehension in middle school. However, the great variability among students suggested a need for more precise assessments that can both identify students who could benefit from ortho-phonemic interventions, and which can differentiate specific subskills that could be targeted for more efficient interventions. Such precision may enable better targeted and more efficient interventions to help students achieve word recognition rapidly so instruction can shift to comprehension.

Given the heterogeneity of struggling middle school readers (Cirino et al., 2013; Hock et al., 2009), the current lack of diagnostic precision constrains our ability to intervene. Interventions for adolescents are often unsuccessful (Corrin, Somers, Kemple, Nelson, & Sepanik, 2008; Lang et al., 2009; Vaughn et al., 2010). Yet, these studies rely on assessments that offer only general measures of constructs like phonological awareness or decoding and, do not specify which word recognition skills were deficient. Without such precision, individualized interventions—intuitively the most promising—are slightly less effective than one-size-fits-all interventions in middle school students (Vaughn et al., 2011). Struggling adolescents have no instructional time to waste on skills they have already mastered. Thus, it is essential to create a valid and reliable assessment that provides individualized profiles of the array of ortho-phonemic skills and knowledge that might be profitable targets of intervention for each student.

A New Approach to Assessment of Ortho-Phonemic Difficulties: Theoretical Basis.

At the core of any ortho-phonemic intervention is students' mastery of Grapheme-Phoneme-Correspondence (GPC) regularities which describe the mappings between sound and print. For example, if A is the only vowel in a word (e.g., CAT) it is pronounced /æ/; however, if a silent E is added, it is /eɪ/ (GAVE); and there are exceptions like HAVE. GPC regularities are systematic, but not straightforward. For example, EA is pronounced /i/(as in BEAD, and 127 other mono-syllabic words). However, in 27 words it is /ɛ/ (DEAD) and in 7 it is /eɪ/ (STEAK). But there are multiple ways to make these sounds (/i/ can be EE; /ɛ/ can be E), and these digraphs share letters with patterns mapping to different sounds (EA overlaps with EI and OA). Learners must acquire subtle regularities between letters and sounds, and flexibility to weigh aspects of the input. It is not enough to "know" the rules; they must be flexibly deployed during reading.

Thus, reading may be more akin to a procedural skill like driving than abstract knowledge about a set of rules (Seidenberg & McClelland, 1989). Just as skilled drivers weigh multiple inputs and decisions in real-time, so too must skilled readers Thinking of reading as a procedural skill, rather than as knowledge of component parts, is not common (though see, Apfelbaum et al., 2013), but this is of growing import in work on oral language development. Word learning, for example, is now seen as the interaction of knowledge about a word's meaning with real-time inference mechanisms that children use to deploy this knowledge in ambiguous naming events (Bion, Borovsky, & Fernald, 2013; Frank, Goodman, & Tenenbaum, 2009; McMurray, Horst, & Samuelson, 2012; McMurray, Zhao, Kucker, & Samuelson, 2013).

Once ortho-phonemic processing is conceptualized in this way, it is clear that any assessment must assess readers' knowledge of these mappings, even as knowledge is represented implicitly in the processing system. However, this is not sufficient. To recognize words fluently enough for comprehension and learning in new contexts, students must deploy this knowledge in real-time as an automatic skill. Thus, we must also measure students' automaticity at using GPC knowledge and their flexibility in deploying this across multiple kinds of problems.

An Analysis of Similar Products and Practices

Do Existing Diagnostics Measure these Core Constructs?

Current ortho-phonemic assessments focus primarily on either knowledge of the GPC system (decoding) or outcome measures like word recognition and fluency. This is insufficient. Word recognition and fluency are not unitary skills; they are built on a constellation of skills which rely on knowledge of the GPC system. Some students may fail to read fluently even as they "know" the rules; they lack the flexibility and automaticity to use them. Others can deploy these skills for some, but not all GPC regularities. Current assessments do not diagnose specific deficits in terms of the diverse range of skills and knowledge that support the application and generalization of GPC knowledge. There are two limitations of existing diagnostics in this regard. First, unless tied to a specific intervention, they do not parcel out GPC knowledge (separating performance on short vowels, digraphs, etc.). This is essential to target the specific knowledge middle schoolers need and avoid wasting time on things they do not. Second, existing assessments typically use only one or two tasks to assess competencies, limiting their ability to assess automaticity and flexibility.

A better approach would be to use multiple tasks to assess flexibility, automaticity, and generalization, and to embed this assessment of skills in a parcellation of different aspects of the GPC system. The invention develops an online, computer-based assessment that more precisely profiles struggling middle school readers in terms of both their understanding of the GPC system and the skills that bridge this knowledge to automatic word recognition.

Challenges of Implementation.

Data based decision making is ideal for planning intervention (Fletcher & Vaughn, 2009; Hamilton et al., 2009), but typical practice rarely lives up to it. Reed (in press) suggests middle school teachers typically examine available data (state reading assessments) only in the aggregate, and use these solely to route students to packaged interventions. Teachers were resistant to individually administered assessments, unaware of measures' technical adequacy, and did not find them useful. This gap between ideal and actual practice comes from a number of operational problems with existing assessments.

First, many assessments must be administered individually (Table 1), placing large time demands on students and examiners. Although some tests take as few as five minutes, this does not include time for directions and transitions, and this must be scaled by the large number of students needing assessment (Reed, Wexler, & Vaughn, 2012). For both students and teachers, these time demands create pressure against assessment.

A second challenge is reliability. Graduate students in psychology and counseling struggle to achieve reliability (Loe, Kadlubek, & Marks, 2007; Ramos, Alfonso, & Schermerhorn, 2009). Reed and Sturges (2012) found that well trained research assistants committed an assortment of errors with individually administered measures: as much as 8% of the dataset was uncorrectable, and 91% of the remaining data contained correctable errors. These studies examine highly trained testers; teachers with competing demands may not do as well. In fact, examiner errors have been found to contribute as much as 16% of the variance to students' scores on individualized assessments of reading ability (Cummings, Biancarosa, Schaper, & Reed, 2014).

TABLE 1

Diagnostic assessments of foundational skills validated for use in grades 6-8

| Assessment | Skills Measured | Type | Specificity of Results |
| --- | --- | --- | --- |
| AIMS web | Oral reading fluency | Individual | General ability |
| Comprehensive Test of Phonological Processing | Elision, blending, sound matching, phoneme isolation, segmenting nonwords, nonword Repetition, rapid letter naming | Individual | General ability |
| Gray Oral Reading Test | Rate, accuracy | Individual | General ability |
| Lindamood Auditory Conceptualization Test | counting syllables, tracking syllables | Individual | General ability |
| Test of Rapid Automatic Naming & Rapid Altering Stimulus | Letters | Individual | General ability |

TABLE 1-continued

Diagnostic assessments of foundational skills validated for use in grades 6-8

| Assessment | Skills Measured | Type | Specificity of Results |
|---|---|---|---|
| Test of Word Reading Efficiency | Decoding efficiency, sight word efficiency | Individual | General ability |
| Woodcock Johnson | Word attack, letter-word identification, reading fluency | Individual | General ability |
| Yopp-Singer Test of Phoneme Segmentation | Phoneme segmentation | Individual | General ability |
| Developmental Reading Assessment, 2nd Edition, | Engagement, fluency, and comprehension | Individual | General ability |
| System 44 | Phonics, decoding, fluency | Computer | Specific to intervention; Grouping for teacher instruction |
| Fast ForWord | Phonemic awareness, decoding | Computer | Specific to intervention |
| iReady | Phonological awareness, phonics, high-frequency words | Computer | Specific to intervention; suggested next steps for instruction |

Third, computer-delivered assessments appear to solve these problems by offering efficient administration to multiple students and better fidelity. Yet existing computer-based measures are often difficult to integrate into instructional decision making. Most are designed to place students into the sequence of lessons within an associated intervention. This limits their utility for enabling flexible decision making about intervention. Although most computer-delivered assessments consider some teacher-delivered instruction an integral part of intervention, they do not facilitate teacher examination of students' performance or equip them to make decisions.

Most importantly, current assessments do not offer sufficient precision to target intervention to anything more specific than competencies like decoding or word recognition. They do not parcel students' understanding of the GPC system into separate components as there are often too few items (due to time pressure) to lend themselves to an error analysis or sub-grouping. Similarly, typical assessments have only limited ways to assess automaticity. This is essential for determining whether a student's deficit derives from a lack of understanding of basic reading concepts or an inability to deploy them automatically—do they need instruction or practice? By analogy, one would not decide that a child understood the meaning of a difficult word by asking one fact about it in one way (McMurray et al., 2012). We must do better for reading.

We need a more precise and multi-dimensional assessment of ortho-phonemic processing that measures distinct aspects of GPC knowledge, embedded in multiple tasks and skills. Computer-based diagnostics offer promise for achieving these goals. They are more efficient and reliable, and if decoupled from specific interventions, they could enable more flexible decision-making. Most importantly, computer-delivered assessments can also deliver more items in more tasks more quickly to develop a precise profile of struggling readers. The invention was developed to offer an efficient solution to these problems.

The present invention therefore relates to improvements in assessing and diagnosing deficiencies in GPC and related knowledge and skills, particularly in children. GPC is a rules-based system. Therefore, the invention can also apply in an analogous manner to other rule-based systems. It is possible to apply to any grade level or age.

SUMMARY OF THE INVENTION

Objects of the Invention

It is therefore a principal object, feature, aspect, or advantage of the present invention to provide a computerized system and method of assessment of students relative to rule-based systems which improves over or solves problems and deficiencies in the state of the art.

Further objects, features, aspects, or advantages of the invention provide a system or method as above-described which:
 a. is effective;
 b. is economical;
 c. is highly automated;
 d. is reliable;
 e. is flexible and adjustable;
 f. can be used not only for identifying need for intervention, but also identifying specific deficiencies on a student-by-student basis; and
 g. is predictive and allows data to be scored with high fidelity and then represented in translatable format for use.

These and other objects, features, aspects or advantages will become more apparent with reference to the description and appended materials.

Aspects of the Invention

An aspect of the invention includes an Internet-enabled system whereby assessments can be administered to any number of widely-dispersed students via Internet-enabled devices (e.g. desktop or laptop computers, tablets, or other digital devices). A centralized server or host can store a centralized and standard assessment test for a given rules-based system. One example is literacy. The assessment test is created as follows. Out of the many times large number of variations of rules of the rules-based system, the assessment designer selects those rules which are deemed particularly relevant to indicated deficiencies in students struggling with the rules-based system. With respect to literacy, one example is rules particularly pertaining to GPC. The designer then creates a set of what are called tasks that involve those rules. In the example of GPC, the tasks present different exercises or questions for student response. In the GPC example, tasks may include fill in blank with the correct vowel or consonant, hear a word or a picture and select the correct word, spell a multi-syllabic word. Importantly, each of the tasks is presented in a plurality of systematic variations. The variations are, in turn, based on a pre-determined classifications. In the example of GPC, the classifications differ in complexity (e.g. GPC ranging from single letters to digraphs and diphthongs). Student responses to this limited number of tasks deemed highly relevant to identifying deficiencies with specificity are recorded based on accuracy and time to respond. Software automatically makes several different comparisons of the responses correlated to different knowledge and skills used in word recognition to produce an individual profile of such knowledge and skills for each student. Thus, any number of students, dispersed over any range of geographic distance, can efficiently be screened and assessed regarding the rules-based system. The profile can be shared with the student's teacher(s) efficiently, such as via email. The profile can be used to inform and design targeted remediation on an individual basis.

Another aspect of the invention pertains to applying the system described above specifically to GPC. One classification set for tasks comprises (1) consonants, (2) short vowels, (3) long vowels, (4) dominant digraphs, (5) secondary digraphs, and (6) diphthongs and "R-controlled vowels". A limited number of different tasks (e.g. more than 1 or 2 but less than perhaps 20) are presented in trials to the student, varying by class and by parameters related to VPM. While the number of tasks and classes of tasks are limited (relative to those possible), they are focused on indicators of strengths and weaknesses of readers for a variety of specific important foundational skills and knowledge. They are not just generally testing word recognition and fluency. They are selected to reveal information about a number of specific different indicators of knowledge and skills correlated to GPC. Again, the number and scope are limited to promote a practical use of system, student, and teacher time for assessment, but probe a plurality of GPC mechanisms designed to inform of specific needs for each student.

BRIEF DESCRIPTION OF THE DRAWINGS

FIG. 1 is a diagrammatical representation of what is sometimes called the "Triangle Model" of literacy learning, such as is discussed in the state of the art and relative to the description of Specific Example 1 of the invention below, one form the invention can take and entitled "The Iowa Assessment of Skills and Knowledge for Automatic Word Recognition and Decoding (iAsk)".

FIG. 2 includes graphs comparing results of comprehension using the ACCESS CODE® literacy training system available from Foundations in Learning, Inc. and described in incorporated by reference U.S. Ser. No. 13/026,048 relative to other ("Business as Usual") techniques.

FIG. 3 is a diagrammatic illustration of theoretical principles behind aspects of the present invention.

FIG. 4 is a graph indicating results of use of an embodiment of the present invention with a test group of students, related to consonant and vowel recognition.

FIG. 5 is a set of a few examples of types of tasks such as can be utilized in embodiments of the present invention.

FIG. 6 is a graph comparing testing group results relative to different versions of the present invention on a task by task basis.

FIG. 7 is a graph showing correlations of testing results relative to a standardized test.

FIG. 8 is a graph showing effect of masking tasks on test group results.

FIG. 9B diagrammatically illustrates the general method according to the invention (generalized for any rules-based system) but then shows how it could be implemented regarding the rules-based system involved with reading, including one embodiment of the classes that could be selected for GPC tasks and then the varying GPC tasks.

Figure #(s) Task from Table 3
11 Fill in the blank (vowel)
12A-C Fill in the blank (consonant)
13 Fill in the blank (multi-syllabic)
14A-E Change the word/nonword
15 Find the word/nonword
16A-C Word verification (unmasked and masked and prosody respectively)
17 Verification (multi-syllabic)
18A-M Picture matching
19A-C Rhyme identification
20 Syllable ID: Auditory
21 Syllable ID: Visual
22 Syllabification verification
23 Syllable order
24 Spell the word FIGS. 25A-H are examples of screen displays of profiles that can be developed based on student responses to the tasks above, such as can identify gaps in knowledge or skills of each profiled student relative to literacy or word recognition and be utilized by teachers for remediation.

DETAILED DESCRIPTION OF EXEMPLARY EMBODIMENTS OF THE INVENTION

Overview

For a better understanding of the invention, one or more exemplary embodiments will now be described in detail. These are neither inclusive nor exclusive of the forms and embodiments the invention can take. They are given for example only and not by way of limitation.

The primary exemplary embodiment is described in the context of the English language and literacy relative to it, as the rules-based system. As can be appreciated by those skilled in this field, aspects of the invention can be applied to other rules-based systems. Examples include but are not limited to math, foreign languages, vocabulary development, and others.

General Method and System

By reference to FIGS. 9A-E, an example of the generalized method and system is illustrated and as applied to GPC is illustrated.

Figure 9A:
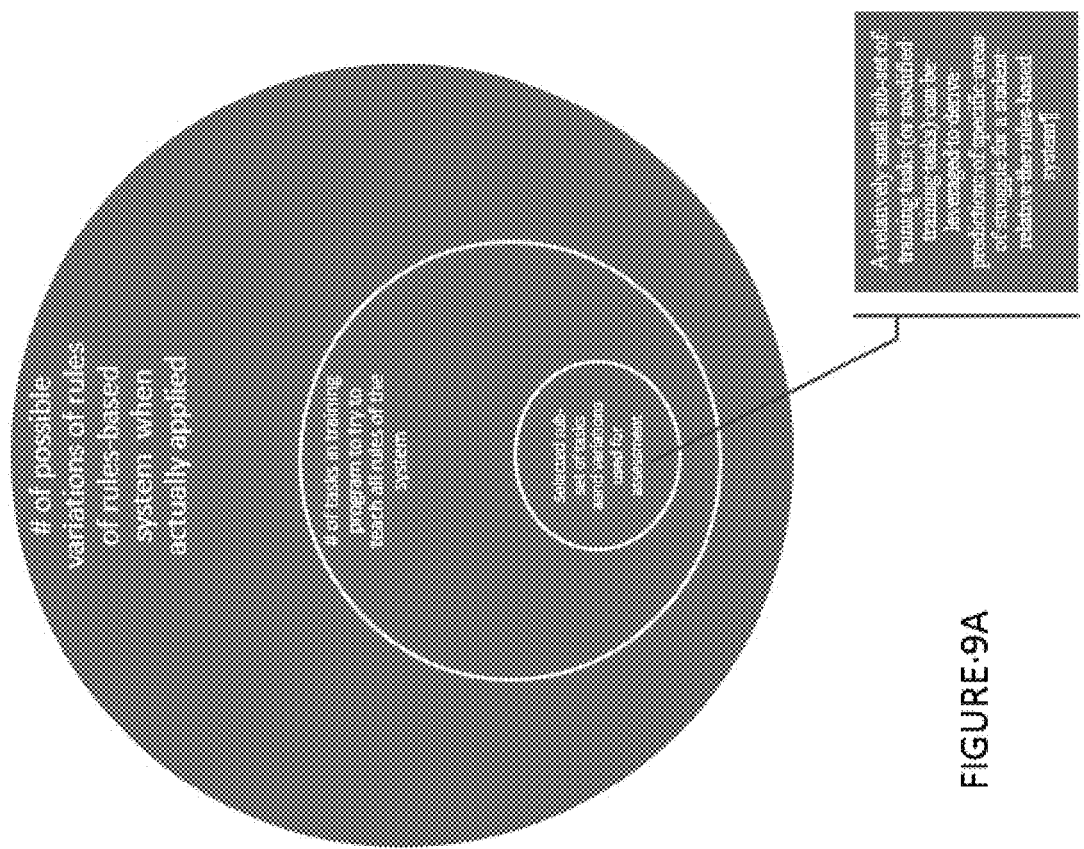
FIG. 9A is a highly diagrammatic illustration of how the present invention efficiently distills down the possible number of tasks to a limited number.

For efficiency but specificity, it has been determined assessment can rely on a subset of possible rules. The assessment can be given in a reasonable amount of time (e.g. no more than several hours). FIG. 9A diagrammatically illustrates that English language rules can number tens if not hundreds, when all exceptions and variations are included. The exemplary embodiment narrows this first by selection of what is considered highly relevant to struggling readers (GPC issues). It limits the assessment, secondly, by designing a limited number of tasks and specific curriculum contrasts to identify rule application and generalization (as opposed to learning all possible rules).

Figure 9B:
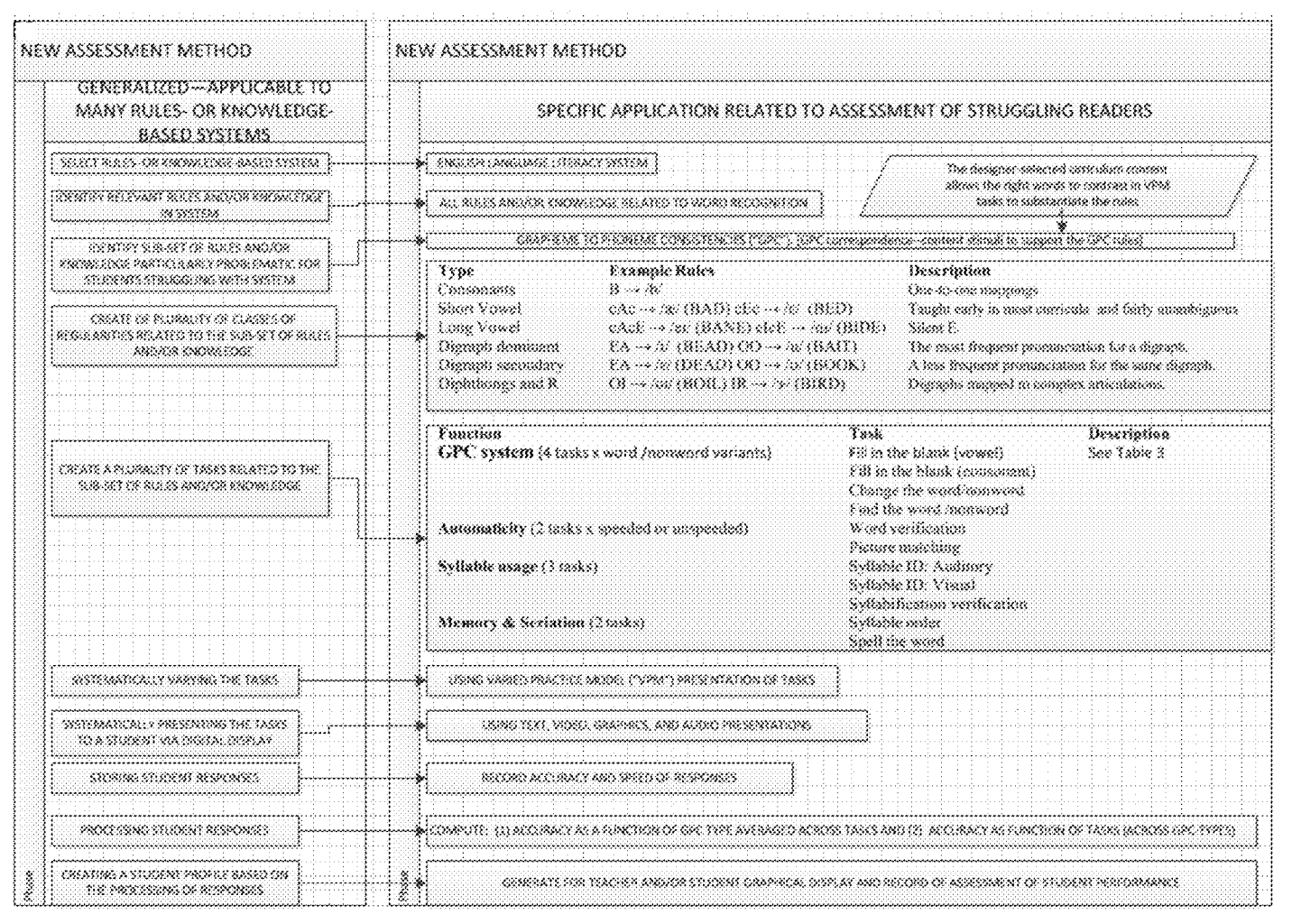

FIG. 9B shows application of the generalized method to reading. As discussed in more detail in the section entitled "Specific Example 1" below, the limiting down for GPC results in tasks manifested according to a set of different classes ranging from one-to-one mappings of consonants to digraphs mapped to complex articulations. Each has specific GPC implications. Tasks also address, in different ways, specific GPC skills and knowledge (the overall GPC system, automaticity, transference to multisyllable usage, and impact of memory/seriation on application). This construction of the assessment thus serves the somewhat antagonistic goals of keeping the assessment reasonable in length but eliciting data about very specific GPC mechanisms. In the example of FIG. 9B, there are six (6) different classes. In the example set for the below under the heading Specific example 1, there are eight (8) classifications namely, the six classes of FIG. 9B plus new classes "consonant digraphs+silent" and "long & short secondary". Also, the first class "consonants" in FIG. 9B is changed to "consonant clusters" in Specific Example 1. As can be appreciated by those skilled in the art, the classes can vary according to the designer.

Figure 9C:
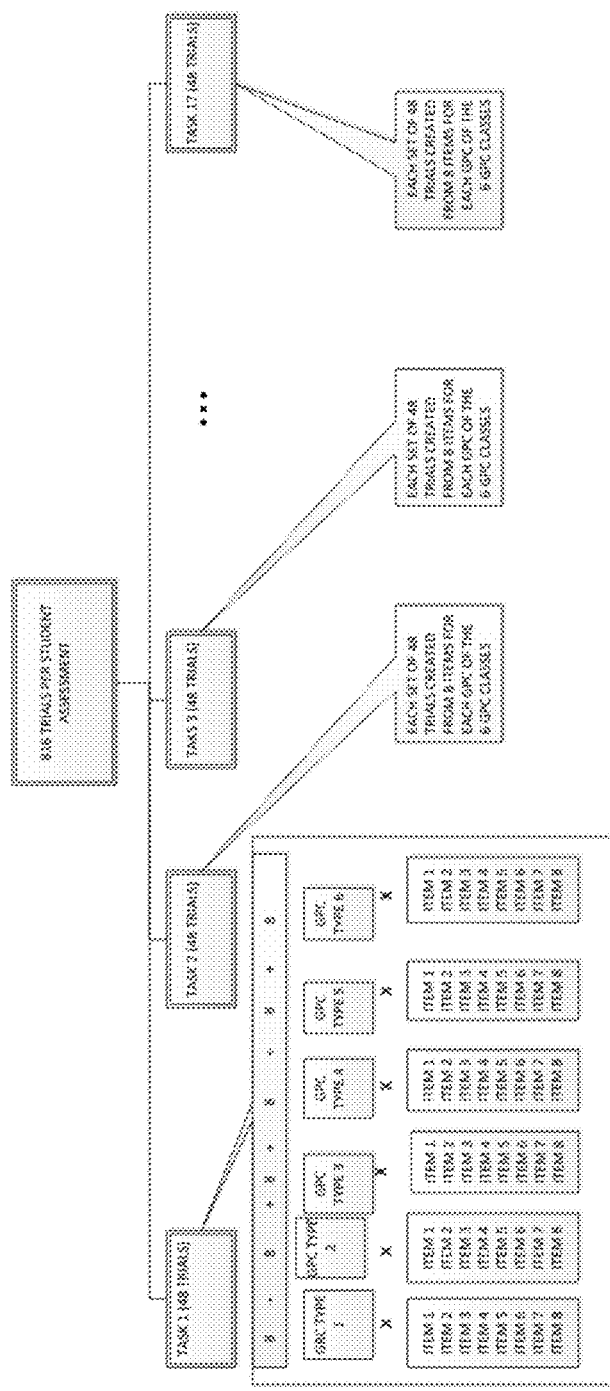
FIG. 9C is a diagram illustrating a specific design of limited number of classes and tasks, as well as limited number of trials presented to the student during assessment.

FIG. 9C gives additional illustration of this dichotomy. The classes and tasks are limited in number (in this case 6 classes and 17 tasks), but by using systematic VPM variation in plural trials per task, it has been established that telling information about the student's GPC knowledge and skills can be derived. See also Apfelbaum, et al. at Dev Psychol, 2013 July; 49(7): 1348-65. It is noted that the Specific Example 1 below has 14 tasks. Many are the same or similar to those in FIG. 9C. But new tasks "Fill in the blank (multi-syllabic)", "verification (multi-syllabic)" and "Rhyme identification" are new in the Specific Example 1. Again, as can be appreciated by those skilled in the art, the number and nature of the tasks might vary according to designer.

Figure 9D:
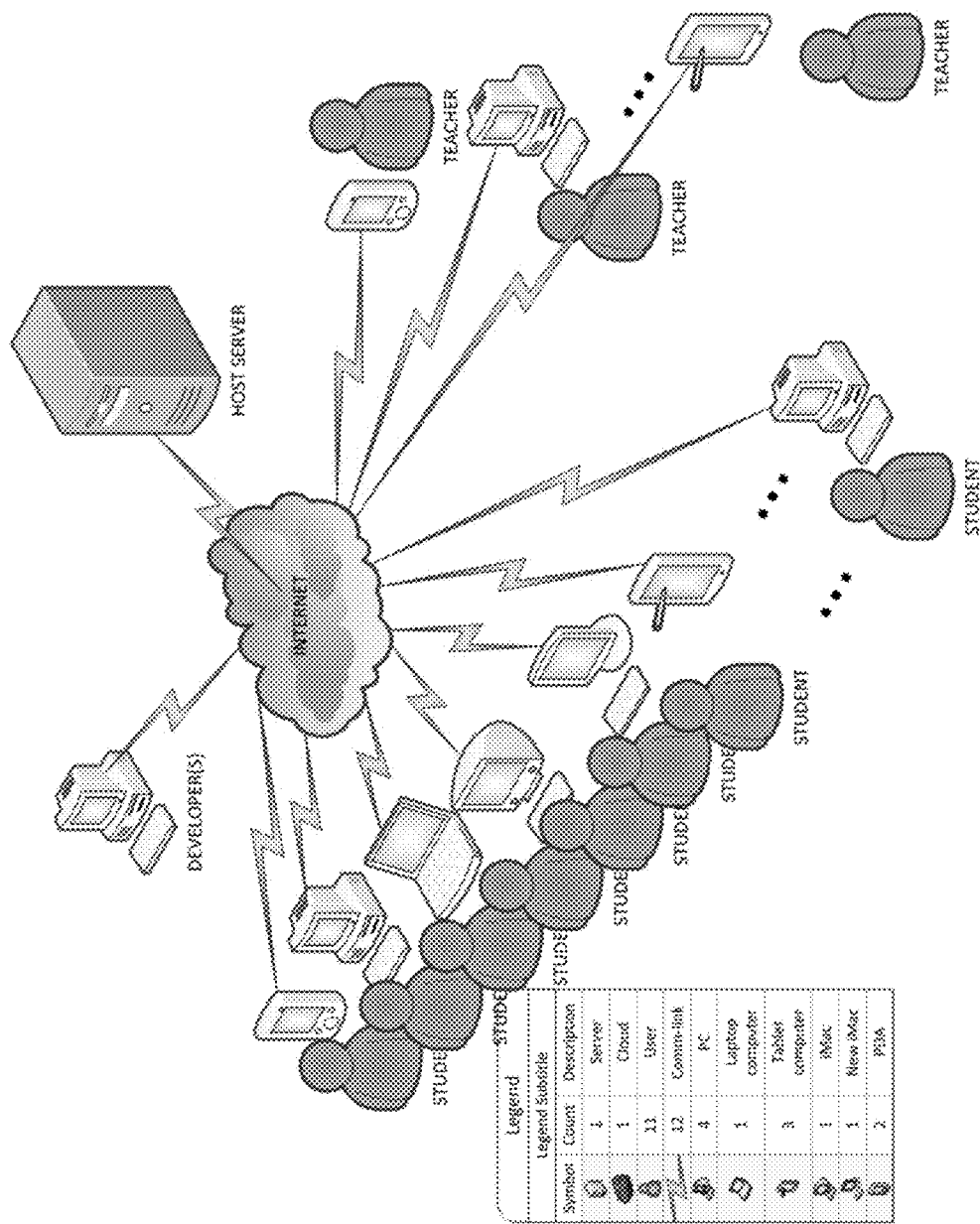
FIG. 9D diagrammatically illustrates an internet based system according to the invention, allowing virtually unlimited numbers of student and teachers to access and use the assessment system according to the invention.

FIG. 9D diagrammatically illustrates basic features and flexibility of having a centralized assessment host easily and economically accessible by any number of students and teachers. It also economically and easily allows one or more designers to maintain, edit, or update the assessment, as well as communicate with students or teachers, or even third parties (e.g. overseers, government, etc.). The embodiment can, of course, be implemented in well-known hardware and software. FIG. 9D can be applied to the classifications and tasks of FIGS. 9B and 9C but, as can be appreciated, can be applied in an analogous way to the specific numbers and nature of classifications and tasks of the Specific Example 1 below, or other variations. The hardware platform can vary. For example it can be implemented as suggested in FIG. 9D (central server and widely distributed computing devices over the Internet). Tablets and other more mobile digital devices are possible.

Figure 9E:
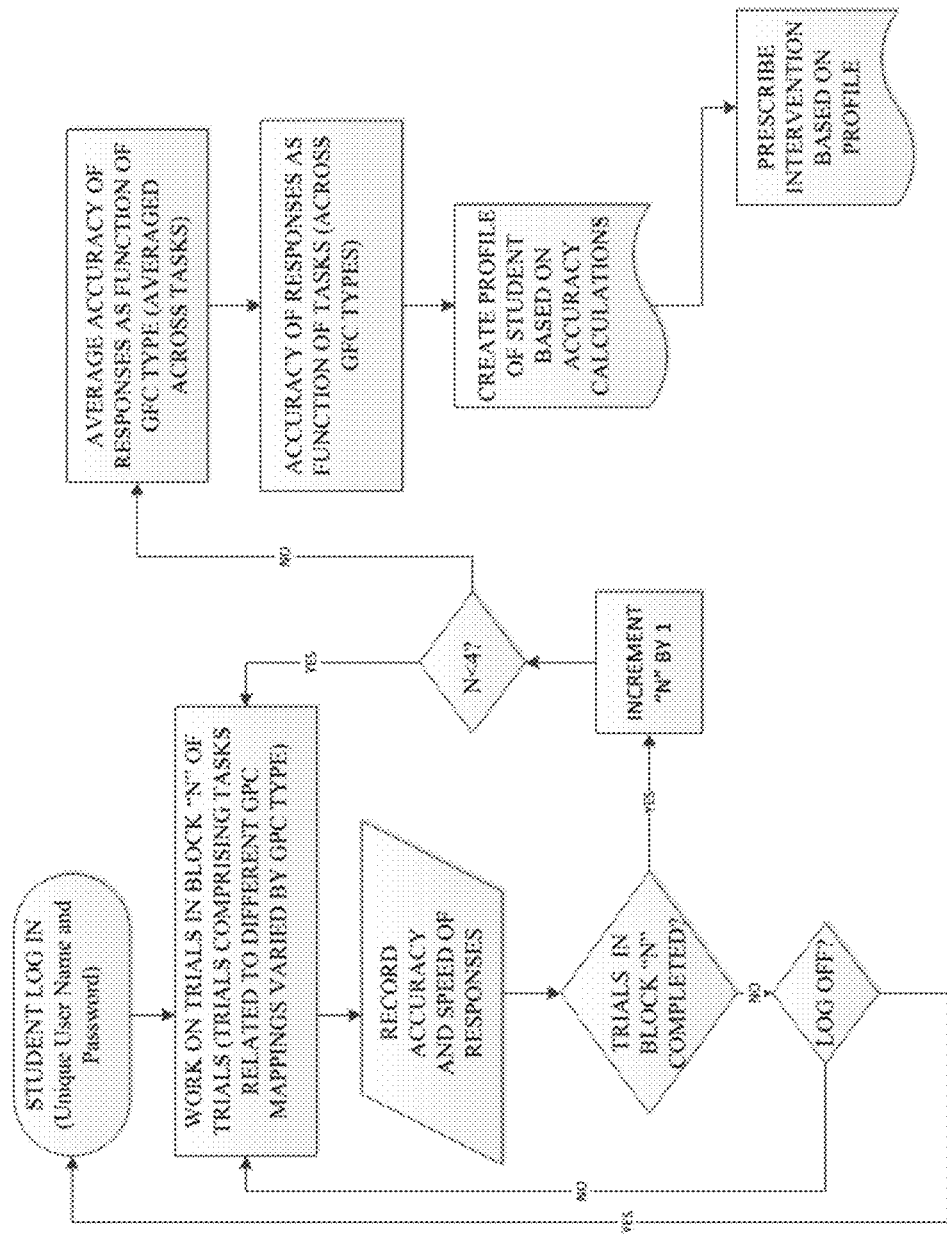
FIG. 9E is a flow chart of one embodiment of practicing the method applied to GPC assessment of struggling readers.

FIG. 9E gives a flow chart of basic concepts of methodology according to aspects of the invention. One example of implementation of the methodology is given in Specific Example 1 below. It is to be understood that variations are possible.

Further appreciation of aspects of the invention and a specific implementation are set forth in the Specific Example 1 below.

Specific Example 1

One way in which aspects of the invention can be implemented is now discussed in detail. As will be appreciated by those skilled in the art, the invention can take many forms and embodiments, and this is but one exemplary embodiment. This embodiment will be called, from time to time, "iASK". The discussion provides details of iASK, including development steps (Phase I and Phase II) to give the reader context about its aspects and features.

Education Technology Product Used by Students or Teachers (or Other Instructional Personnel) in Authentic Education Settings The Iowa Assessment of Skills and Knowledge for Automatic Word Recognition and Decoding (iASK)

Abstract

Half of middle school struggling readers have deficits in word recognition. Yet current assessments measure only gross outcomes in word recognition and fluency, not the diverse skills and knowledge that support such outcomes. A more complete picture is necessary for targeting interventions. This proposal develops a new assessment of students' knowledge of sound-to-spelling regularities and the skills in which it is embedded. By crossing these factors in a cognitive science framework, the Iowa Assessment of Skills and Knowledge for Automatic Word Recognition and Decoding (iASK) offers a multi-dimensional picture of students' reading difficulties to help precisely target intervention to achieve automatic word recognition. iASK uses an internet-based platform for efficiency and fidelity, while enabling diverse tasks and items for a multi-dimensional assessment. Phase I developed a prototype of iASK. A study of students and teachers found it to be feasible and usable, and found evidence of both validity and reliability. Phase II builds the complete diagnostic and assesses its reliability and validity, comparing iASK with a battery of standardized tests in two cohorts of middle school students. Phase II also examines its feasibility for middle school classrooms and the utility of its data and reporting in supporting instructional decision making.

Commercial Potential

The iASK system can address 1) an urgent need of a large number of middle school students with deficits in heretofore specific, undiagnosed foundational reading skills; 2) efficiency in identifying gaps in each student's profile of automatic fluent word recognition and decoding skills; 3) the efficiency in administration and fidelity in scoring offered by its computer-based implementation; 4) the experience and success of already in existence substantive educational product of the inventors; and 5) the flexible platform and analytical framework underlying it that will allow its continuous improvement and enhanced sensitivity.

Project Narrative—Technical Content

Reading is the foundation of academic success. Despite decades of education research and millions spent in initiatives, many students struggle. The scale of this problem is striking in older students: 66% of middle school students were below proficient on the most recent National Assessment of Educational Progress (NAEP; National Center for Education Statistics [NCES], 2013). Remediation of adolescents is challenging as they are highly heterogeneous. While most show comprehension deficits, only half of struggling readers show deficits in word-level skills like word recognition and decoding (Cirino et al., 2013; Hock et al., 2009). This heterogeneity demands assessments that identify deficits with sufficient specificity to target effective interventions for each struggling reader—assessments that do not currently exist.

The iASK system develops a new, theoretically motivated, multi-dimensional assessment of word-level (or ortho-phonemic) proficiency (decoding, fluency, word recognition) for middle school readers. Existing assessments describe such difficulties in terms of broad competencies. However, these competencies are the complex product of multiple skills harnessing multifaceted knowledge. Students may be able to read vowels in CVCs (consonant-vowel-consonant syllables) but be unable to use this knowledge in some tasks; or they may succeed at word recognition for one-syllable but not multi-syllabic words. A critical goal of intervention is transforming knowledge of sound/letter patterns into skills that can be deployed automatically during reading. Whereas most assessments emphasize gross outcomes (phonics knowledge, word recognition accuracy), there is a need for a multi-dimensional tool to assess knowledge and automatic skills, across diverse tasks and content.

Over the past decade, the inventors have developed a family of reading interventions targeting ortho-phonemic skills, based on learning principles from cognitive science. With cognitive scientists at the University of Iowa, they have developed and tested this framework (Apfelbaum, Hazeltine, & McMurray, 2013), funded by two NSF basic research grants (Hazeltine & McMurray, 2013; McMurray & Hazeltine, 2010). The iASK system leverages this knowledge to develop and test a new assessment: the Iowa Assessment of Skills and Knowledge for Automatic Word Recognition and Decoding (iASK).

Phase I resulted in a prototype of iASK using a subset of the tasks and items of the complete assessment. Fifty-nine struggling middle school readers were tested. Results support iASK as a valid assessment of reading, and validate its theoretical model. Phase II fully develops iASK, including teacher reporting tools, and conduct a complete validation study.

Aim #1: To develop an online assessment for middle school students that assesses fundamental skills and knowledge necessary for automatic word recognition.

Aim #2: To test the reliability and validity of this assessment.

Aim #3: To test iASK's usability by teachers to support instructional decisions.

There is a great need for assessments that identify the locus of middle school students' reading deficits. iASK, which is independent of a specific intervention, will provide measures of specific knowledge and skill deficiencies that easily can be used to inform targeted intervention.

Theory of Change (FIG. 3).

As many as half of struggling middle school readers have deficits in ortho-phonemic processing (Cirino et al., 2013; Hock et al., 2009). Many of these students may go undetected because of the lack of efficient diagnostics for this age. Even if detected, a one-size fits all intervention is inefficient (and likely ineffective) at an age when other demands on students are high—a targeted approach is more desirable. However, commonly used screening and progress monitoring instruments do not provide data educators can use to match students to a particular intervention (Burns, 2004; Gravois & Gickling, 2008). This iASK project develops a valid and reliable measure that offers a multi-dimensional profile of students' ortho-phonemic knowledge and skills. This can be used to plan targeted interventions, yielding better student outcomes. Such targeted ortho-phonemic assessments can provide an important leg-up for middle school with these deficits. Once they master word recognition, they can more easily achieve comprehension, and targeted instruction is associated with improved student outcomes (Calhoon & Petscher, 2013). Unfortunately, having valid and accurate measures does not guarantee that teachers will understand how to use them to improve in reading outcomes (VanDerHeyden, Witt, & Gilbertson, 2007). Thus, we also develop reporting tools and resources to improve teachers' ability to plan targeted interventions.

Design of the iASK: Product and Implementation

Implementation.

iASK will be implemented in a computer-based, shared source framework and delivered over the internet to multiple platforms (tablets and computers running Windows, iOS, Android, and MacOS). Students are assigned logins by their teacher or assessor. Student progress is tracked and stored on an encrypted centralized server. Once students log in, they work through a series of short blocks of 20 trials/task and receive encouragement throughout (not contingent on responses). When students log out, progress is bookmarked, so they can complete iASK across multiple sessions. Teachers are automatically kept apprised of students' progress. The final iASK will email interpretative reports and visualizations of student performance directly to the teacher.

This computer-based format offers significant advantages. It allows delivery of more tasks and items than in-person or paper/pencil assessments by minimizing transition time and speeding responding. The ability to save students' progress and pick up where they left off enables longer testing to be flexibly spread across several short sessions. Moreover, automated testing means that minimal staff time is needed. Scoring and assessment can also be conducted with high fidelity, and we will develop automated tools for visualizing results to ease interpreting the complex profile of a student. Finally, by delivering materials over the internet, developers can easily modify or add tasks and items and deploy them rapidly in response to ongoing research.

Design.

iASK crosses items in which GPC regularities are embedded with tasks which tap skills. To assess knowledge of the GPC system, we average similar items across tasks; to assess skills, we average within tasks, across items. After development and testing the prototype in Phase I, we made changes to the originally proposed design. We highlight those here to illustrate the iterative development. The design described here is the version of iASK that we will test empirically in the first year of Phase II. However, this is larger than we anticipate for commercial versions. We are planning for two versions of the commercial iASK. The standard version will take 45-60 minutes and consists of the tasks and GPC regularities we find normatively most predictive. An extended version (90 minutes total) will contain additional tasks and/or GPC classes which can help form a more complete picture of any given child.

GPC Regularities.

iASK focuses largely on vowels. While most consonants have a one-to-one mapping between letters and sound (F is almost always /f/), vowels are more ambiguous. Even the short vowels (e.g., A as in BAD) have multiple pronunciations (in 353 words A is pronounced /æ/, but in 26 it is /ɑ/ as in SWAP); digraphs (EA, EI), are even more ambiguous. Thus, vowels are often problematic for struggling readers but the precise profile of vowel skills is rarely assessed (FIG. 4 for pilot data; Fowler, Liberman, & Shankweiler, 1977;

Näslund, 1999; Shankweiler & Liberman, 1972). Table 2 outlines the targeted GPC mappings. This is not comprehensive; rather it samples mappings that stress different aspects of the system, and groups them by orthographic and phonological properties. For example, diphthongs, like OI, map multiple letters to complex articulations; while digraphs map two letters onto one articulation. Similarly, we tap both the dominant and secondary pronunciations of a digraph rule (EA→/i/, but sometimes /ɛ/) to determine how students deal with overlapping regularities and exceptions.

After Phase I, we added three new GPC classes. First, of the GPC classes tested, secondary digraphs showed the strongest relationship with our outcome measure (Iowa Assessments reading comprehension; r=0.60). This suggests that non-canonical pronunciations (so-called exception words) may be highly predictive. Thus, we added secondary pronunciations to the long and short vowels. Second, as FIG. 1 shows, performance on the consonants was quite high; we thus decided to examine more challenging clusters, digraphs, and silent consonants. The final iASK may not employ all of these GPC classes. We will use the validity data from Phase II to determine the most predictive types.

Assessing Skills: Tasks.

Tasks (Table 3; FIG. 5) were selected from a set of 30 developed for the Access Code intervention and screener and for two NSF grants to the UI team (2013; McMurray & Hazeltine, 2010). These have undergone extensive testing and iterative refinement as part of these projects and Phase I.

GPC system tasks assess the ability to use GPC mappings. Items from the 8 GPC classes will be crossed with each of the 5 tasks (plus the 4 automaticity tasks which use the same words) to determine the profile of GPC knowledge. After Phase I, we realized that a critical challenge for older students is generalizing GPC knowledge to multi-syllabic words (see also, Edwards, 2008). While it can be difficult to target specific GPC regularities in multi-syllabic words, the Fill in the Blank task can do this effectively. A multi-syllabic version has been added to assess how GPC knowledge generalizes to more complex words.

Automaticity tasks assess speed and accuracy of recognizing words. In most assessments this is done by requiring a speeded response. However, students do not like speeded response tasks (which we observed in interviews for Phase I). More importantly, speeded tasks do not isolate speed in the reading-system from speed of other processes. To score well, students must speed up everything: articulatory planning, semantics, etc. Thus, we use backward masking (Perfetti, Bell, & Delaney, 1988). In this paradigm, the visual stimulus is displayed only briefly (75 msec) and then covered by a visual mask (#####), which clears low-level sensory buffers. Students are given as much time as they want to respond. Masking requires that students rapidly and automatically access ortho-phonemic codes from written words, assessing automaticity of these abilities. This can be compared to unmasked variants of the task which measure knowledge of the spelling«sound relationship. Differences between variants identify students who have knowledge but are not yet automatic (skill). Phase I testing (see preliminary data) revealed a significant performance decrement in the masked tasks, and a unique contribution of masked tasks to predicting reading scores. Thus, we added two more masked tasks. Rhyme Identification focuses on students' mapping from print to sound (rather than print to meaning as in Find the Picture). Word Verification (Multisyllabic) assesses automaticity in longer words.

Syllable usage tasks assess the ability to parse multi-syllabic words. This is critical for applying GPC knowledge in real text. In a middle school intervention, instruction in such strategies enhanced outcomes (Bhattacharya & Ehri, 2004). Items are split between words with stressed and unstressed initial syllables (the former is dominant in English).

Finally, memory and seriation tasks require students to construct words based on a sequence of letters or syllables. These tasks may be related to working memory for sequences, which predicts word learning oral language ability (e.g., Gupta & Tisdale, 2009, for a review). This skill is likely important for readers struggling to build complete representations of words.

TABLE 2

Classes of GPC regularities assessed by iASK. Classes in gray were developed in Phase I.

| Type | Example Rules | Description |
|---|---|---|
| Consonant Clusters | BR fi /bɪ/ (BRIM)<br>LT fi /lt/ (SALT) | Two consonants that are blended to make two sounds |
| Consonant Digraphs + Silent | SH fi /ʃ/ (SHIP)/<br>GN fi /n/ (GNOME)<br>NG fi /h/ (SING) | Two consonants that make a single sound. |
| Short Vowel | cAc → /æ/ (BAD)<br>cEc → /ɛ/ (BED) | Typically taught early and fairly unambiguous |
| Long Vowel | cAcE → /eI/ (BANE)<br>cIcE → /aI/ (BIDE) | Silent E. |
| Long & Short Secondary | cAcE fi /æ/ (HAVE)<br>cAc fi /a/ (SWAP) | Exceptions to the short and long vowels |
| Digraph dominant | EA → /i/ (BEAD)<br>OO → /u/ (BAIT) | The most frequent pronunciation for a digraph. |
| Digraph secondary | EA → /ɛ/ (DEAD)<br>OO → /ʊ/ (BOOK) | Less frequent pronunciation for the same digraph. |
| Diphthongs and R | OI → /oI/ (BOIL)<br>IR → /ɚ/ (BIRD) | Digraphs mapped to complex articulations. |

TABLE 3

Tasks in iASK. Tasks in gray were developed in Phase I. New tasks added after Phase I are marked with *

| Function | Task | Target | Description |
|---|---|---|---|
| GPC system (5 tasks) | Fill in the blank (vowel) | Vowels | Student hears a word, sees a consonant frame plus eight vowel options, and chooses which vowel completes the word or nonword. |
| | Fill in the blank (consonant) | Consonants | Student hears a word, sees the onset or coda plus eight consonant options, and chooses which letter completes the word or nonword. |
| | Fill in the blank (multi-syllabic)* | Vowels | Student hears a multi-syllabic word and chooses the missing letter or string. Missing letters will be targeted to specific GPC classes. |

TABLE 3-continued

Tasks in iASK. Tasks in gray were developed in Phase I. New tasks added after Phase I are marked with *

| Function | Task | Target | Description |
| --- | --- | --- | --- |
| | Change the word/nonword | Vowels | Student sees consonant frame with eight vowel options and changes the vowel in one word/nonword to make another (change the vowel in CAT to make COAT). |
| | Find the word/nonword | Vowels + Consonants | Student hears a word or nonword and selects that word from eight displayed alternatives. |
| Automaticity (4 tasks · masked or unmasked) | Word verification | Vowels + Consonants | Student hears a word or nonword followed by the orthography and decides whether they match. |
| | Verification (multi-syllabic)* | Vowels + Consonants | Student hears a multi-syllabic word (or nonword) followed by the presentation of the orthography and decides whether they match. |
| | Picture matching | Vowels + Consonants | Student sees a word accompanied by four pictures and selects the picture that corresponds to the printed word. |
| | Rhyme Identification* | Syllables | Student sees a word or nonword accompanied by 8 response words and selects the word that rhymes. Response words will employ different GPC regularities that potentially make the same sound (e.g., GRAIN and CRANE). |
| Syllable usage (3 tasks) | Syllable ID: Auditory | Syllables | Student hears a multi-syllabic word (e.g., COMPUTER) and identifies the second (or first or third) syllable. Choices include the correct syllable (COM), letters from the word that spanning a syllable break (MPU), an incorrect syllable from the word (TER), a mismatching string (DRO), or an impossible string (VTI). |
| | Syllable ID: Visual | Syllables | Same as above but with purely visual presentation of the word. |
| | Syllabification verification | Syllables | Student hears a spoken word (COMPUTER), sees a syllabified version (COM PU TER), and indicates whether this is correct. |
| Memory & Seriation (2 tasks) | Syllable order | Syllables | Student hears a multi-syllabic word (COMPUTER) and sees possible syllables. Selects syllables in the correct order to construct the word. |
| | Spell the word | Vowels + Consonants | Student hears a word and sees blanks corresponding to each letter. Selects letters in the correct order to construct the word. |

Generalization.

Fluent reading requires students to automatically cope with thousands of words and flexibly deploy many skills. Thus, it is not possible to explicitly teach every skill and type of word. Assessing generalization is critical. iASK does this in several ways. First, its large set of tasks requires students to do a variety of novel things with letters and sounds. Second, iASK uses nonwords, which are novel to the students, in addition to real words. The word/nonword distinction is not a pure measure of generalization as familiarity is confounded with semantics. But nonwords isolate the ortho-phonemic route and, thus, offer insight this specific pathway coupled to a measure of generalization. Finally, iASK uses both mono-syllabic and multi-syllabic items to assess how knowledge and skills generalize to more difficult contexts.

Library of Items and its Development.

iASK uses a library of items (words and/non-words) that can be inserted into the tasks. Items are developed in an iterative process by the McMurray lab, which has extensive experience developing items for psycholinguistic assessments of word recognition (e.g., McMurray, Samelson, Lee, & Tomblin, 2010). Word lists are developed by a team of graduate students, and carefully reviewed by Dr. McMurray for frequency, orthographic regularity, and distracting elements (silent letters, low frequency consonant clusters, etc.). They will be further validated relative to standardized measures during the proposed research, with consultation from a psychometrician. Recordings are made for each word by a phonetically trained speaker in a soundproof room. These are validated in a multi-step process: multiple tokens are recorded; the clearest is selected, and minor edits are made to eliminate clicks, etc. Pictures are developed by downloading 5-10 images for each word from a commercial clipart database; a focus group of undergraduates then selects the most prototypical; and this is edited to ensure uniform color, remove extraneous elements, and so forth. The library currently includes almost 500 words and 250 nonwords evenly split between the 5 GPC-classes of Phase I. Pictures have been created for about 200 words. In Phase II, we will add items for the new GPC-classes, and for response sets. We also have compiled a list of about 380 multi-syllabic words to be completed during Phase II. We estimate we will need 660 mono-syllabic and 440 multi-syllabic words to ensure words are not repeated. Commercial versions are unlikely to need this many items, but this library offers flexibility to choose the optimal items based on validation data.

Design.

The research version of iASK has 18 tasks (14 tasks plus the 4 masked variants). Each task is run in 3 blocks of 20 trials (60 trials/task) totaling 1080 trials. Testing with the prototype suggested students can perform a block of trials in 1.75 minutes (SD=0.23 min), with minutes (SD=0.06) to transition between blocks. Thus, testing should require 4-5 30 minute sessions. Surveys and focus groups suggested that teachers and students felt this amount of time was appropriate. Within the 60 trials/task, items are split between GPC classes. With 11 tasks targeting vowels (Table 3) this offers 110 items per GPC-class (11 tasks·60 items/6 vowel classes). For consonants tasks there will be about 200 items per GPC-class (6 tasks·60 items/2 consonant classes). Items will be randomly selected from the library. While the initial plan was to use words and non-words in different blocks of trials, they were interleaved in Phase I, and students did not find this challenging. This is preferable psychometrically, so this strategy will be used in iASK. The assignment of items to tasks and the sequence of trials are stored in a "lesson". This can be randomly generated for each student, or can be saved to create "forms" of iASK similar to the multiple forms of most standardized assessments.

Eighteen tasks are more than will be used in the commercial iASK. To streamline the commercial iASK, we will determine which tasks and GPC classes are most predictive of reading competency. We will use this to determine the optimal set for the short version (anticipated to be 45-55 min, across multiple sessions) and to identify additional tasks/GPC classes for the extended version (90 minutes total). We will eliminate tasks/GPC classes that do not contribute to the instructional utility of iASK. These time estimates are comparable to other diagnostics, and we will explore the optimal length using qualitative and survey methods.

Outcome Measures.

This design offers a rich set of outcome measures. First, we cross items and tasks for independent assessments of GPC knowledge and skills. Accuracy as a function of the GPC type (averaged across the relevant tasks) will reveal students' capacity for using different classes of GPC regularities; accuracy as a function of task (across GPC-types) estimates students' skills with sounds and letters. We will perform PCA across tasks to identify common skills spanning tasks. Second, for almost all tasks, response options can be manipulated for errors analysis. For example, in the Syllable ID task, errors can determine if students are struggling to identify syllable boundaries or to find specific syllables. Third, differences between task variants will be informative. For example, the difference between masked and unmasked tasks can reveal dissociations between GPC knowledge and the ability to use it automatically. Finally, we assess generalization by comparing word and non-word versions of a task. As all of the measures are proportional, we will apply transformations like the empirical logit to scale the data for analysis. During Phase II, we will relate standardized assessments of reading to these kinds of outcome measures to validate them and identify the most predictive.

Reporting.

For these measures to be useful to teachers, they must include a framework for using them to make informed decisions about instruction. We thus will develop an interactive reporting tool (complete with printing) that allows teachers to explore the profile of a student or group of students, and link their results to examples of tasks and items. This interactive format will improve the teachers' ability to map iASK measures to instructional decision making Related Research and Development.

Prior Research and Development.

In 2006, the inventors began developing, testing, and refining a theoretically-driven model for reading intervention. Access Code (identified supra.) is a supplemental computer-based ortho-phonemic intervention built on a theoretical model that treats reading as a constellation of flexible skills. iASK uses a similar technical platform and a similar constellation of tasks. The use of Access Code in 40+schools attests to the usability of this platform.

Simultaneously, a series of NSF funded basic science studies (Hazeltine & McMurray, 2013; McMurray & Hazeltine, 2010) used a modified version of the Access Code platform. The first project tested 220 first graders in a short-term study that applied learning principles from cognitive science to the acquisition of GPC mappings. Contrary to standard teaching practice, it revealed that children form more robust and generalizable GPC mappings when irrelevant letters are variable, rather than similar (Apfelbaum et al., 2013). This supports the model of reading as a skill as skill learning has been consistently shown to benefit from variable practice (Magill & Hall, 1990; Wulf & Shea, 2002).

Extensive research has therefore been done on the use of these tasks to capture individual differences, including a series of 19 tasks as part of the NSF grants to look at correlational structure of ortho-phonemic skills among children. And the inventors implemented a pre- and post-intervention screener in Access Code for middle school students built on these tasks. This screener has been used by over 1315 students and yielded preliminary data for iASK.

Results of Phase I Research and Development

What was Developed?

Our efforts in Phase I far exceeded what was proposed. We developed a complete functioning prototype of iASK in a flexible shared source technology platform. This included the login screens, navigation, and the database back end. We also developed 8 complete tasks and code to randomly assign items to tasks. Finally, we developed a library of over 800 items (words/non-words, sound-files, and pictures for a subset) balanced among GPC types. This resulted in a fully functional application that was run over the internet to test students in groups of 10 students in a real middle school. All the engineering was done with current staff (Soride & Van Hoosier) with item selection and norming by others.

Testing the Prototype.

This prototype was tested on 59 students at Roosevelt Middle School in Cedar Rapids, Iowa, in November, 2014. Our research included testing on two versions of the iASK prototype, direct observation of the students by a qualitative researcher, and surveys and focus groups (on students and teachers). During focus groups, we also piloted versions of new tasks. The goals of this research were to 1) assess feasibility and usability of iASK in a middle school setting; 2) to determine if tasks were sufficiently difficult; 3) identify parametric ways to manipulate difficulty without sacrificing fidelity to the assessment model; 4) identify differences among tasks and/or GPC-classes that may be diagnostic; 4) conduct a preliminary analysis of the reliability and validity of iASK; and 5) assess masking as a tool for evaluating automaticity.

Participants.

59 $6^{th}$-$8^{th}$ grade students (32 female) participated. They were purposefully sampled from two ability ranges (based on Iowa Assessments): $1^{st}$-$40^{th}$ percentile (N=47), $41^{st}$-$60^{th}$ (N=12). 77% were eligible for free/reduced price lunch; 12.9% had an IEP. 16 students (selected by stratified sampling) and 6 teachers (chosen by the school) took part in focus groups.

Design.

Students were tested over 3 days in groups of 10-20. Daily testing was limited to 25 minutes. After the third day of testing, students completed a usability survey over the web. Two focus groups of 8 students were held at the end of testing. Pilot version of iASK included the 8 tasks and 5 GPC-types in gray in Tables 2-3. After two days of testing, students completed at least 40 trials of each task. We were concerned that tasks were not difficult enough to have diagnostic sensitivity, so we identified and modified parameters for increasing the difficulty of most of the tasks. Students then underwent an additional day of testing on the new versions.

Qualitative and Survey Results: Feasibility and Usability.

Direct observation suggested that students took the tasks seriously and were motivated to complete them. Surveys confirmed this. About 85% of students reported that they took the tasks seriously and found the directions easy to follow; and all teachers reported that students gave their best effort. Focus groups and surveys suggested that both teachers and students found the tasks and interface highly usable. Students also identified changes to improve usability, which we will incorporate in Phase II. Finally, sample reports of student performance were discussed at the teacher focus group, and a number of key properties of the reporting system were identified for development in Phase II.

Results: Difficulty Level.

Although Change the Word and Fill in the Blank-Vowels showed Gaussian distributions centered at 83%, others tasks were closer to ceiling. It was important to raise difficulty without sacrificing fidelity to the model of skills or GPC-types. For example, using multi-syllabic words would clearly increase difficulty, but would also make it difficult to pin performance on one GPC-class. We found we could increase difficulty without changing tasks or items by changing the response options. For example, in Find the Picture we chose items for the foil pictures that overlapped with the target word by one or more letters. Similar manipulations were made for most tasks. These were tested on a third day. This reduced performance by about 4.3% ($p<0.0001$, FIG. 6). These manipulations were limited by the items in the library. In Phase II, we will add more items to more effectively control difficulty.

Results: Differences among GPC-classes and tasks.

We performed extensive analyses to ask if performance differed among GPC-classes and tasks. Reliable differences were observed among GPC classes ($p<0.0001$): performance was better on short and long vowels, poorer on digraphs and diphthong/R-controlled vowels, and good on secondary digraphs. Students performed poorer on non-words than words ($p<0.0001$). There were also significant differences among tasks ($p<0.0001$). These differences are suggestive of avenues for identifying multiple dimensions of student performance, and Phase II will investigate their predictive potential.

Results: Validity & Reliability.

This study was not intended to assess validity and reliability, but we were able to obtain a prior year's Iowa Assessments Reading Comprehension scores to compute retrospective validity. We found a remarkably strong correlation between average iASK accuracy and Iowa Assessments ($r=0.58$, $p<0.0001$; FIG. 7). This is notable because half of our students likely had comprehension deficits (the target of the Iowa Assessments) without an ortho-phonemic deficit (the target of iASK). Split half reliability was $r=0.87$ for overall accuracy. Reliability within GPC-types averaged $r=0.62$, and within individual tasks it averaged $r=0.61$. These unanticipated results show the effectiveness of even a reduced version of iASK.

Results: Automaticity.

A critical aspect of iASK is its ability to dissociate automatic skills from GPC knowledge. One way we achieve this is the masking tasks. In masked tasks orthographic codes must rapidly activate phonological ones for an accurate response; while in the unmasked variants stimuli are present throughout. We found a significant decrement of 6-7.5% for the masked variants ($p<0.0001$; FIG. 8). A hierarchical regression showed that the masked versions masked versions of each task predicted significant variance in Iowa Assessments over and above the unmasked version alone (Find the Picture: $R^2_D=0.096$, $p=0.004$; Verify: $R^2_D=0.067$, $p=0.026$), suggesting that these measures of automaticity contribute something unique over and above knowledge on the same types of items. This validates a key theoretical construct of iASK. Due to this success, we are adding two new masked tasks to iASK for Phase II for a more complete assessment of automaticity.

Summary of Phase I.

Phase I activities met or exceeded objectives in every domain. We developed a fully functional prototype and tested it on a large number of adolescents. Students and teachers found it highly useable, and the measure showed strong reliability and validity. We validated the key theoretical underpinning of iASK, the dissociation between skills and knowledge, and identified numerous opportunities for improving iASK.

Phase II Technical Objectives

The objectives of Phase II include full development of iASK (student and teacher applications), refinement through iterative development with users, and validity and reliability testing. Development objectives are:
1) Development of a scalable application to deploy in IOS, Mac OS, Android and Windows.
2) Iterative development and integration of all tasks and items for iASK.
3) Development, and testing of an online user-friendly guide and teacher reporting tool.
4) Development of configuration tools to enable rapid changes to task parameters and items.
5) Testing (internal & external) on multiple platforms (tablets, laptops, computers) Objectives for evaluating validity and reliability of the diagnostic (necessary conditions for marketability) and iterative refinement of product:
6) Assessment of iASK's validity relative to standardized ortho-phonemic assessments.
7) Assessment of test-retest reliability of iASK.
8) Identifying iASK measures that best predict reading competency for teacher reports.
9) Use of results to select tasks and items for standard and extended versions of iASK. Objectives for evaluating usability and feasibility for middle school students/teachers
10) Qualitative assessment of usability and feasibility (students and teachers).
11) Qualitative assessment of teacher guide and reports for informing instructional decisions.
12) Qualitative assessment of congruence between iASK measures and teachers' conceptions of their own struggling readers.

Work Plan

The complete iASK will have a student application and a teacher application (enrollment, reports, interpretation guides). Technology development will be conducted in two phases. The team will continue to develop iASK in the HTML5/java script framework (Wakanda) that was successfully utilized in Phase I. This framework enables flexible and efficient iterative development. Next, Digital Artefacts will convert student and teacher apps into a scalable HTML5 framework to robustly support large numbers of users.

In Year 1, the student application will be completed and tested and the teacher application will be specified and piloted. During Months 1-2, FIL will develop protoypes of the teacher reports using the Phase I data; Digital Artefacts will update the student user interface and design the teacher interface; and the another team will collect and test the additions to the item library. We will develop and test the new assessment tasks, and the team will conduct a small test with students to calibrate task difficulty. At this point we will assemble all iASK tasks into a single tool in Wakanda. The first large-scale study (Wave 1) will be conducted during months 10-12 to test usability, validity, and reliability of iASK and the usability of the prototype reporting tools.

These results will be used to iteratively refine iASK and its reports. We will use a Wave 1 results to determine the most predictive measures for reporting to teachers, and to cull the tasks and items for the standard and extended commercial versions. Final specifications will be written in Month 11, when Digital Artefacts will develop the student application of iASK in a scalable platform. This extended version of iASK will be tested in a second wave of research with a new set of 200 students. Concurrently, Digital Artefacts will implement 1) the teacher user-interface and navigation for student enrollment and reporting; 2) the back-end database; 3) the student application; and 4) the configuration modules which enable parameters of iASK to be flexibly reconfigured. We will provide complete specifications for development and will conduct iterative testing for product acceptance. After Wave 1 we will also modify teacher report specifications to reflect the new outcome measures. In Month 11 we will begin developing the teacher guide, including video and report interpretation. These specifications will be implemented by Digital Artefacts during Months 12-18 and integrated into a single application with both teacher and student applications. These will be tested with teachers during Month 23.

Research Plan: Usability, Validity and Reliability

A quantitative assessment of the reliability and validity of iASK will be used to validate that it assesses what it is intended to measure, and to fine-tune it to best predict reading outcomes. Well-documented validity and reliability is also essential for viability in the marketplace.

No current assessment offers as precise a measure of students' understanding of the GPC system and the skills needed for word recognition as will iASK. Thus, we cannot address the validity of iASK with respect to our theoretical model. However, it is crucial to benchmark iASK against existing outcome measures, and our research will do so against a range of instruments. We will also use validity data to refine iASK during development. As described, the initial version of iASK will include more tasks and items than will be used in the commercial versions, and benchmark measures will help select the most predictive items and tasks for each version. Thus, our study entails two waves of testing. The first will refine the measure, and the second will validate the new, streamlined versions. Such testing will impact the scientific literature by revealing the skills and knowledge that predict individual differences in struggling readers.

A critical issue identified in Phase I was the level of difficulty of the tasks: if performance is too high (or low), it will be difficult to detect differences among students. For the tasks in Phase I, we are confident we are at an appropriate level of difficulty or can easily refine them to achieve it. For the new tasks, we start with a small study to iteratively calibrate difficulty.

Preliminary Study: Calibrating Level of Difficulty of New Tasks

Study Sites and Sample.

The research will be conducted in the Cedar Rapids (Iowa) Community Schools. Our sample will consist of 60 middle school students (grades 6-8) who struggle with reading. Cedar Rapids uses the Iowa Assessment (formerly ITBS; Riverside Publishing) to assess middle school reading. For recruiting purposes, students scoring below the $40^{th}$ percentile on the prior year's assessment will be classified as struggling readers.

Research and Iterative Development.

Students will participate in four 25 minute sessions, completing two (20 trial) blocks of each new task. After this, any tasks and/or GPC-classes with accuracies near 0 or 1 will be identified. We will alter their lessons by changing the similarity of the foil responses to the correct one, the sequence of trials, the time before the masker, or the number of responses. Three more testing sessions will be used to validate these changes.

Reliability and Validity Testing

The primary research examines the validity and reliability of iASK in two waves. Wave 1 assesses 200 middle school students on iASK and a battery of standardized measures. Half of this cohort will be tested on iASK twice to compute reliability. Survey-based, observational, and focus-group research will also be conducted to assess usability. Wave 2 assesses a new cohort of 200 students on the final iASK to document its validity and reliability.

Study Site and Sample.

Each wave of testing will assess 200 middle readers in the Cedar Rapids schools who did not participate in the calibration study. As in Phase I, we will use stratified sampling in which 70% of students are struggling readers ($1^{st}$ to $40^{th}$ percentile), and 30% are in the low-to-mid-normal range ($40^{th}$-$60^{th}$). This is to ensure iASK discriminates struggling from typical readers. Within groups, sampling will be random. We are using district assessments only for sampling purposes; we will conduct detailed reading and language assessments as our outcome measures. Within the struggling readers, we will not target students with word recognition problems, as one goal of iASK is to identify which struggling readers might benefit from ortho-phonemic intervention. Cedar Rapids has 6 middle schools with 3,566 students (524 special education). We anticipate 1426 struggling readers (<$40^{th}$ percentile), of which approximately 47% (670) will have ortho-phonemic deficits.

Sample Size and Power.

Analysis will use variants of hierarchical regression. However, reliability and validity are typically expressed as simple correlation coefficients. Power analyses based on this approach assume clinically reliable correlations of $R\ddagger0.70$ and suggested 29 students for a power of 0.8. As our analysis will examine multiple predictors and outcomes, we overpower this study with 200 students/cohort to accommodate a multivariate analysis of up to 10 regressors (Harrell, 2001). This offers a power of 0.86 to detect an R>0.30.

Study Design.

During Wave 1, students will participate in 4-5 30 minute iASK sessions over consecutive school days. This will be followed by one 30 minute session of standardized reading and language assessments conducted individually by an examiner. There will also be one 60 minute group session for two assessments. One month later, 100 students will return for 3-4 more sessions of iASK to assess test-/retest reliability. Wave 2 replicates this design with a new cohort of 200 students. We anticipate fewer sessions (3-4) as we will use the Wave 1 data to select key tasks in iASK. Standardized assessments will be conducted by a trained RA in a quiet room at the students' school. In small groups, students will individually complete iASK using tablets in designated classrooms, and wear full-ear headphones to minimize interference.

Measures.

We will employ a range of measures of reading outcomes, along with language and non-verbal abilities (Table 5). We will use two sub-tests of the *Woodcock Johnson Reading Mastery Test Revised Normative Update* (WRMT-NU: Woodcock, 1987). Decoding is assessed with the Word attack subtest in which students reads aloud nonsense and low frequency words. Word Recognition is measured with the Word identification subtest in which students read aloud familiar words on a test easel. We measure fluency with the Oral Reading Fluency (ORF) subtest of the EasyCBM (Alonzo & Tindal, 2009). Students read passages aloud and are scored on rate and accuracy in one-minute. We assess syllable parsing with the counting syllables subtest of the *Lindamood Auditory Conceptualization Test* 3 (LAC-3: Lindamood, 2004). In this task colored felt pads are placed in front of the student, and the student segments a nonword while pointing to the number of pads needed to represent each syllable.

We use two group measures to assess higher level reading. Vocabulary and comprehension are assessed with the *Gates-MacGinitie Reading Tests* (GMRT, 4th Edition: MacGinitie, MacGinitie, Maria, Dreyer, & Hughes, 2000) which has standard passage comprehension and vocabulary tasks. We will use the Test of Silent Contextual Reading Fluency (TOSCRF; Hammill, Wiederholt, & Allen, 2006) which asks students to segment sentences that lack spaces. This taps both incremental sentence processing, and orthotactic knowledge.

In addition to reading measures, we will use a backward and forward digit span task to quickly gauge working memory. We have developed a video based version of this in which a clinical psychologist presents this task over a computer. We expect this measure to be related to the memory and seriation tasks, and a useful proxy for general non-verbal ability. Similarly, we use the Peabody Picture Vocabulary Test (PPVT: Dunn & Dunn, 1997) to estimate oral vocabulary and will adopt a computerized version of this to save examiner time.

TABLE 5

Measures for assessing validity of iASK.

| Construct | Test | Sub-test | Time (min) |
|---|---|---|---|
| Decoding | WRMT-R/NU | Word Attack | 10 |
| Word Rec. | | Word ID | |
| Fluency | easyCBM | Oral Reading Fluency | 5 |
| Multi-syllabic processing | LAC-3 | Counting Syllables | 5 |
| Working Memory | Digit Span | Forward & Backward | 3 |
| Oral Vocabulary | PPVT | | 10 |
| Reading Vocab. Comprehension | GRMT | Vocabulary Comprehension | 55* |
| Sentence Comp. + Orthotactics | TOSCRF | | 3* |

*indicates the measure is group administered

Statistical Analyses.

We will use a number of statistical techniques to assess the reliability and validity of iASK and to refine its measures. We will use simple correlations to compute validity against standardized measures and test-retest reliability. To obtain a deeper understanding of the multiple iASK measures, we will conduct multivariate regressions. In these analyses we first use correlation to identify collinearity among the predictor variables (iASK) or within the reading assessments and use principal component analyses or residualized scores to eliminate it. Next, we will predict standardized scores from iASK measures with multiple regressions accounting for demographic factors (gender, SES, grade) and covariates (working memory, oral vocabulary) and the range of iASK measures. We will also use latent class analysis (LCA) and hierarchical clustering to identify subgroups of students from these measures.

We anticipate deriving a variety of measures from iASK. These include average performance within GPC-classes (across tasks) and within tasks (across GPC classes), and derived measures using difference scores (e.g., speeded vs. unspeeded versions of the same tasks; words vs. nonwords) or classes identified from LCA and clustering. These will be fine-tuned to maximize validity. Although this strategy bears a risk of over-fitting the data, the second wave of data collection will assess these measures on an independently collected sample to minimize this risk.

Potential Problems.

Participant attrition due to sickness and snow days (etc) are potential problems. We will over-recruit participants and build make-up days into the schedule to avoid this. We also anticipate possible networking issues at the schools, limiting our ability to test multiple students simultaneously. This was solved during Phase I with a mobile web server. Finally, we are concerned about the amount of student time required for these studies and we have worked closely with the Cedar Rapids administration to ensure this is not a problem.

Qualitative Analysis for Usability and Teacher Interpretation

We will conduct a qualitative analysis of student/teacher experiences to fine tune iASK. These studies will be a key input in developing teacher tools (admin, reporting, interpretation guidance) and contribute to the literature on computer-based diagnostics in middle school struggling readers. Our goals are to 1) evaluate the new tasks and items for student usability and for their importance in evaluating reading; 2) establish the feasibility of implementing the complete iASK in natural middle school settings with a large sample; 3) evaluate the usability of the teacher tools for supporting implementation of iASK and instructional decision-making based on students' results. This entails evaluating not just the measures and reports, but also teachers' concepts of their own struggling readers and how these measures inform or conflict with it. Qualitative analysis will use surveys and direct observation of students; and teacher focus groups that focus on implementation, reporting, and instructional decision making.

Research Questions.

Our research questions include: 1) Can students understand and follow directions for completing the new assessment tasks? 2) Do students take the complete diagnostic seriously? 3) Do teachers find the computer-based assessment easy to implement within the classroom? 4) Can teachers navigate the tools to find and use information on administration, reporting, and instructional planning? 5) Do teachers understand how to use individual and group results to inform their planning of targeted interventions? 6) Do the measures and reports challenge or confirm teachers' beliefs about their own struggling readers' abilities?

Sample.

Approximately 200 students and 24 teachers (6/school) will participate in this study. They will come from students and teachers in the quantitative study (balanced by school).

Measures.

We will employ three methods. Direct observations. During the two waves of iASK testing and four pilots of teacher tool iterations, we will observe students and teachers to tally the number of requests for assistance for each assessment task or tool feature. We will also record engagement using a time series design adapted from (Edmonds & Briggs, 2003; Kamil et al., 2008; Wexler, Reed, Barton, Mitchell, & Clancy, submitted). Survey. Following iASK testing and teacher tool piloting, students and teachers will take a survey querying engagement, understanding, and task/tool appropriateness. Surveys will be designed to provide rapid feedback for product refinement and to highlight areas that might be probed during focus groups. Surveys will be delivered electronically to facilitate data coding and decrease attrition. Focus Groups. To better understand how teachers use the tools, we will convene focus groups. We use focus group format over one-on-one interviews to obtain quicker, more targeted data for speeding development. Peer pressure challenges participants, helping to identify conflicting opinions and stimulating richer, co-constructed insights (Kitzinger, 1995). Focus groups give participants time to reflect and allow peers' statements to stimulate further responses, eliciting more critical comments than would be offered individually (Watts & Ebbutt, 1987). Following Kidd and Parshall (2000), a skilled person will moderate with a research assistant recording the order of speakers and nonverbal behavior. Focus groups will be recorded to verify the accuracy of field notes, capture comments from multiple speakers at a time, and enable the weaving together of verbal and nonverbal data. Teachers will be nominated by administrators based on their role in providing reading instruction to students.

Data Analysis.

Observation and survey data will be analyzed descriptively and focus group data will be analyzed qualitatively with thematic coding.

Potential Problems.

Surveying students immediately after iASK may make them prone to fatigue, reducing the quality of feedback. Thus, we will keep the survey brief with no more than 15 items multiple choice or rating-scale items. Focus groups can increase an individual's tendency to provide input consistent with group norms (Carey & Smith, 1994). We mitigate this using a trained moderator, who is experienced at eliciting comments from all participants, probing for divergent responses, and minimizing the suppression of alternative viewpoints.

Project Value, Expected Outcomes, and Impact

The potential of iASK will be a function of at least:

Its effectiveness in filling a need—not filled by competitors—for isolating patterns of knowledge and skills that underlie deficits in automatic word recognition and fluency, and which can be used for planning more effective targeted interventions for struggling readers;

Expected Outcomes and Impact.

Most reading assessments focus on outcome measures like phonemic awareness; phonics, fluency, vocabulary and comprehension. These are important outcomes, but these competencies are built on a diverse set of underlying skills and knowledge that current diagnostics do not assess. Unlike most assessments, iASK differentiates what a student knows from how well she can use it. Such information is critical for dealing with the diverse causes of reading deficits in middle school students. The market supports a substantial commercial potential for iASK. Sixty-six percent of eighth grade students tested below proficient on the most recent NAEP (NCES, 2013), and about half of these have word level deficits (Cirino et al., 2013; Hock et al., 2009). Thus, an estimated 5.3 million middle school students need assessments that better isolate the deficient skills underlying their problems. There is also great opportunity at the elementary level. About one third of elementary students in grades 2-4 (4 million students), have similar deficits. Thus, we will build iASK in a flexible platform so tasks and items can be quickly and cost-effectively changed to be appropriate for lower grades.

Educators will quickly see that iASK will have a profound impact on teachers' abilities to diagnose students' needs.

This learning model has been effective in other areas of learning (Huet et al., 2011; Lively, Logan, & Pisoni, 1993; Magill & Hall, 1990; Shea & Morgan, 1979) and reading (Apfelbaum et al., 2013). It speaks directly to the needs of the target population and their inability to generalize skills. As these students have not responded to standard instruction and intervention, teachers, interventionists, and administrators are receptive to an approach based on solid science that moves beyond the same old approaches.

All stakeholders experience a "win" through iASK: Teachers "win" as they receive tools to help them identify and meet the needs of their most difficult-to-reach children; Students "win" as they build skills they can practice privately; Administrators "win" as costlier interventions and assessments are avoided; and Parents win when their children can get on the path to academic success.

An application of iASK revolves around helping students who struggle with reading and have not been reached by traditional intervention approaches. The iASK system can be developed and tested in a suite of online programs based on the Varied Practice Model. One product, Access Code, is already available. iASK will help educators identify students who are likely to require specific interventions like Access Code and will catalyze a discussion about the interaction between knowledge and skills in the development of automaticity. iASK is presently designed for middle school students, but a logical extension is a version for elementary students, which would help reduce the need for remediation in secondary school. In anticipation of the elementary school version, iASK is being built in a modular format so that appropriate grade-level tasks, word lists, and user interfaces can be easily integrated into assessments for Grades 1-5.

The iASK system offers a diagnostic assessment, based on a robust, formal model of reading and learning that differentiates deficiencies in not only knowledge, but also in skill use in a novel way. iASK will provide educators specific information about their students' deficits in the automaticity of reading skills.

In one method of implementation, iASK will be sold on a per test basis, with each test assignable to one student. Once the student starts iASK it is "consumed" and cannot be reassigned to another. This is prevented by the login/password system—clients cannot assess additional students without purchasing more tests. Customers will be required to sign a license agreement for iASK. Of course, other business models, implementations, or deliveries of the system are possible.

In one form, iASK will be delivered over the internet. This could includes all components: student software, teacher and administrator manuals, reporting, and training tutorials. But other forms of delivery are possible.

Thus, there will be little or no need for producing print materials, compact discs, etc. iASK can either be hosted on the servers of a commercialization partner, or we can host it on virtual dedicated servers such as at GoGrid.com. Software and database maintenance can be performed by our staff or outsourced.

In addition to sales of iASK, there can be fee-based teacher training and implementation services. This could be sold and delivered either by a commercialization partner, with licensing agreement and revenue stream, or by us directly.

We can, with optionally subcontractors, maintain computer equipment and software specific to, and adequate for, the development of iASK. The iASK product will use standard off-the-shelf development environments/technologies with industry standard 128-bit SSL encrypted communications. The computer equipment used in the development of iASK will be housed in standard office space with on-site technical support resources. The equipment will not include sophisticated instrumentation and does not require specialized computing facilities. It can be accomplished using standard office space, communication facilities, and access to conference rooms to accommodate small and large group meetings with subcontractors, customers, and teacher groups. However, use of other facilities is also possible which could include: secure file servers, professional audio recording, statistical and data management software (SPSS, R, SQL); sound proof child testing facilities for pilot data collection; multiple standardized tests of language and nonverbal IQ; and access to qualitative data analysis software, and to standardized assessments of reading and language for middle school.

Options and Alternatives

Alternatives or options to that discussed above are possible. For example, variations obvious to those skilled in this art will be included within the invention.

As further examples, application of the general assessment method and system to GPC is but one form of application. It can be applied in analogous ways to other rules-based systems.

Furthermore, implementation through a wide area network like the internet is not limiting to the invention. It can be implemented through local area networks or even programming on a single device.

Also, as discussed above, the specific parameters related to the rules-based system that are selected by the designer can vary according to need, desire, or other criteria. For example, the specific classes of rules and the specific tasks can vary for GPC assessment depending on a balancing of factors including academic and practical.

FIGS. 10A-C through FIGS. 25A-H provide examples of specific screen displays such as could be used in embodiments of the invention. They show how some of the tasks can be implemented and presented to a student, as well as how profiles of each student-user can be compiled and available to teachers to help plan remediation for the students. As can be appreciated, these are but a few examples. The designer of the system can make variations according to need or desire.

Initialization and Navigation

Figure 10A:
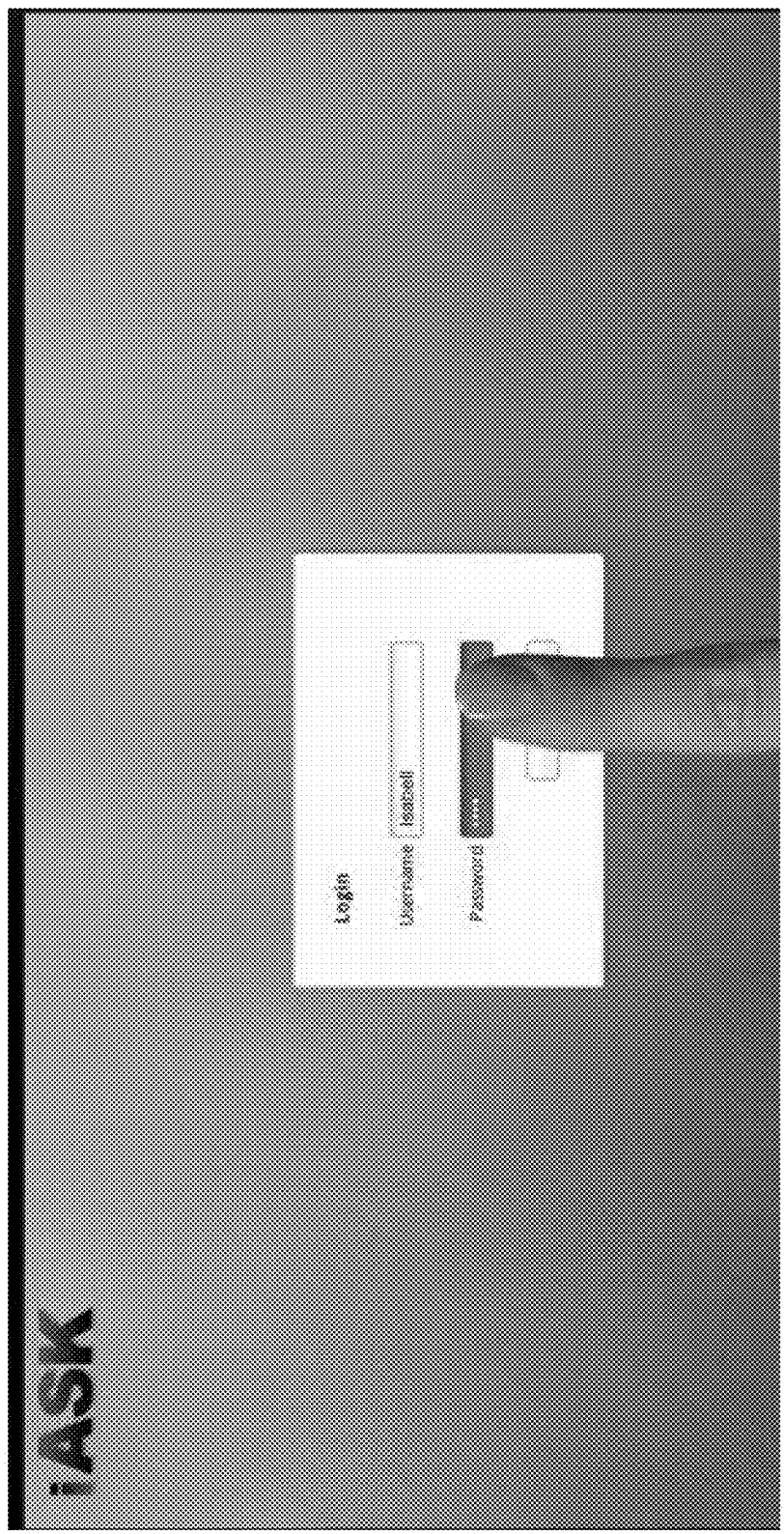
FIGS. 10A-C are examples of screen displays of the type that can be used to navigate according to aspects of the invention, namely, a student log-in screen, a level selection screen, and a task selection screen, respectively.

FIG. 10A illustrates a possible screen to allow each student to access iASK. Having a user name and confidential password allows the system to know which students are using iASK and can control access. A backend device (e.g. server) can include the main software and any needed databases.

Figure 10B:
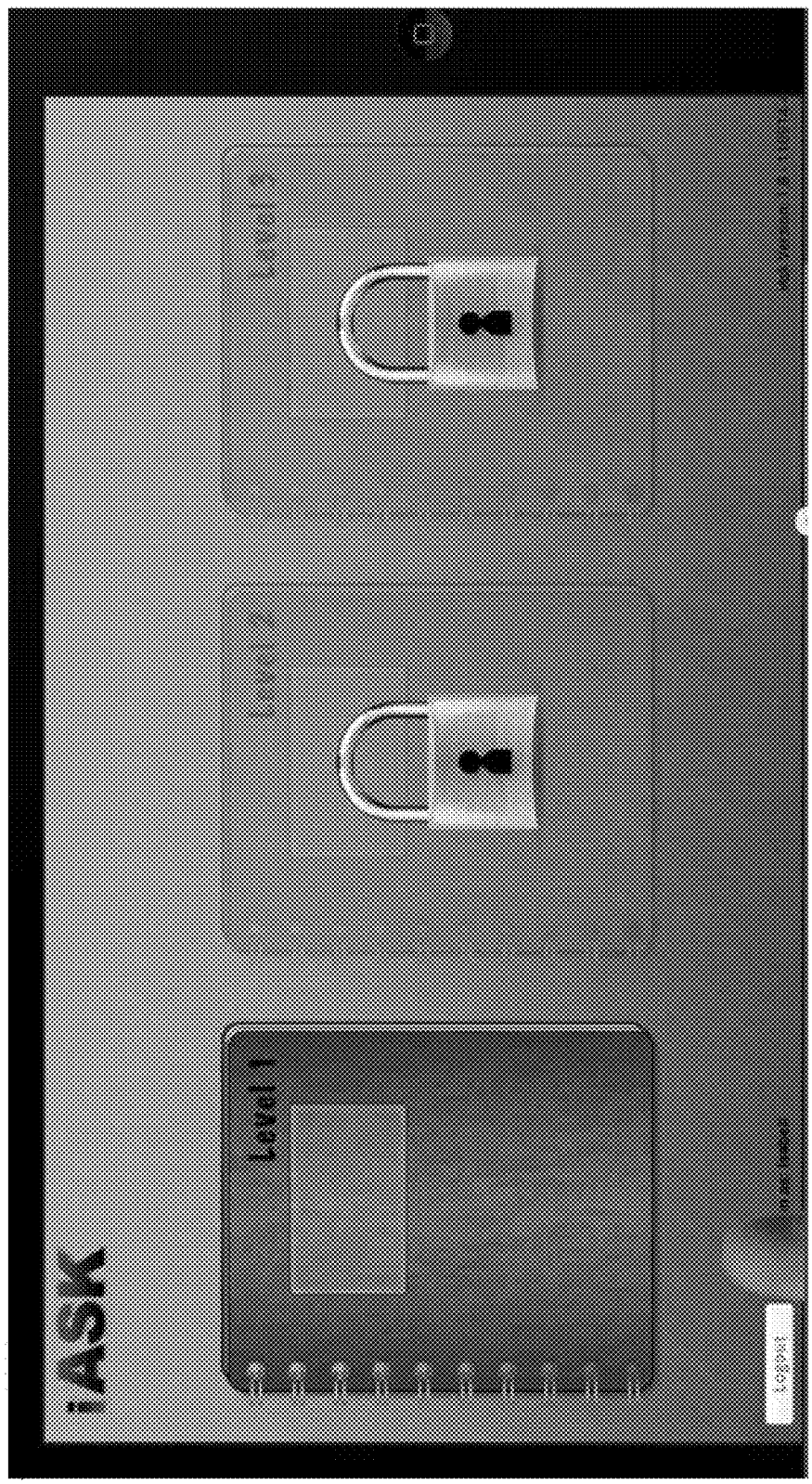

FIG. 10B depicts a possible option of iASK. If the designer wishes, different levels of complexity of tasks can be available to students and teachers. One way of using levels is to require a student or teacher to have the student start at the easiest level. If the student's performance warrants, he/she can go to the next level and so on. This could assist an initial assessment of the student by watching how easily (or not) the student progresses through levels. It could also be used in planning remediation or practice for the student. If the student progresses through all levels, but starts having difficulties, he/she might go down a level until for at least some time or practice. The levels alternatively might be differentiated in other ways. For example, the levels simply might contain different sets of tasks or different libraries of available words, nonwords, pictures, recorded pronunciations, options, etc. Each level may contain generally a similar number of tasks or blocks of tasks, but such is not necessarily required. The software can be adaptive, including in the sense the tasks or words can get easier or harder based on the student's decoding ability.

Figure 10C:
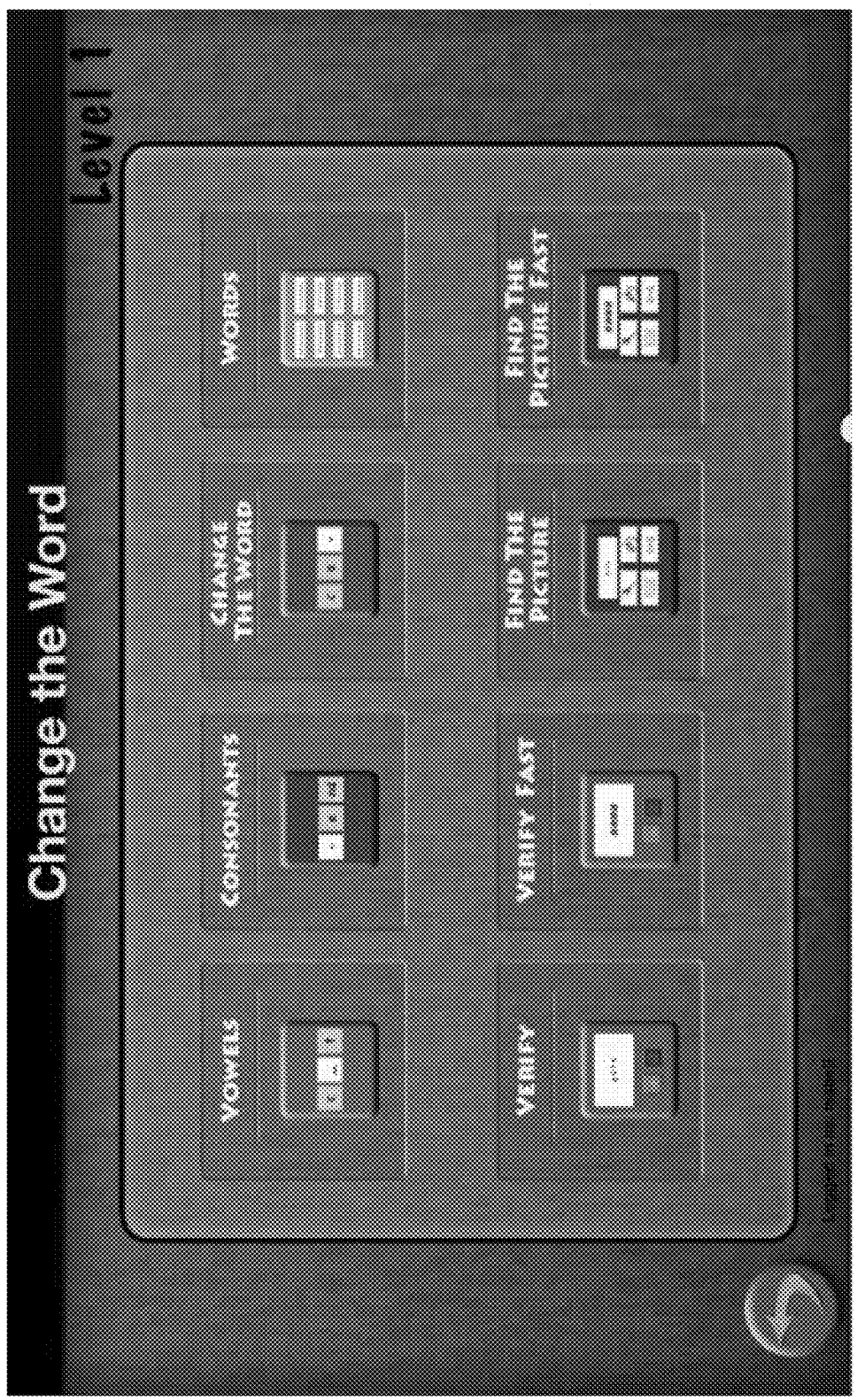

FIG. 10C illustrates a navigation screen once a level has been selected. In this example, eight different types of tasks are presented. These can match up generally with the pre-determined tasks designed for the particular embodiment, or can match identically. FIG. 10C shows a general matching to either the task sets of FIGS. 9B and 9C, or those of the Specific Example 1 discussed earlier. This shows how a user of the system (e.g. a student) can have some selection over what he/she wants to access and/or gives the teacher options for guidance and remediation according to a student's profile.

Tasks

FIGS. 11 to 24 give specific examples of possible screen displays for tasks such as are discussed relative to FIGS. 9B and 9C, or the Specific Example 1, above. Reference can be taken to that description and Table 3 for details.

Figure 11:
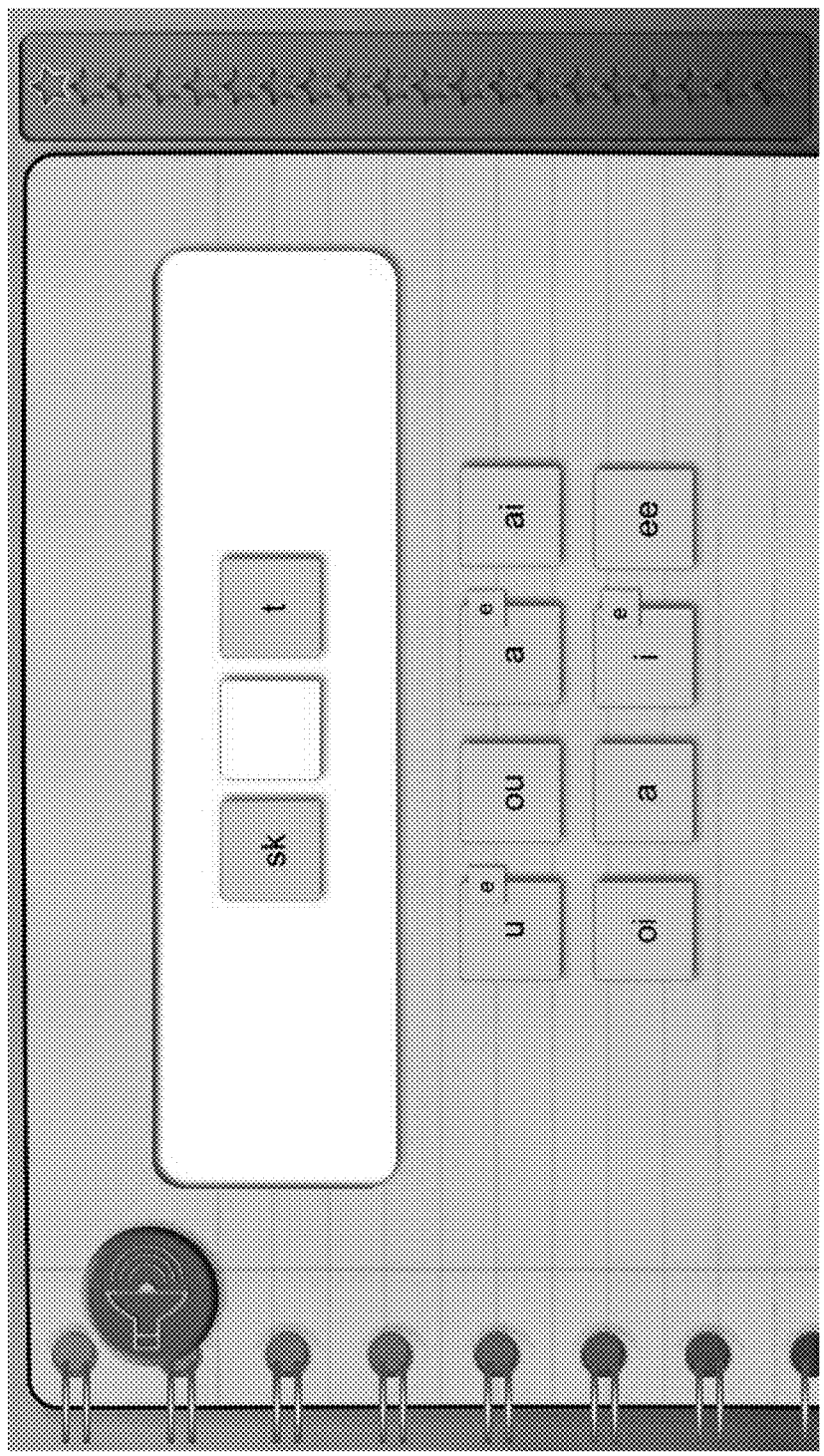
FIGS. 11-24 are examples of screen displays of the type that can be used for the fourteen different tasks listed in the Specific Example 1 embodiment (iASK) according to aspects of the invention. The chart below lists these Figures relative to the tasks listed in Table 3, infra.

FIG. 11—Fill in the Blank (Vowel)

The student pushes the "speaker" button (upper left corner) to have a word audibilized. Thereafter, it is displayed but missing one or more vowels. The screen gives plural choices to match the pre-recorded, pronounced word. Alternatively, the program could automatically play the pronunciation followed by its display absent the vowel(s).

FIG. 11 shows presentation of a GPC system task for "fill in the blank—vowels". See Table 3 from Specific Example 1, supra. The word at issue is audibly presented to the student (via a speaker associated with the student's computer). The student is visually presented with a partial word and must select a vowel for the blank from a set of 8 possibilities. Note that the button in the top-left corner allows the student to replay an audible version of the word.

Figure 12A:
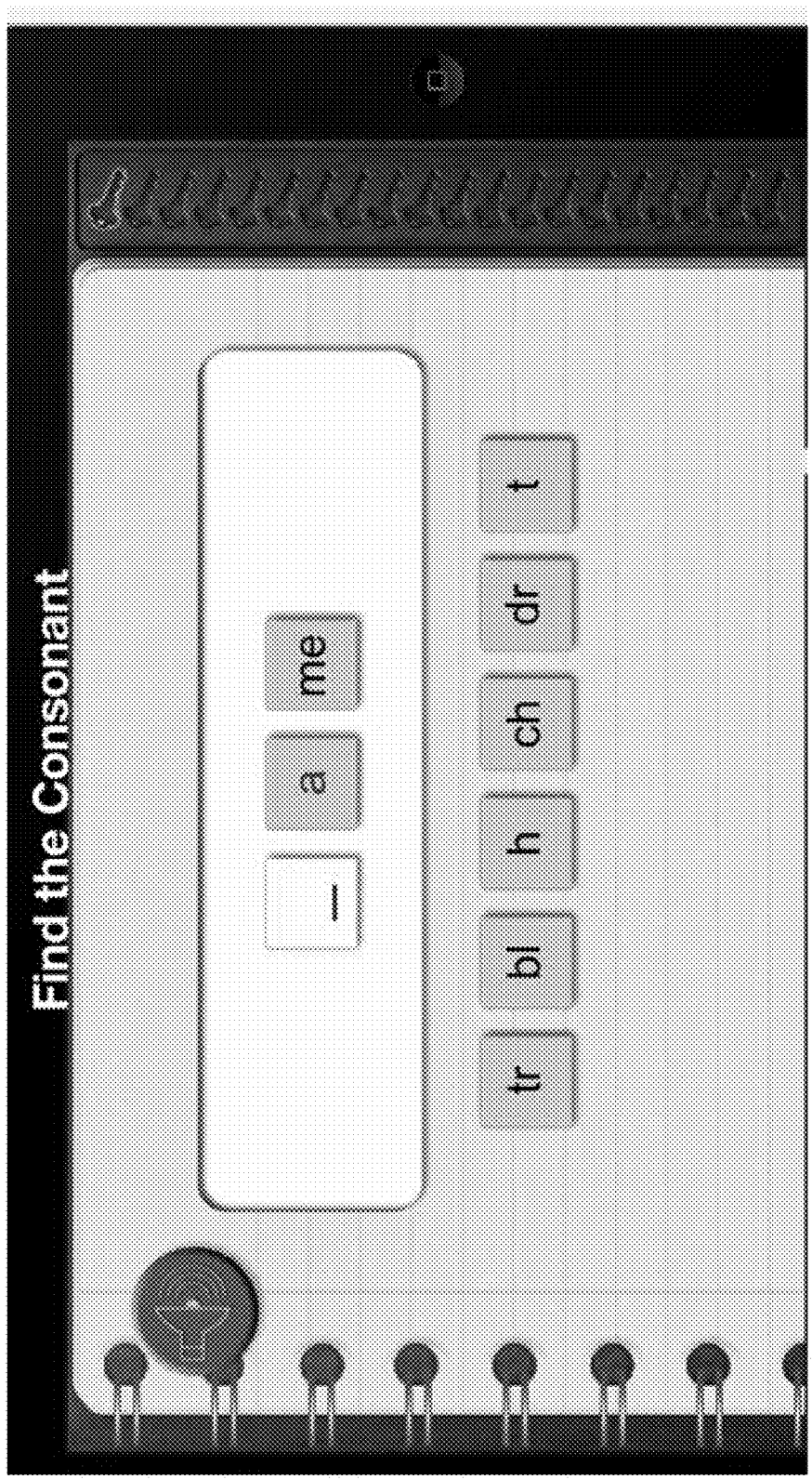
Figure 12B:
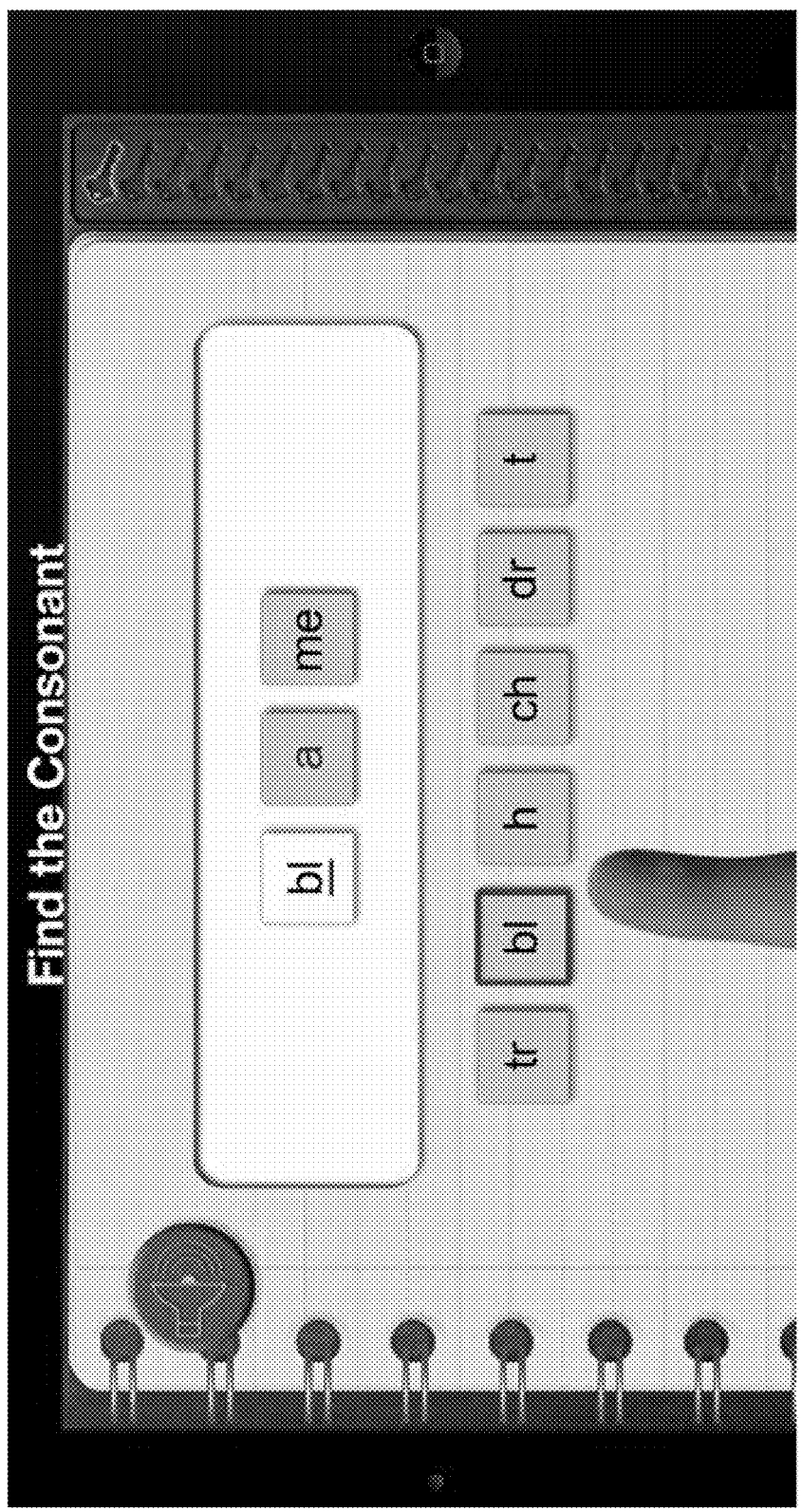
Figure 12C:
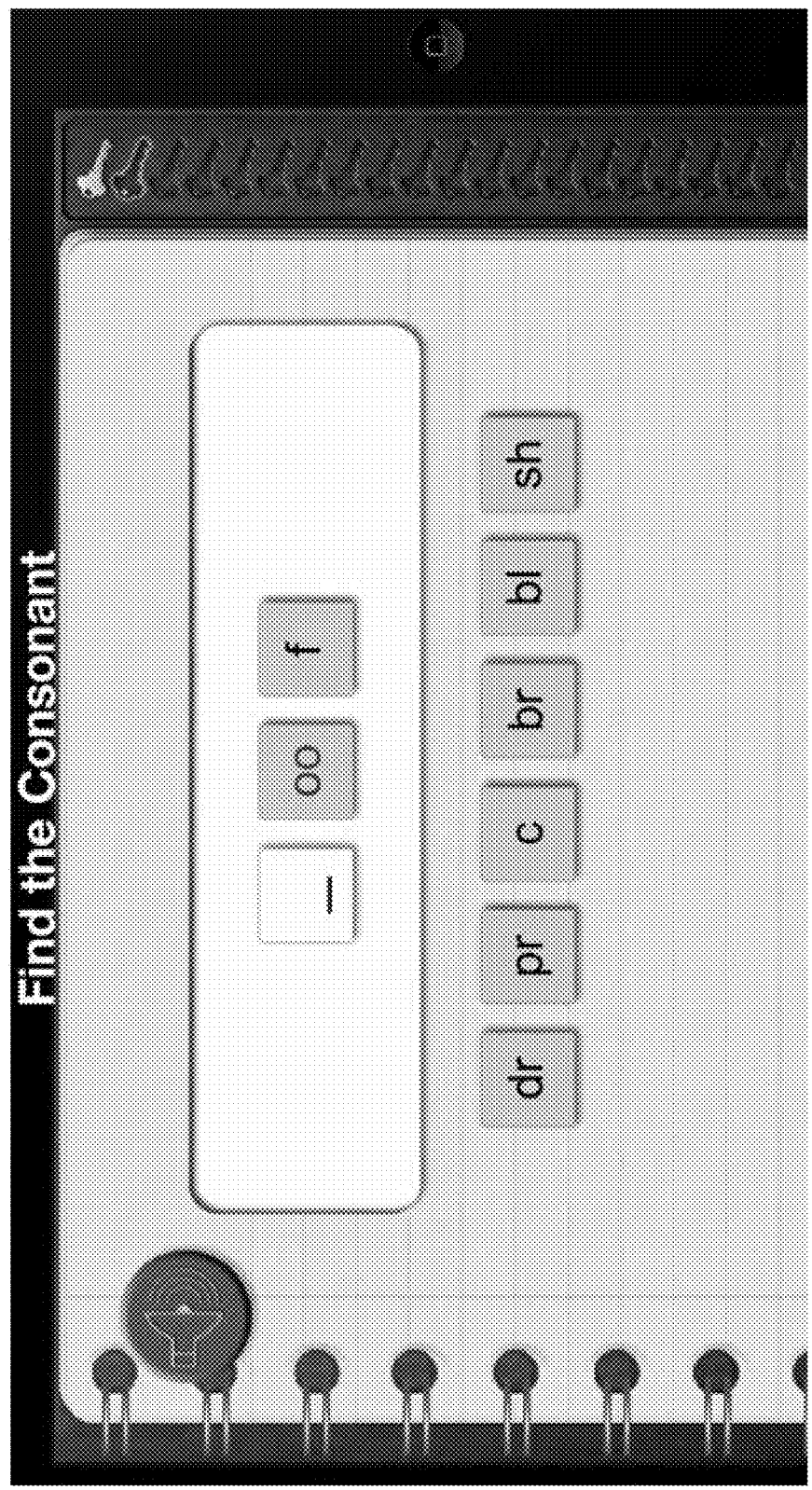

FIGS. 12A-C—Fill in the Blank (Consonant)

This task proceeds like Fill in the Blank (vowel), but for student selection of missing consonant(s) instead of vowel(s). See FIG. 12A. The student touches his/her selection for the missing consonant or consonant pair, and the program automatically populates the blank. FIG. 12B. As discussed earlier, each task has multiple trials. Once a first Fill in the Blank (consonant) is completed, the program automatically presents a next and different Fill in the Blank (consonant). FIG. 12C. This proceeds over a pre-selected number of trials for this task to promote VPM methodology.

Figure 13:
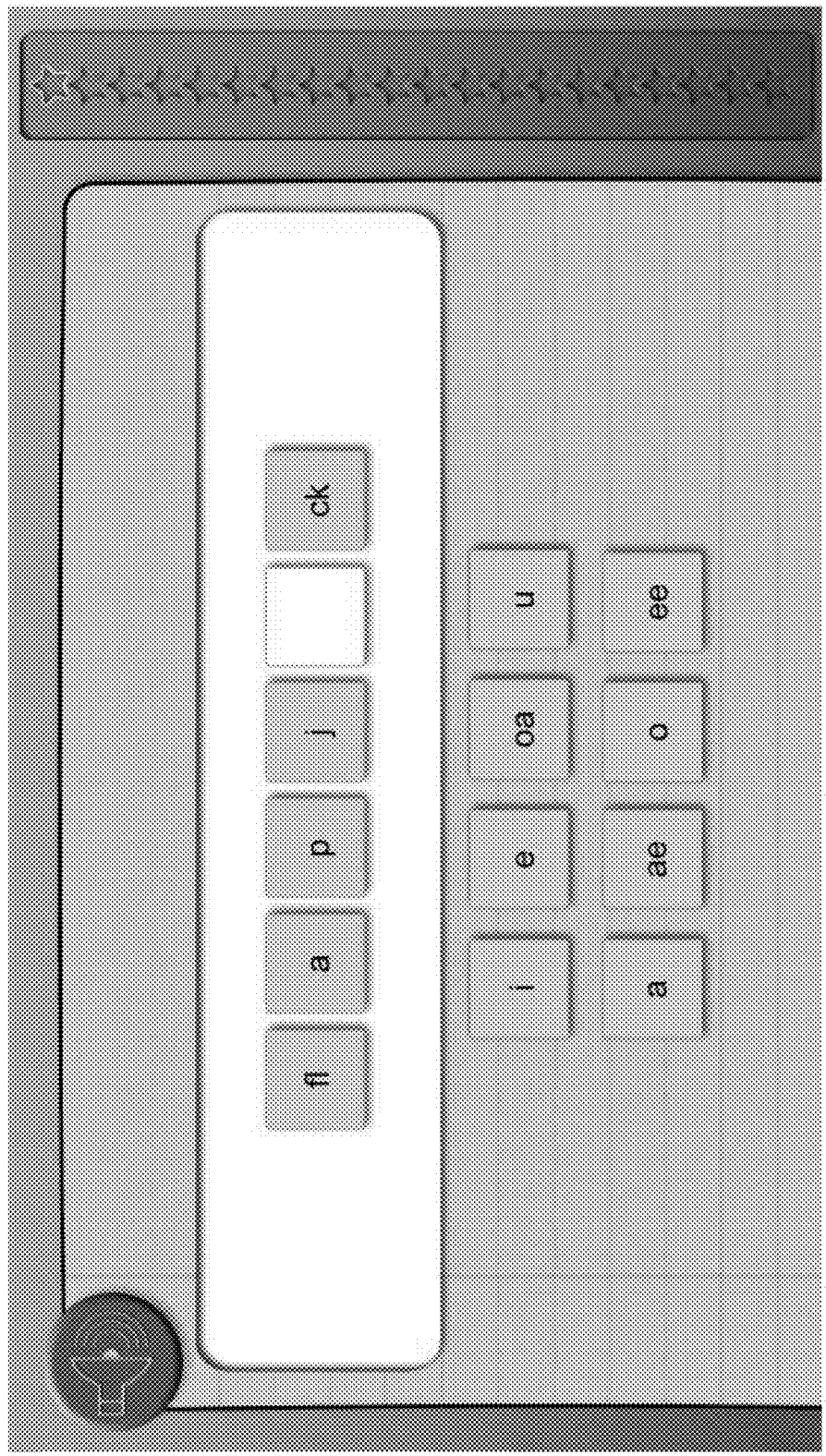

FIG. 13—Fill in the Blank (Multi-Syllabic)

This is similar to the other Fill in the Blank tasks, but for multi-syllabic words.

FIGS. 14A-E—Change the Word/Nonword

Figure 14A:
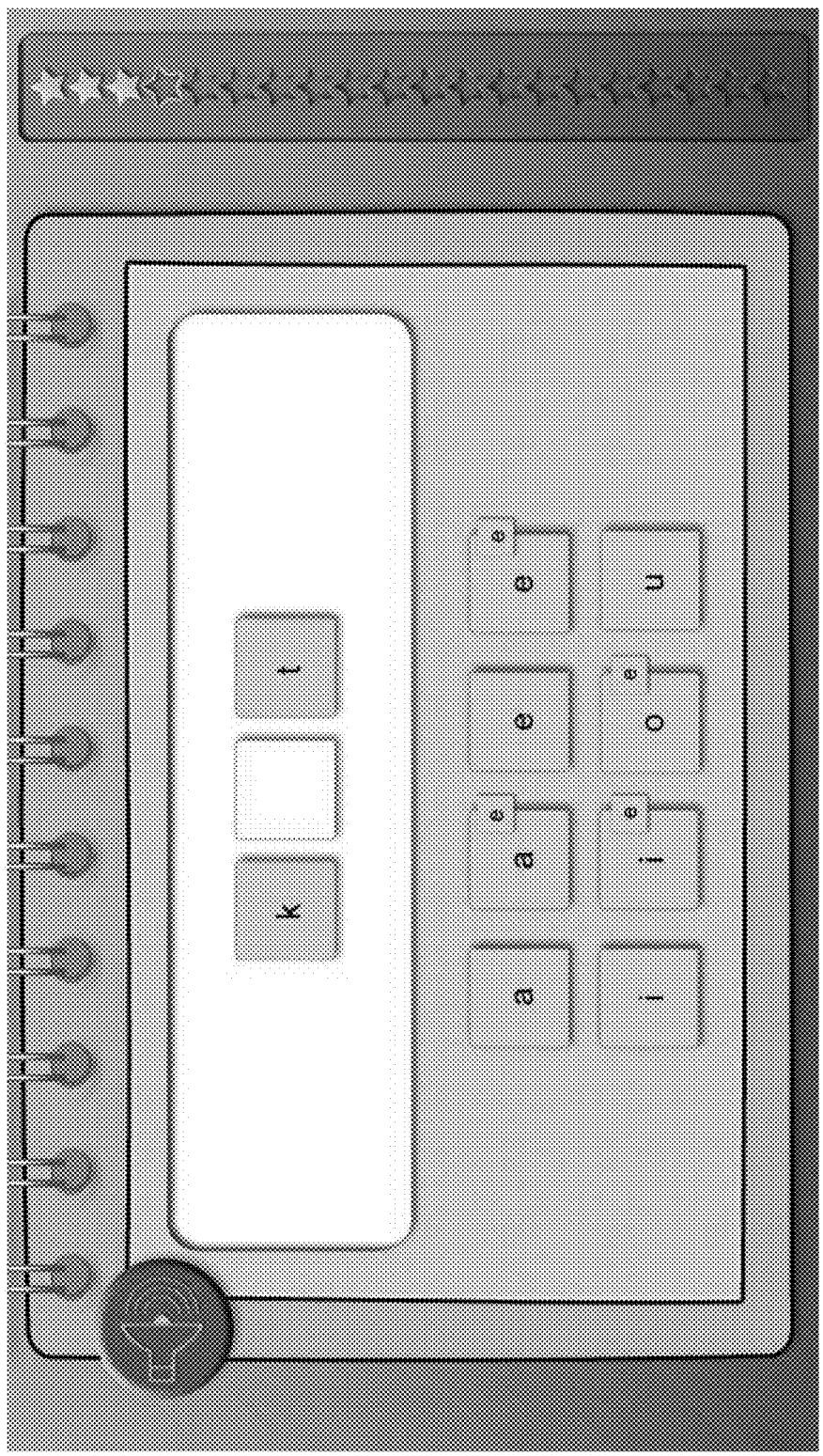
Figure 14B:
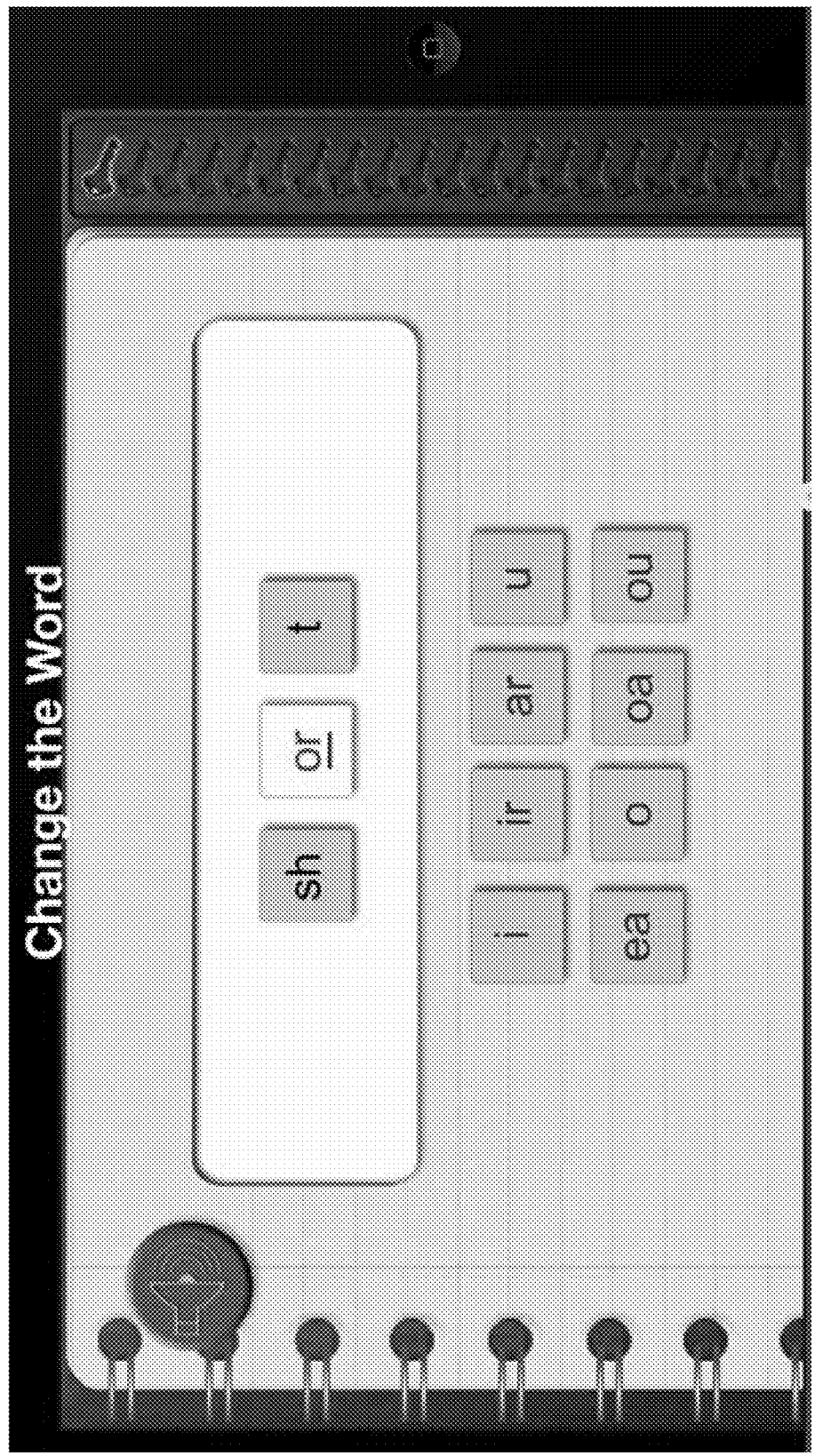
Figure 14C:
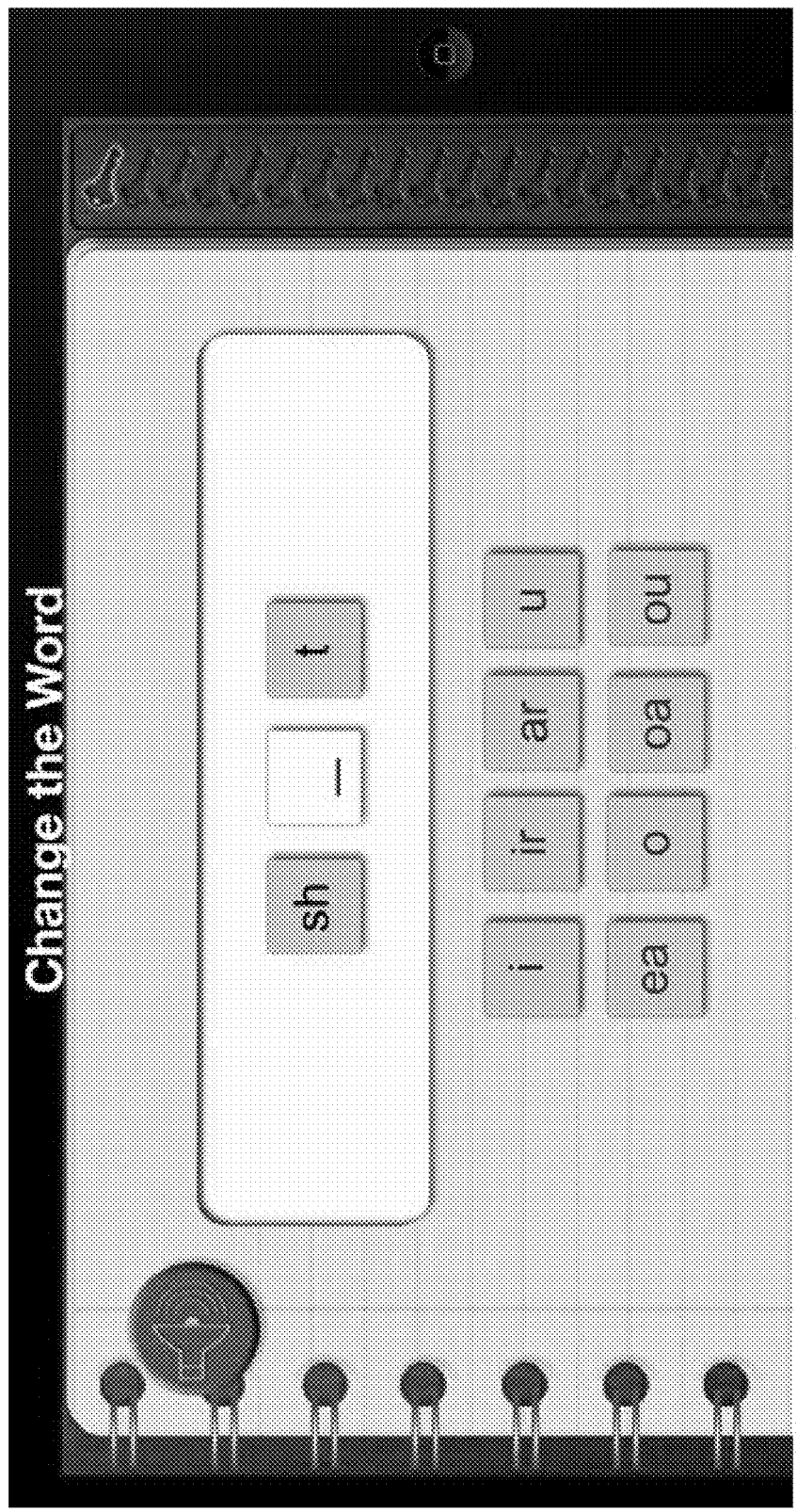
Figure 14D:
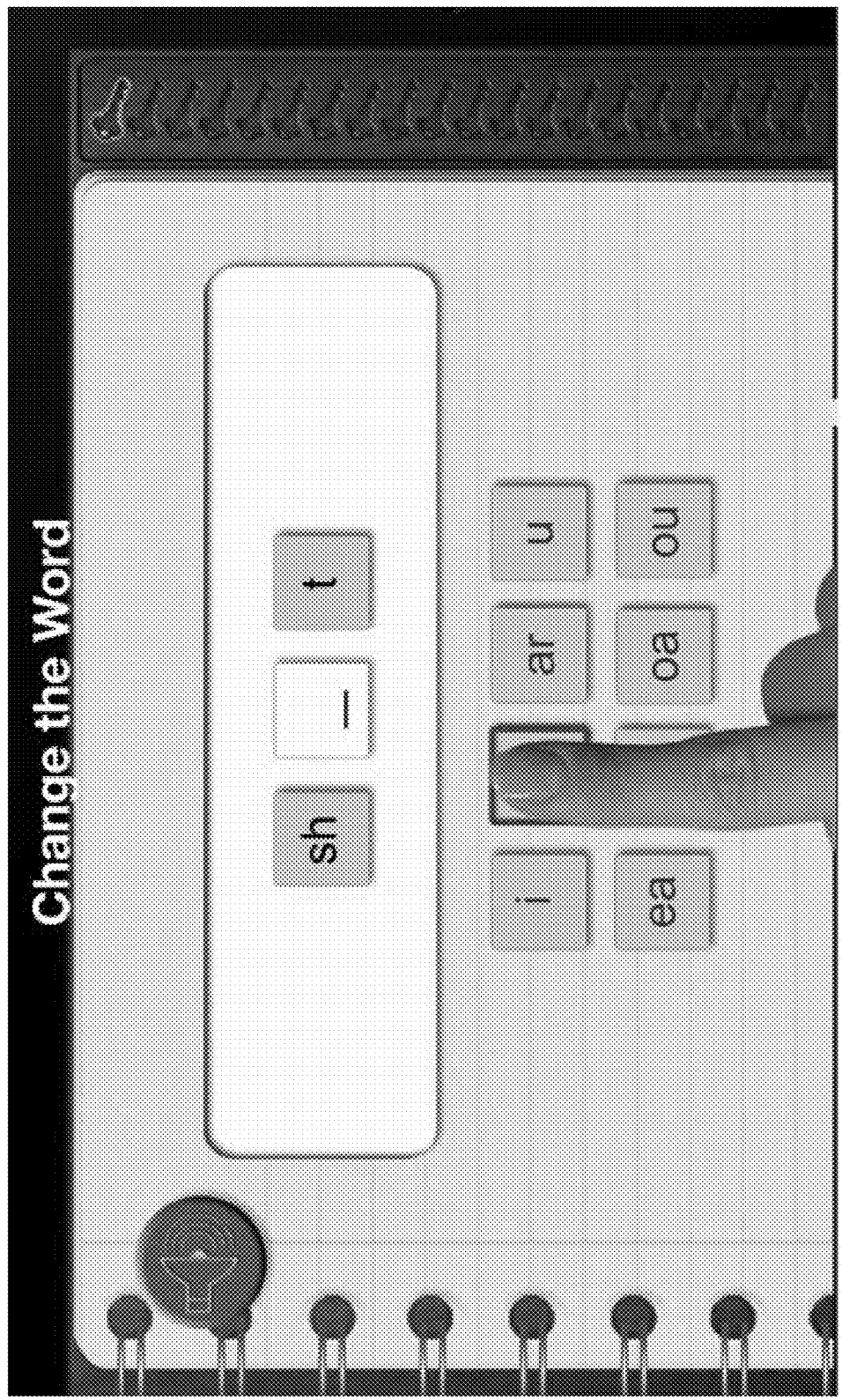
Figure 14E:
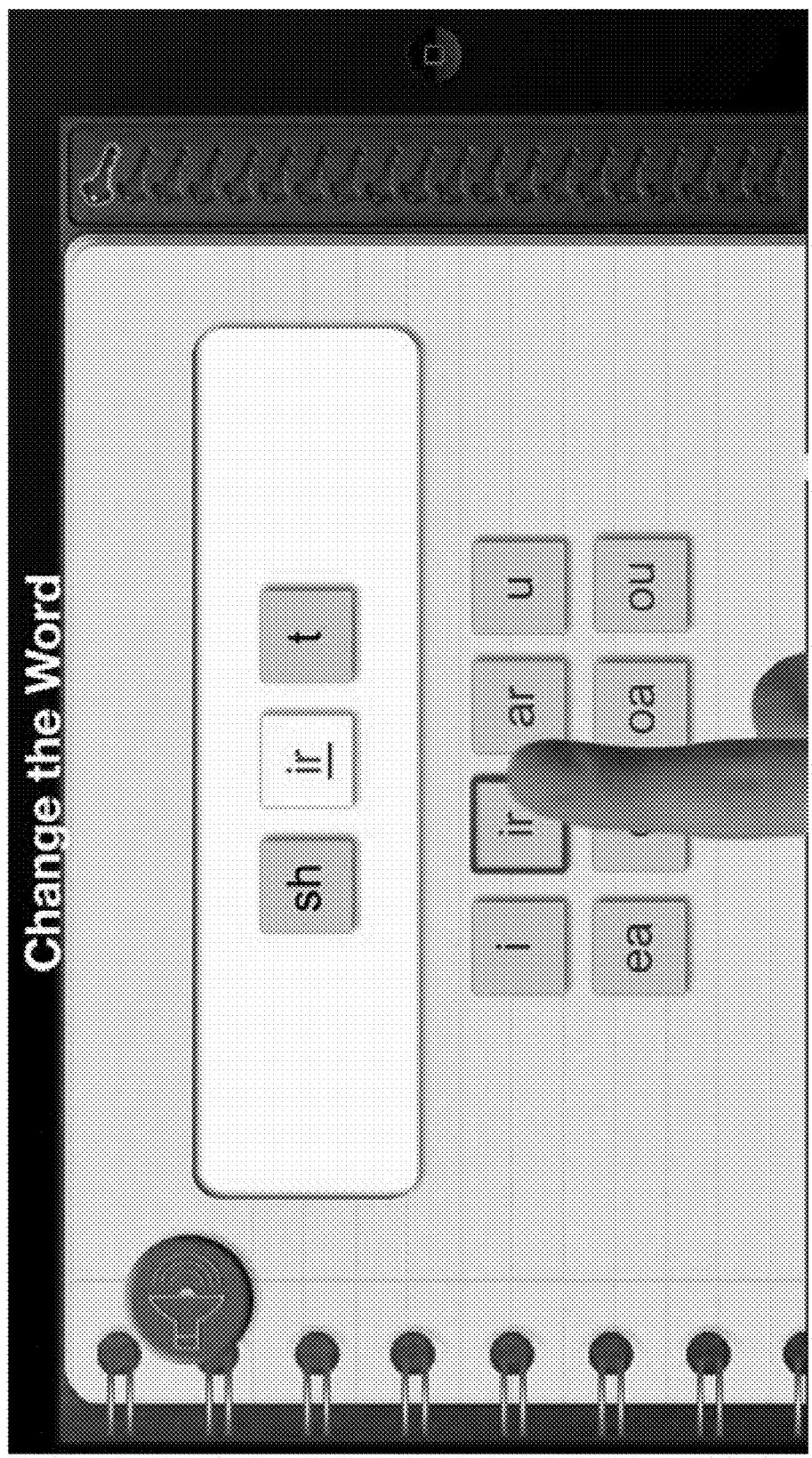

FIG. 14A illustrates one example of this task. As can be appreciated, different legitimate words can be created from the choices presented for the blank. The student can select and listen to the different words he/she creates. FIGS. 14B-E show a different trial of this task for a blank framed by the consonants "SH" and "T". One selection is "SHORT". FIG. 14B. But the student can remove that selection, look at the framed blank (FIG. 14C), make a different selection (FIG. 14D), resulting in a different word "SHIRT" (FIG. 14E). Note that this task can involve either actual words or nonwords.

See Table 3 "change the word/nonword—vowels". The student hears an instruction to change an audibly pronounced word to a new word (also pronounced) by choosing the correct vowel from the set of vowels presented on the screen.

Figure 15:
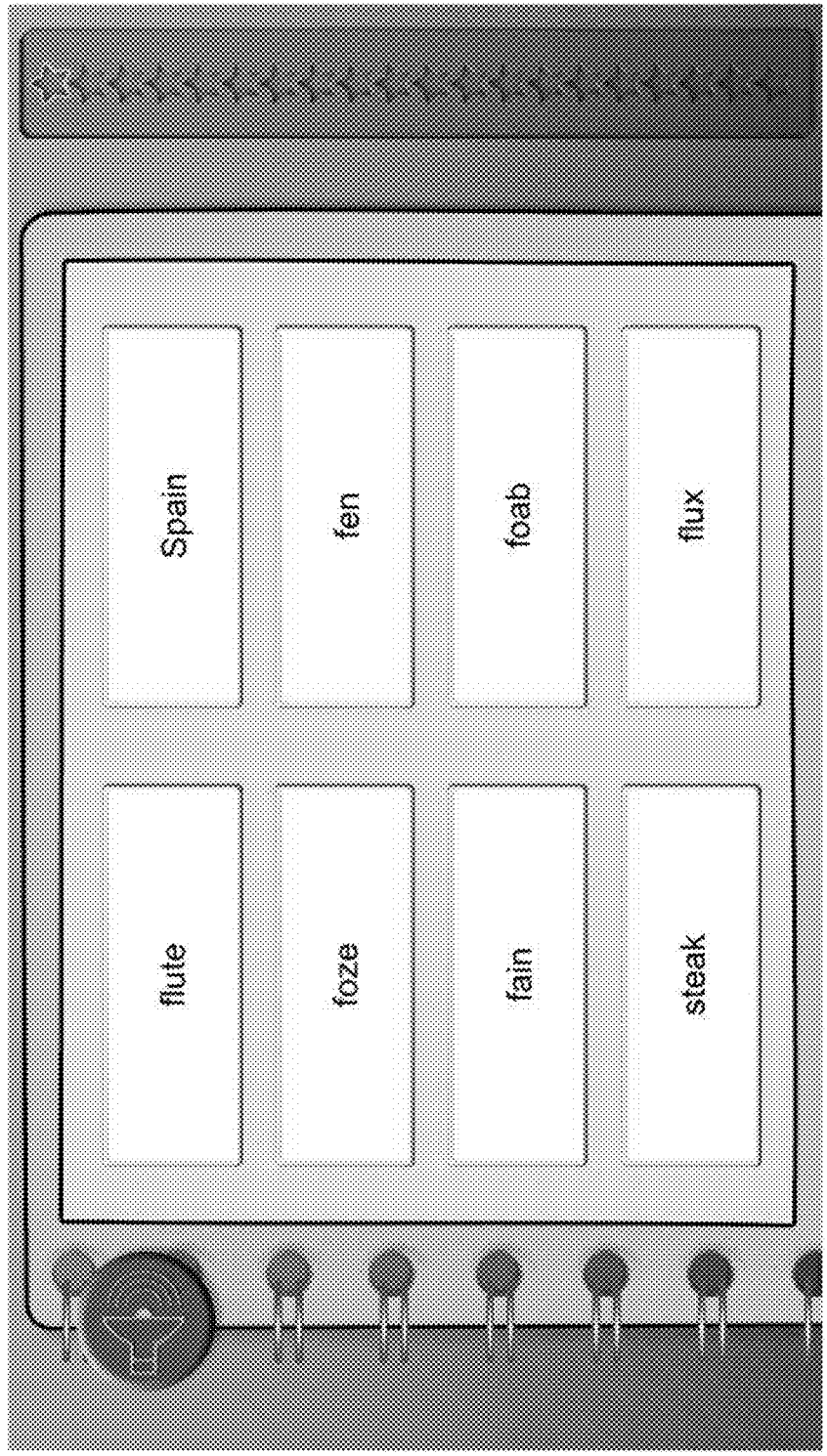

FIG. 15—Find the Word/Nonword

This task audibilizes either a word or a nonword and asks the student to select a match from the displayed text alternatives. As illustrated in FIG. 15, audibilizing nonwords can test a student's understanding of certain rules. Likewise, presenting nonwords and words in the choices can do so when a legitimate word is pronounced.

Figure 16A:
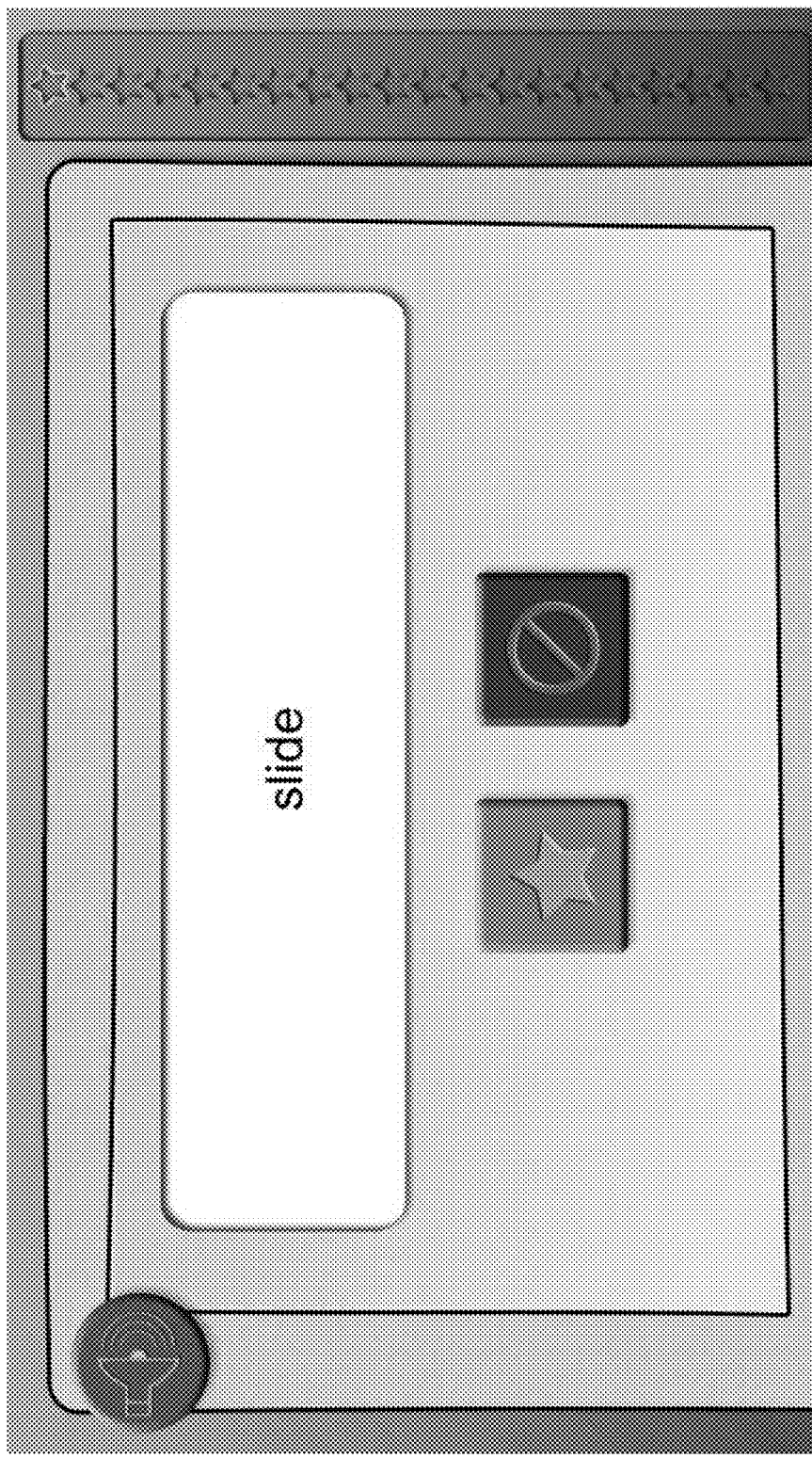
Figure 16C:
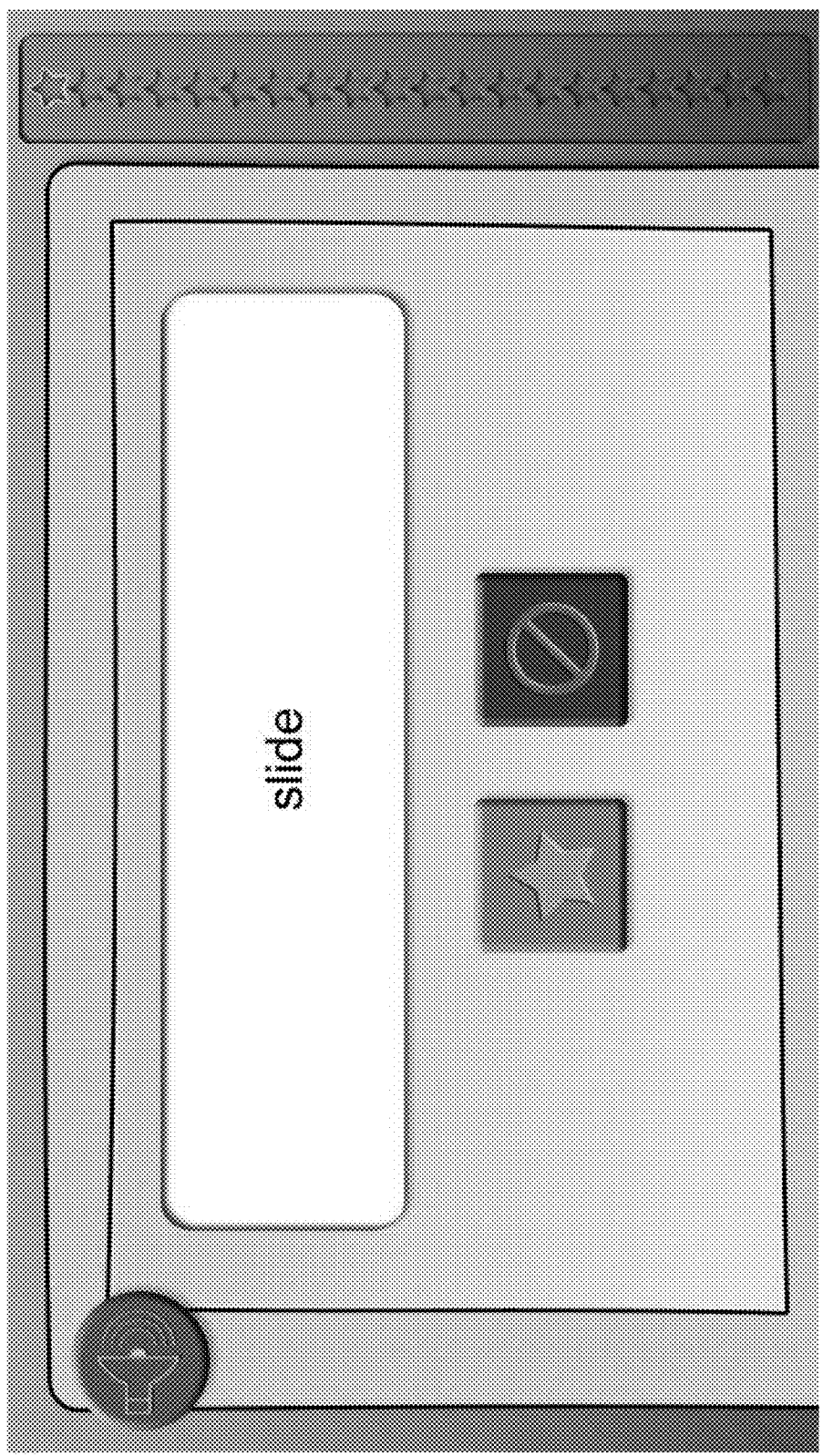

FIGS. 16A-C—Word Verification (Unmasked, and Masked)

This task audiblizes a word, then displays its orthography. The student is asked to push the "star" button if he/she believes the displayed word matches the pronounced word or the "circle with diagonal bar" button if not. See FIG. 16A. In the Specific Example 1, this same task is presented but adds what is sometimes referred to as "masking" of the displayed word. The word is audibilized, its orthography is then displayed, but the orthography is quickly removed (in this case masked or obscured by the "#" symbols). FIG. 16B. The student is still asked to select whether the briefly displayed word matches the preceding pronunciation.

FIG. 16A illustrates the "Word Verification—vowels+ consonants" task from Table 3. A word (or nonword) is pronounced for the student. It is then displayed on the screen. The "star" button is pushed if the student thinks the pronounced word (or nonword) matches its orthography. If not the student pushes the right-hand button (the circle with the diagonal mark across it).

FIG. 16B gives an example of backward masking (discussed earlier). Instead of leaving the word on the screen, as in FIG. 16A, it is displayed only briefly (e.g. for a fraction of a second). The word is then covered or masked (in this case replaced by the symbols "########"). The student then is asked if the audible pronunciation matches the briefly presented word on the screen by selecting from the same set of buttons as FIG. 16A.

FIG. 16C is similar to the other Word Verification tasks, but can be specifically configured to emphasize or vary the stress or intonation of a word (its prosody) and ask the student if the pronunciation and prosody were correct or not.

Figure 17:
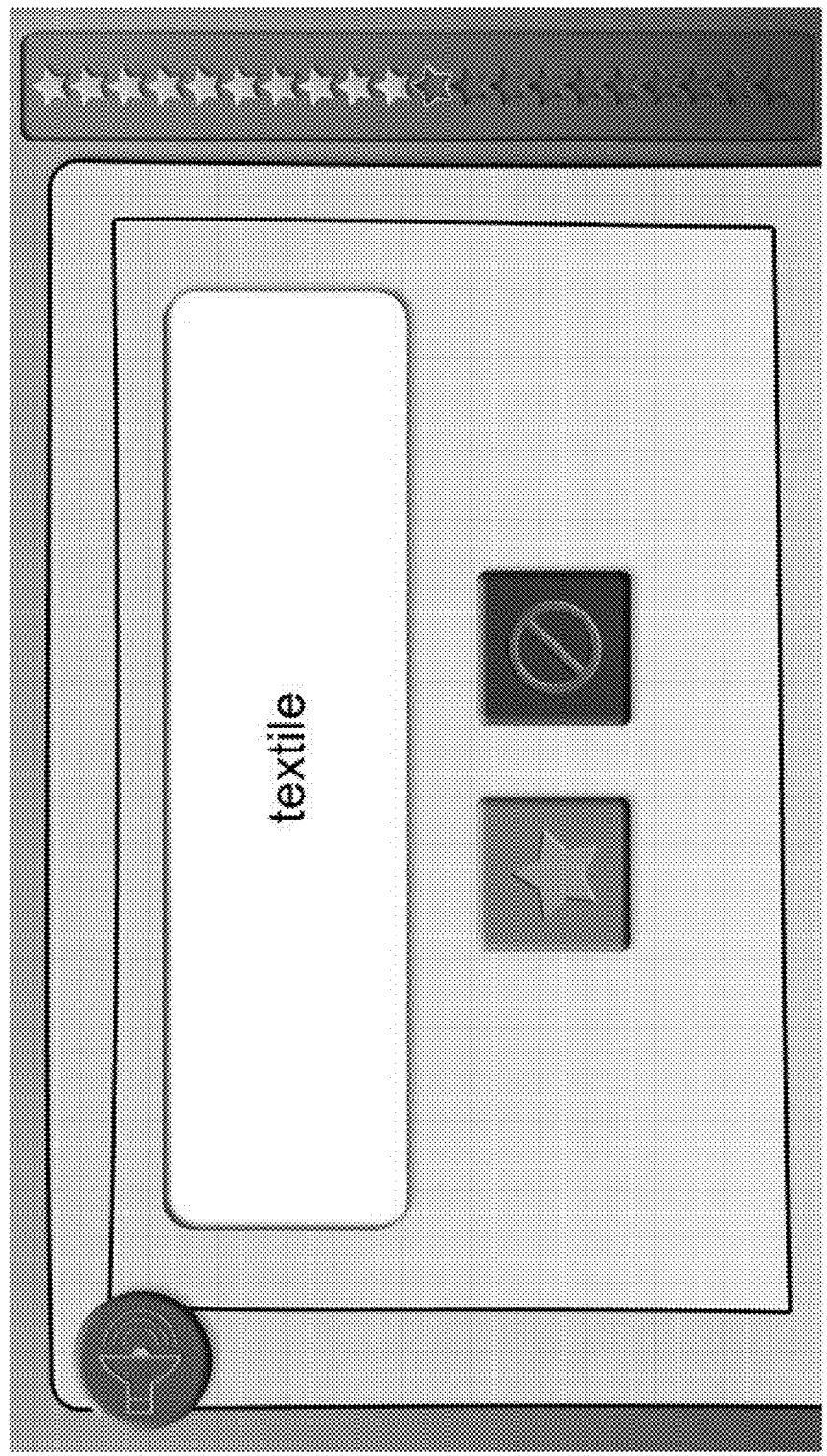

FIG. 17—Verification (Multi-Syllabic)

This task proceeds like "Word verification" above, but with plural syllable words. In Specific Example 1, the task can also be presented with masking.

FIGS. 18A-M—Picture Matching

Figure 18A:
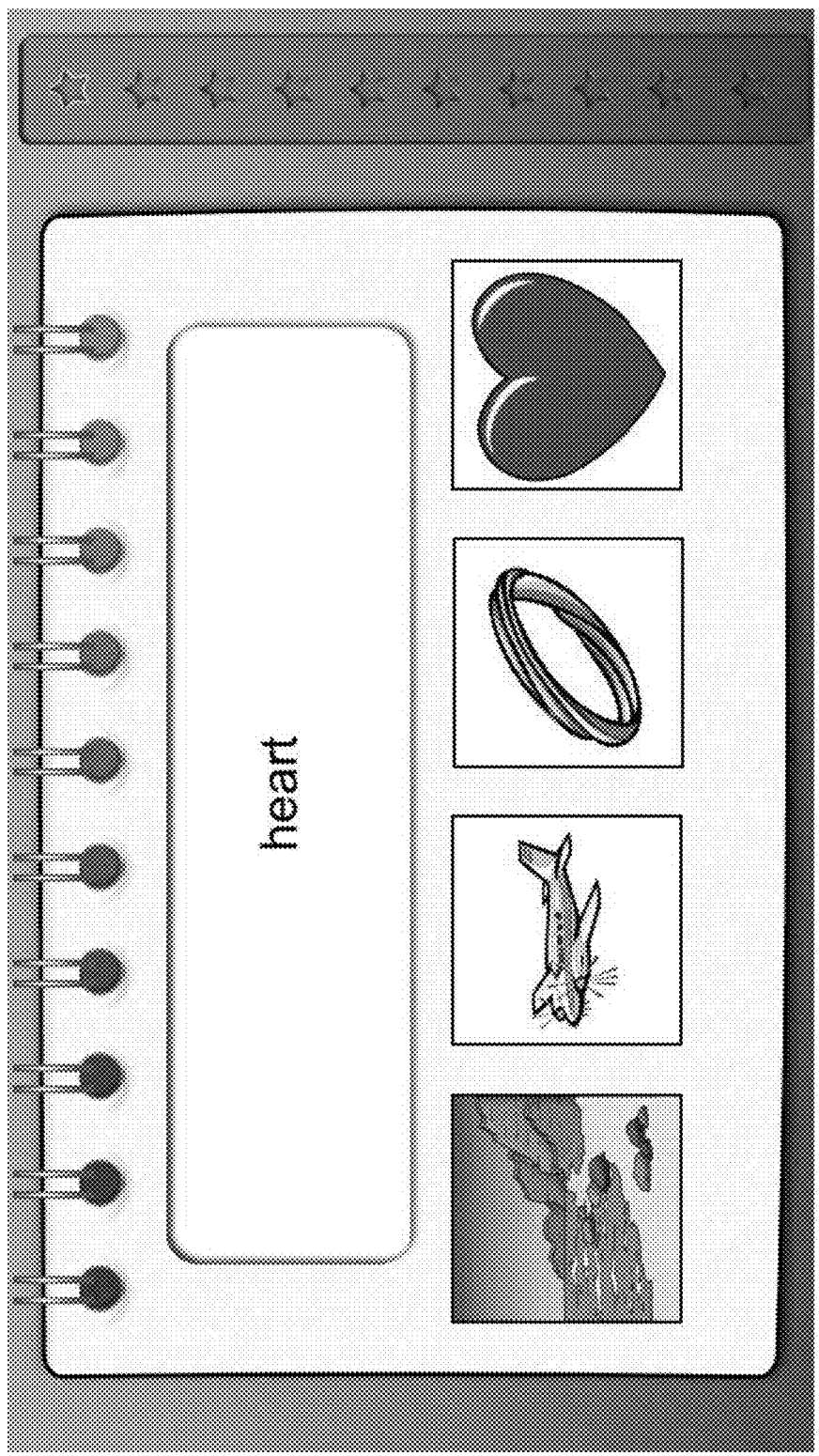
Figure 18B:
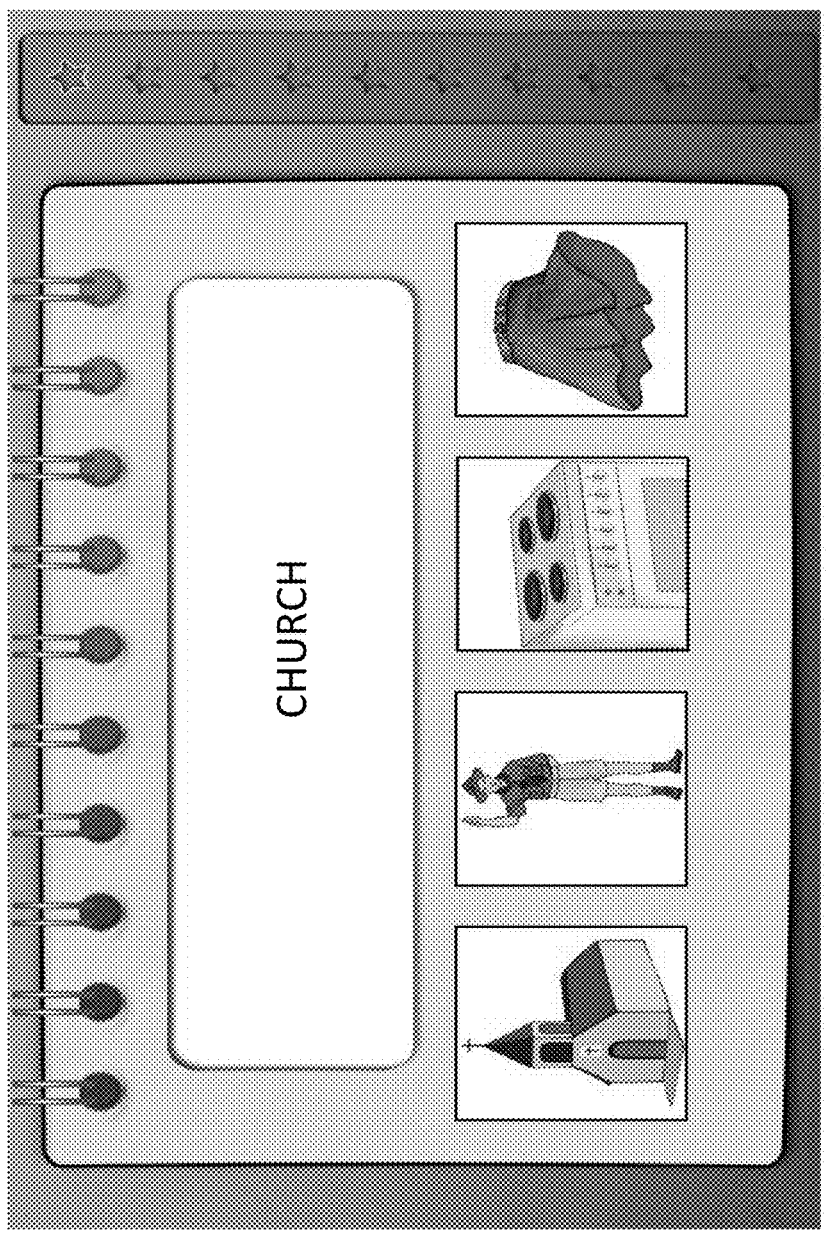
Figure 18C:
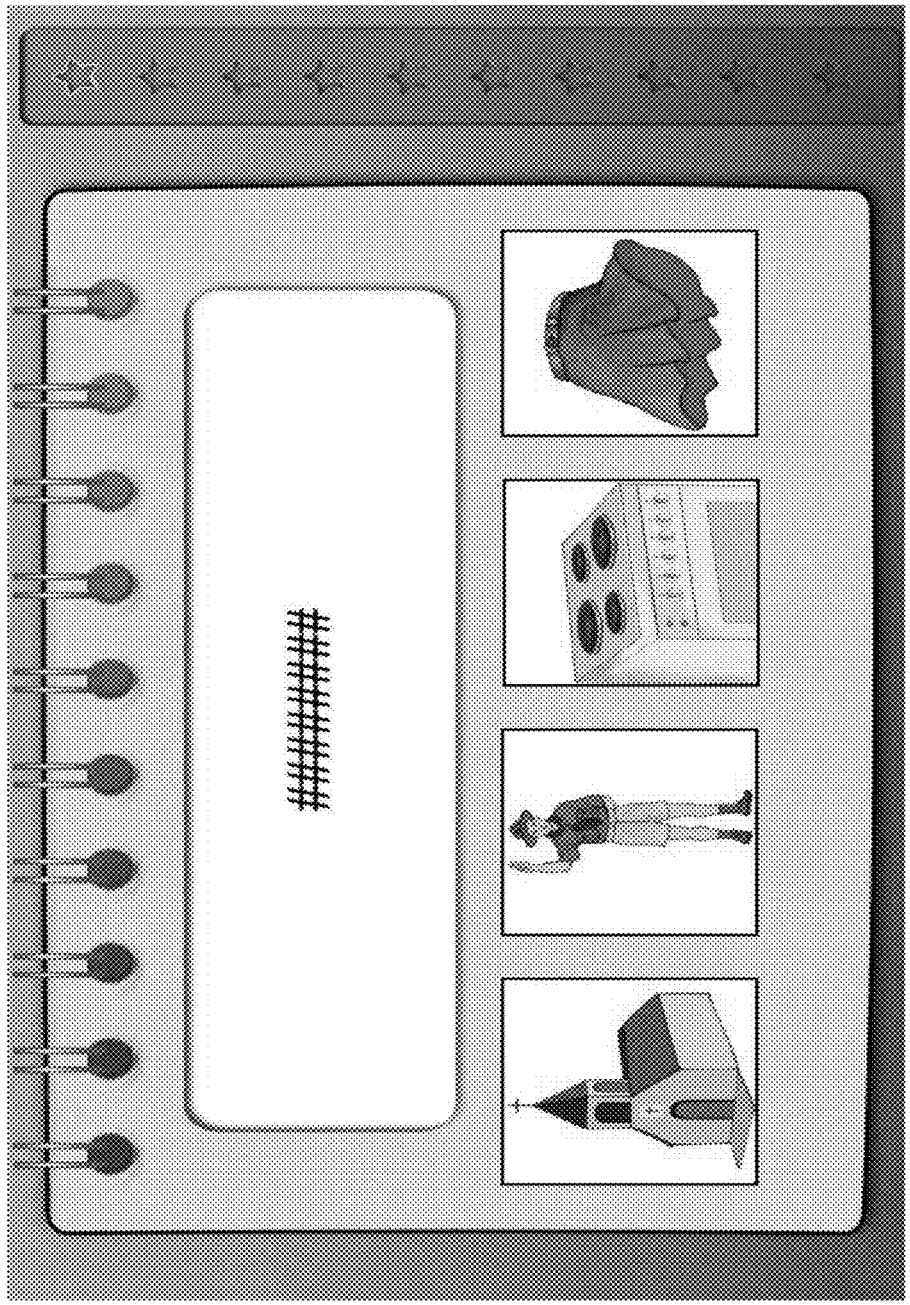

These figures show several different examples of picture matching tasks. FIG. 18A shows a first trial for the word "heart" (unmasked). FIGS. 18B and 18C show a second trial for the word "church", first unmasked (e.g. FIG. 18B) and masked (FIG. 18C). As with other masking tasks, the displayed word is shown only briefly and then obscured. The student is prompted to select one of plural different displayed graphic representations (e.g. clip art type images) that he/she believes best matches the briefly displayed word.

Figure 18D:
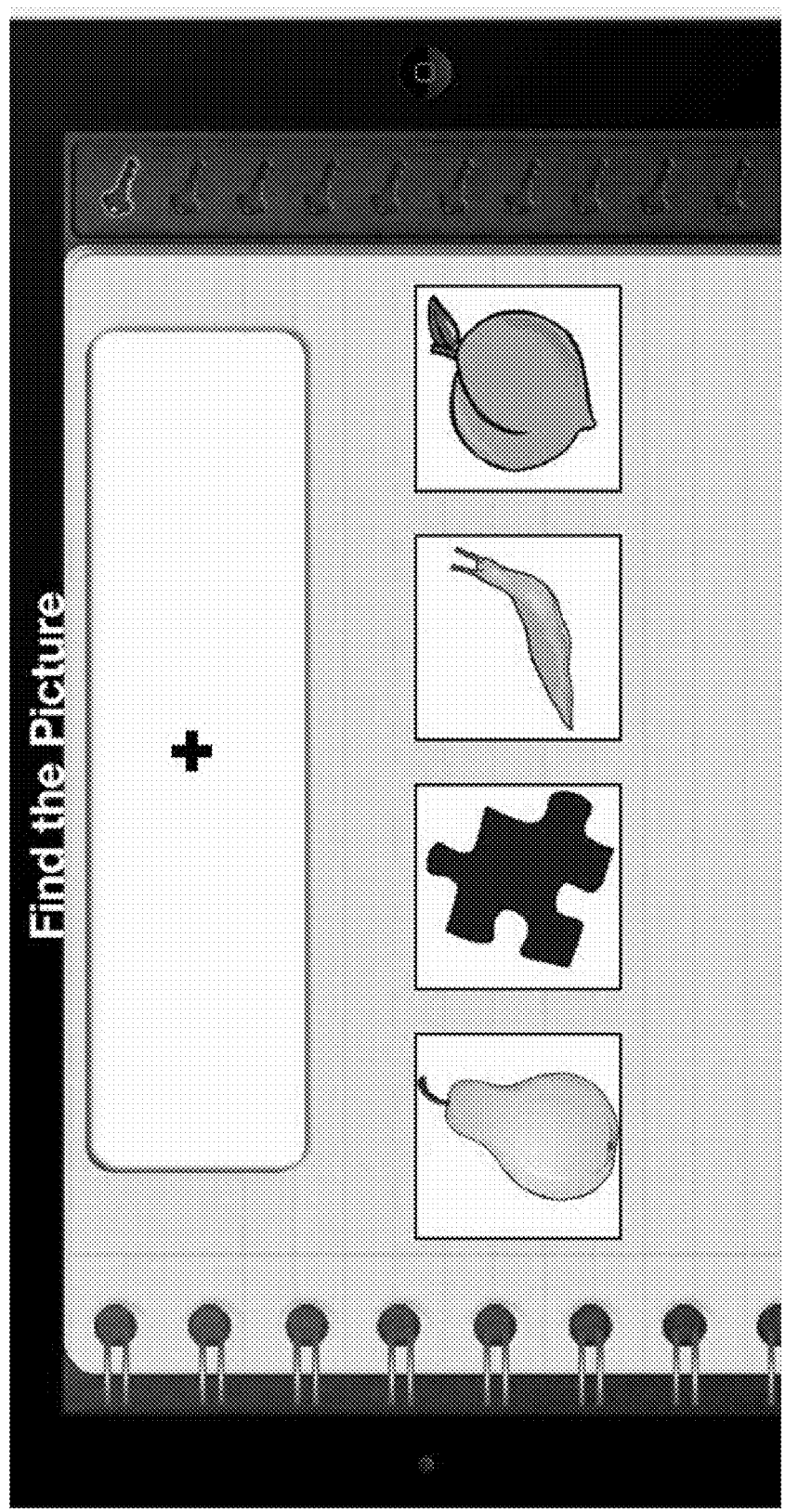
Figure 18E:
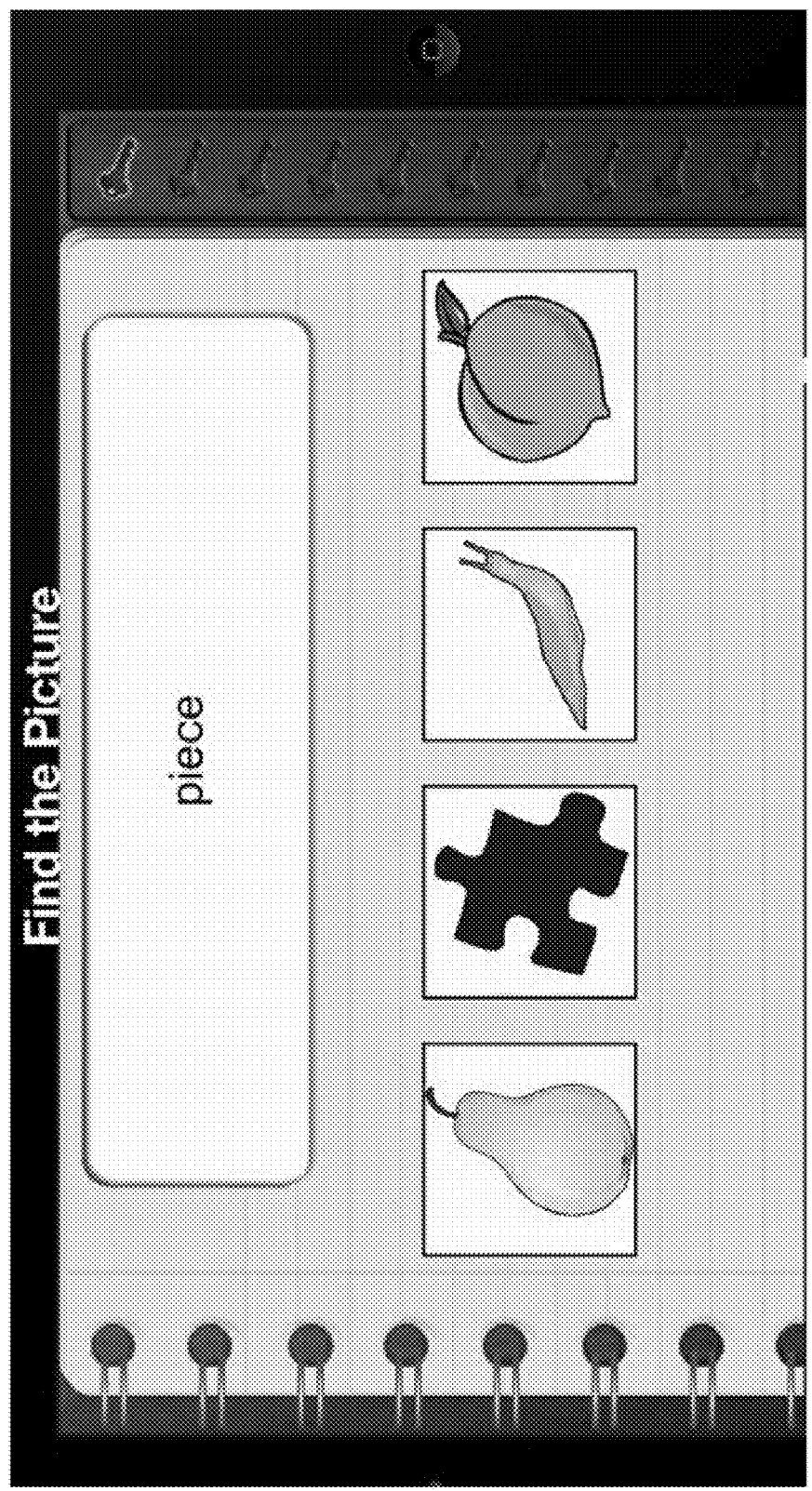
Figure 18F:
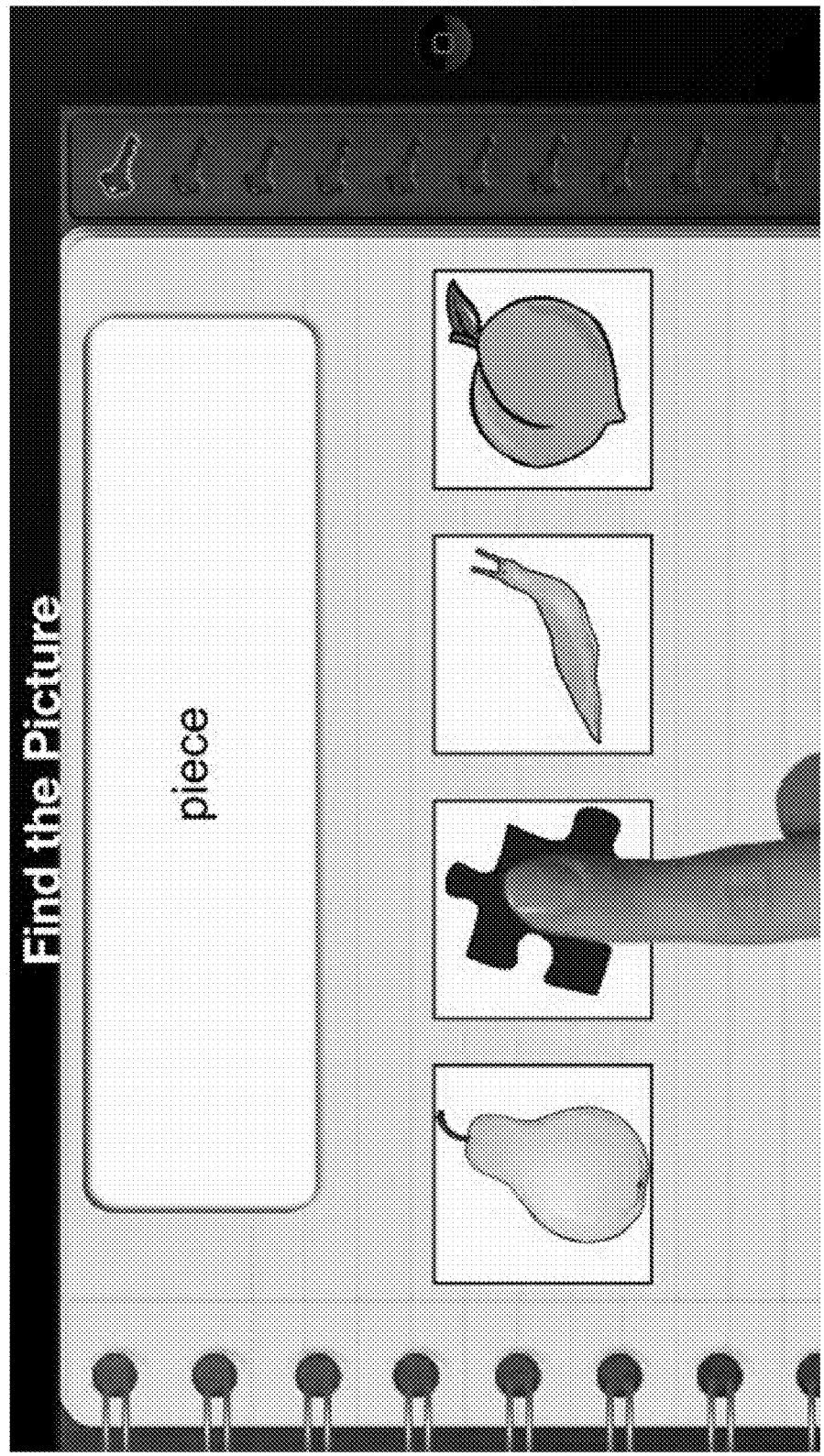

FIGS. 18D-F show a third trial for the term "piece". Note that the four graphic options have some commonalities (e.g. "pear", "peach") and some not (e.g. "snail"). Note also that there must be some extrapolating by the student, as the term "piece" can apply to many different things ("piece of pie", "piece of glass", etc.). The student would see a blank first (FIG. 18D), followed by display of the word (FIG. 18E), and then make a selection (FIG. 18F). The software would track and record whether the selection was correct. It could also track and record such things as speed of the selection.

Figure 18G:
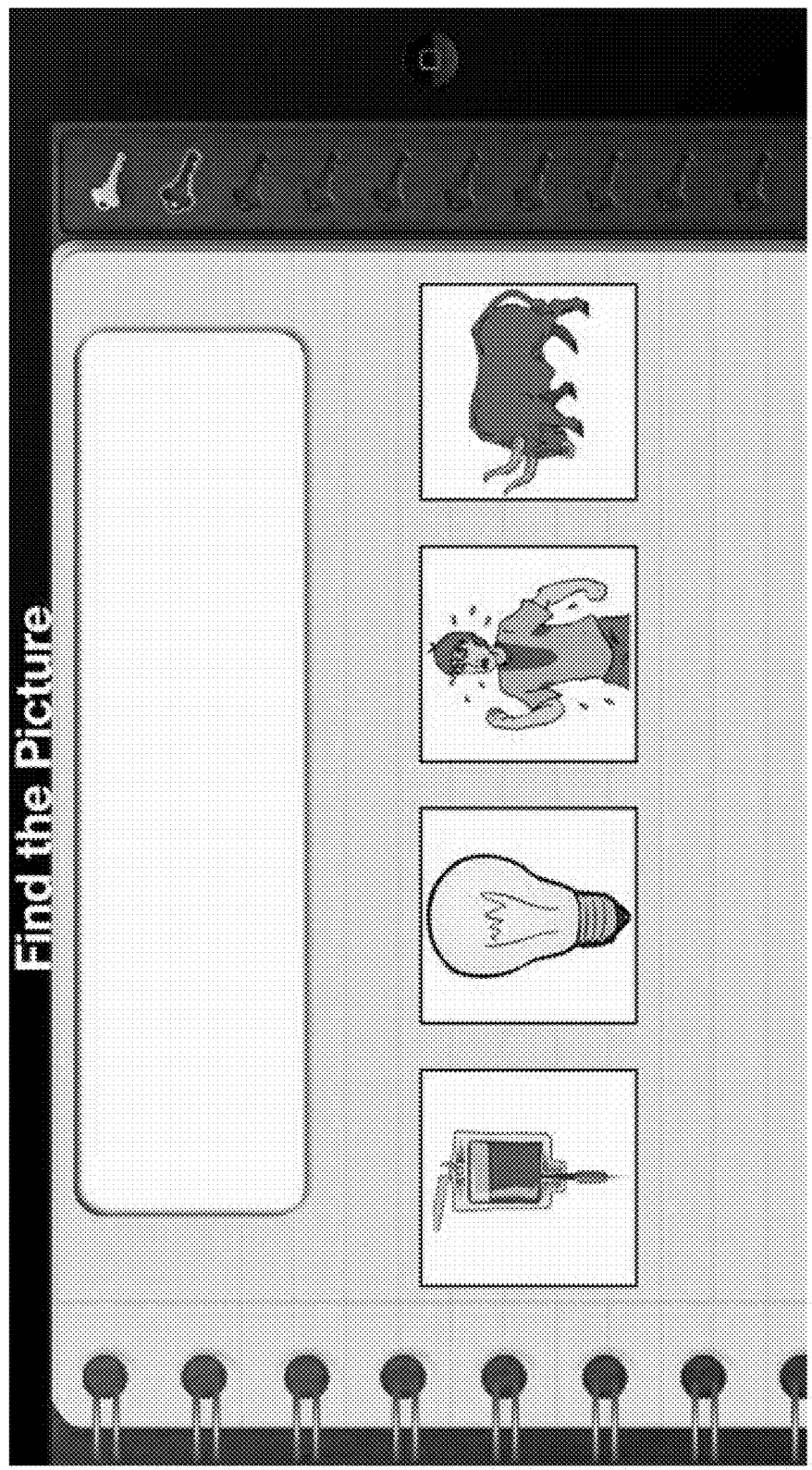
Figure 18H:
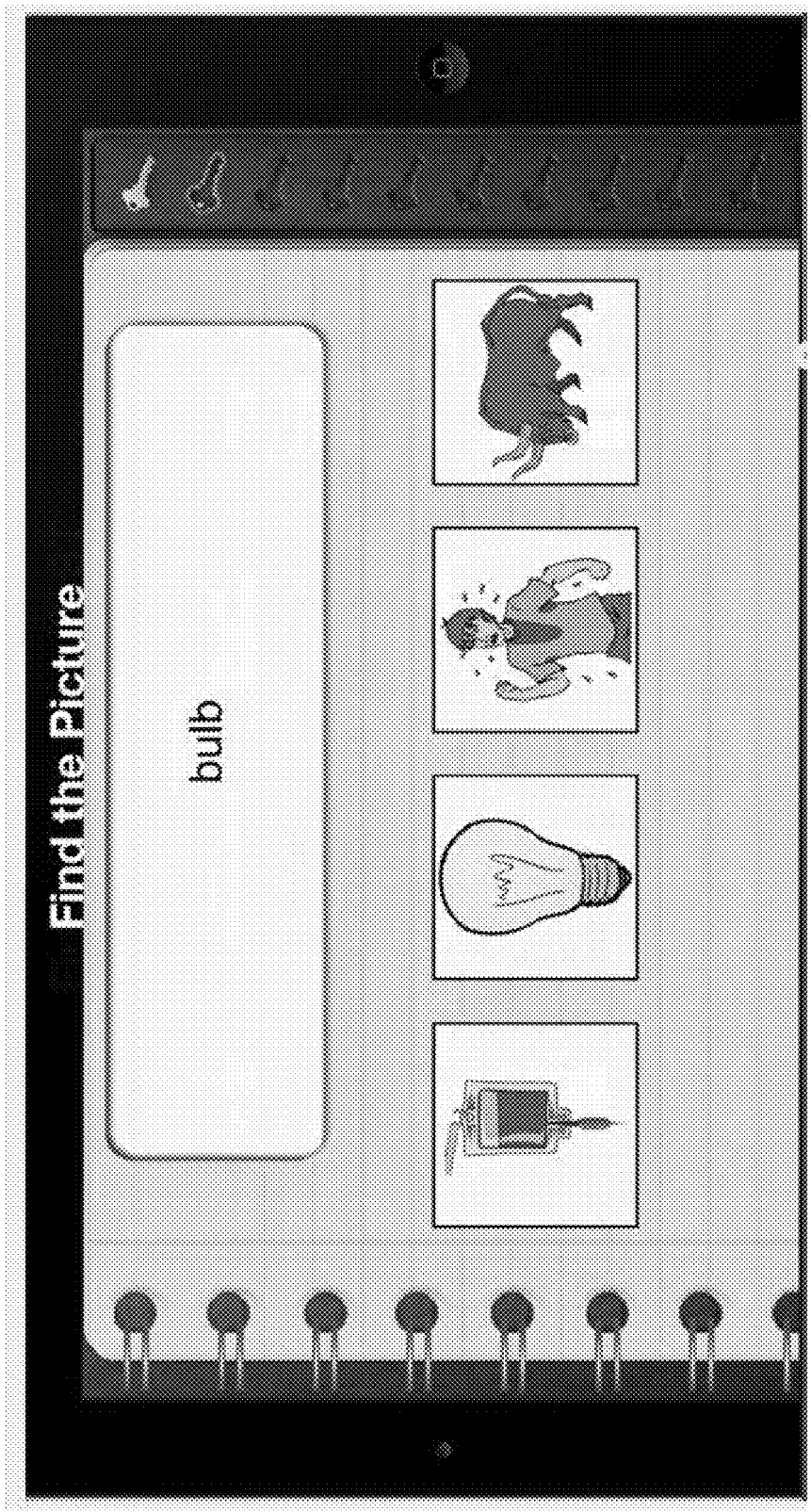

FIGS. 18G and H illustrate another variation of the task, this time for the word "bulb".

Figure 18I:
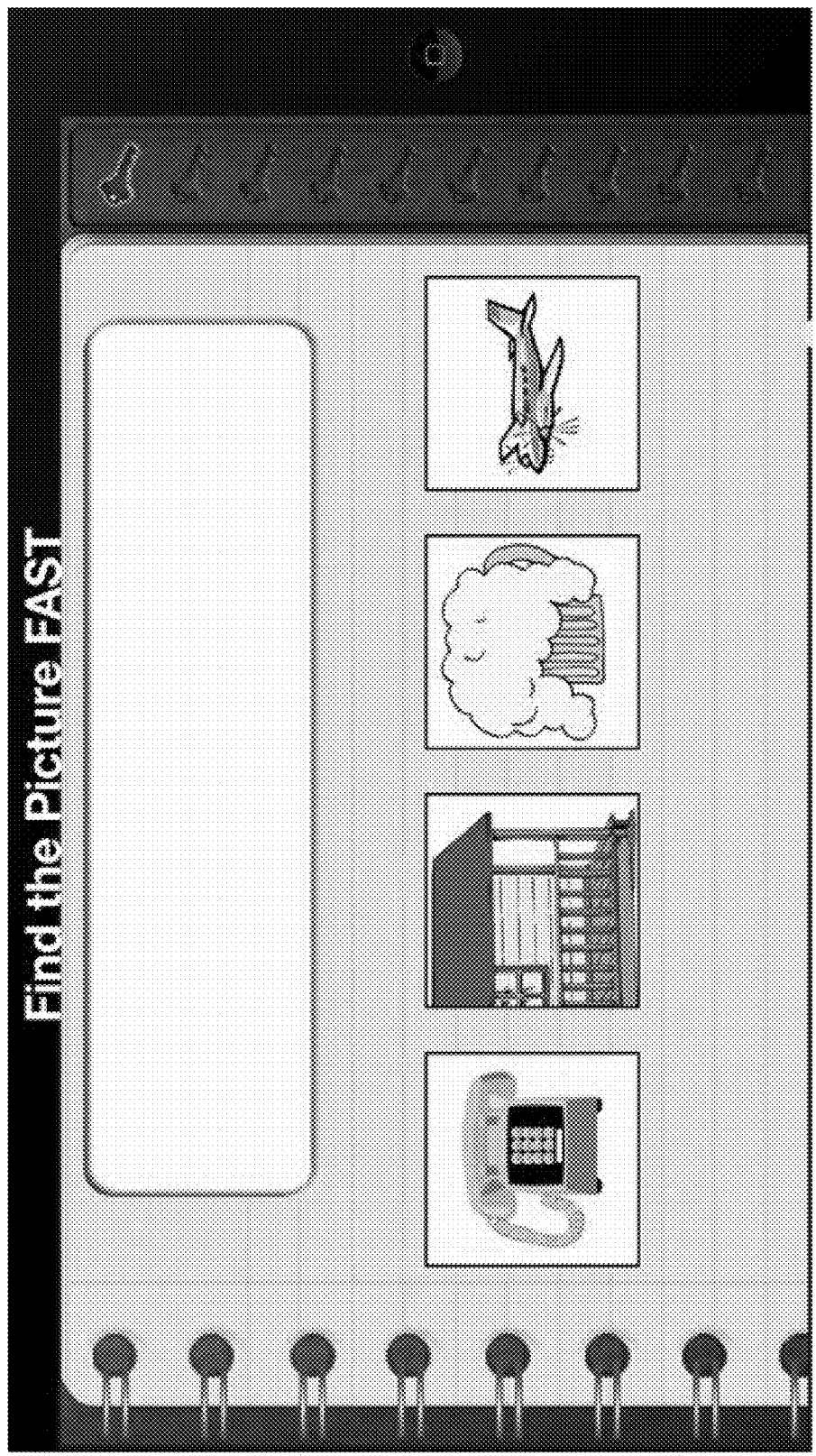
Figure 18J:
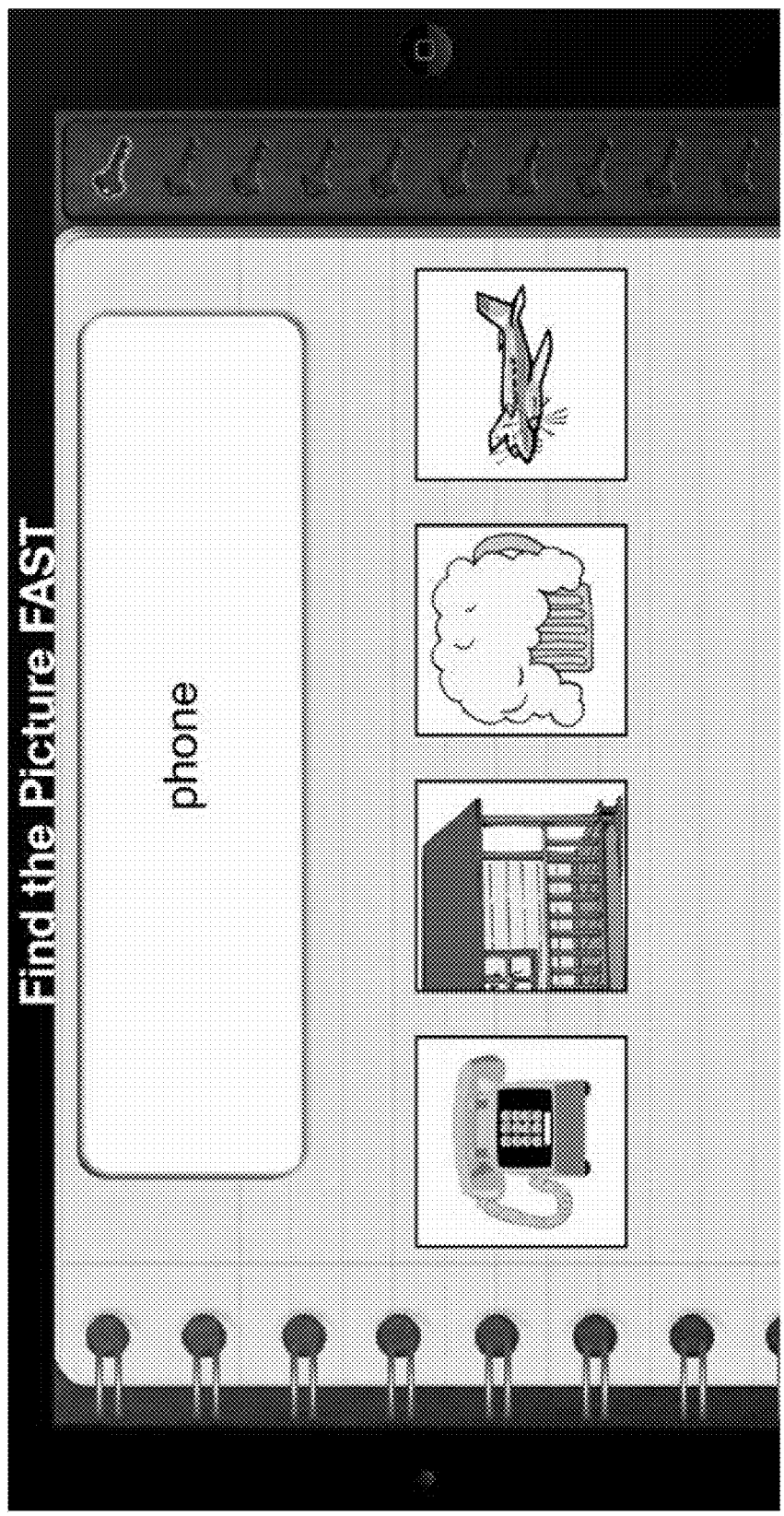
Figure 18K:
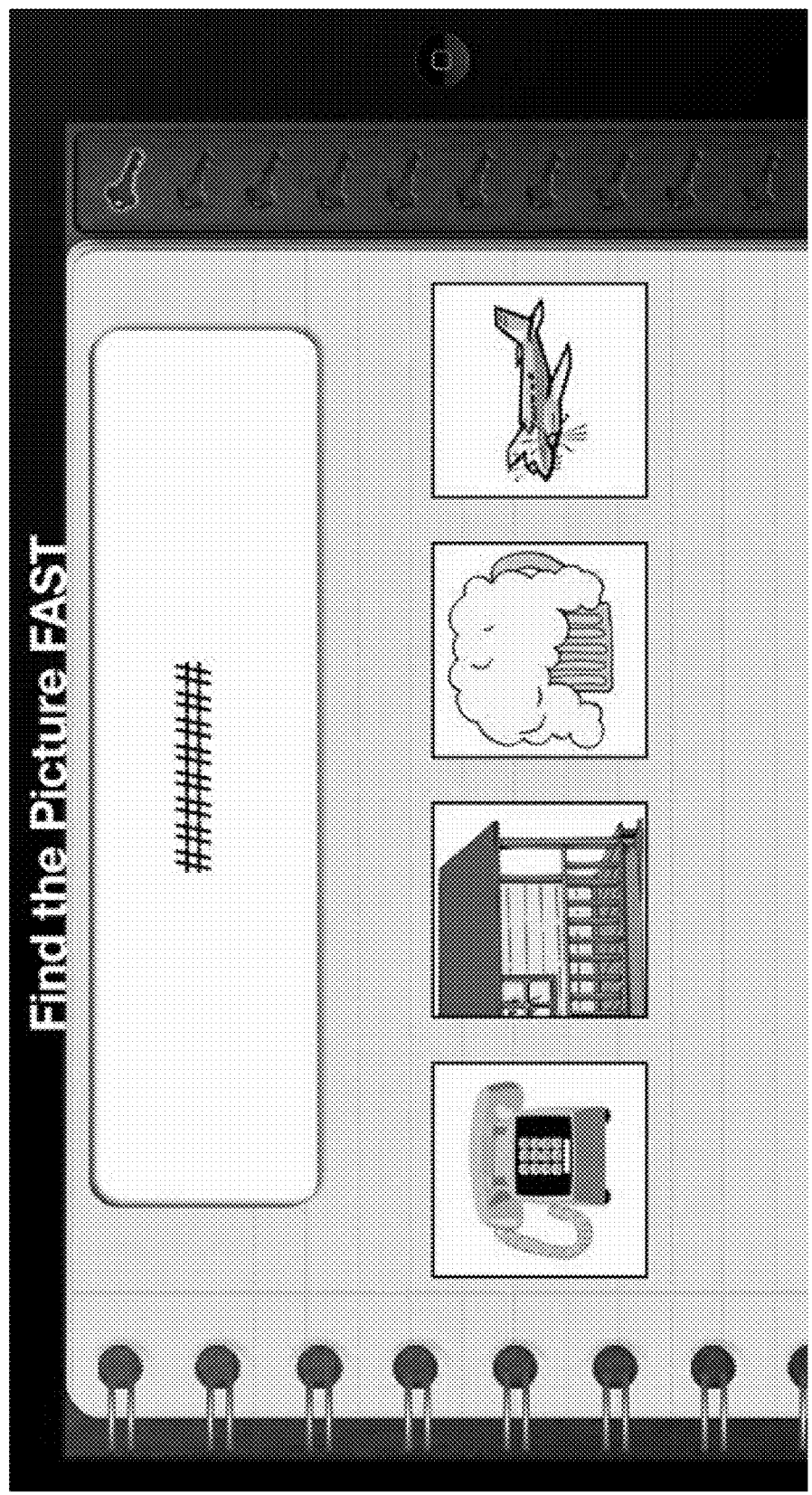
Figure 18L:
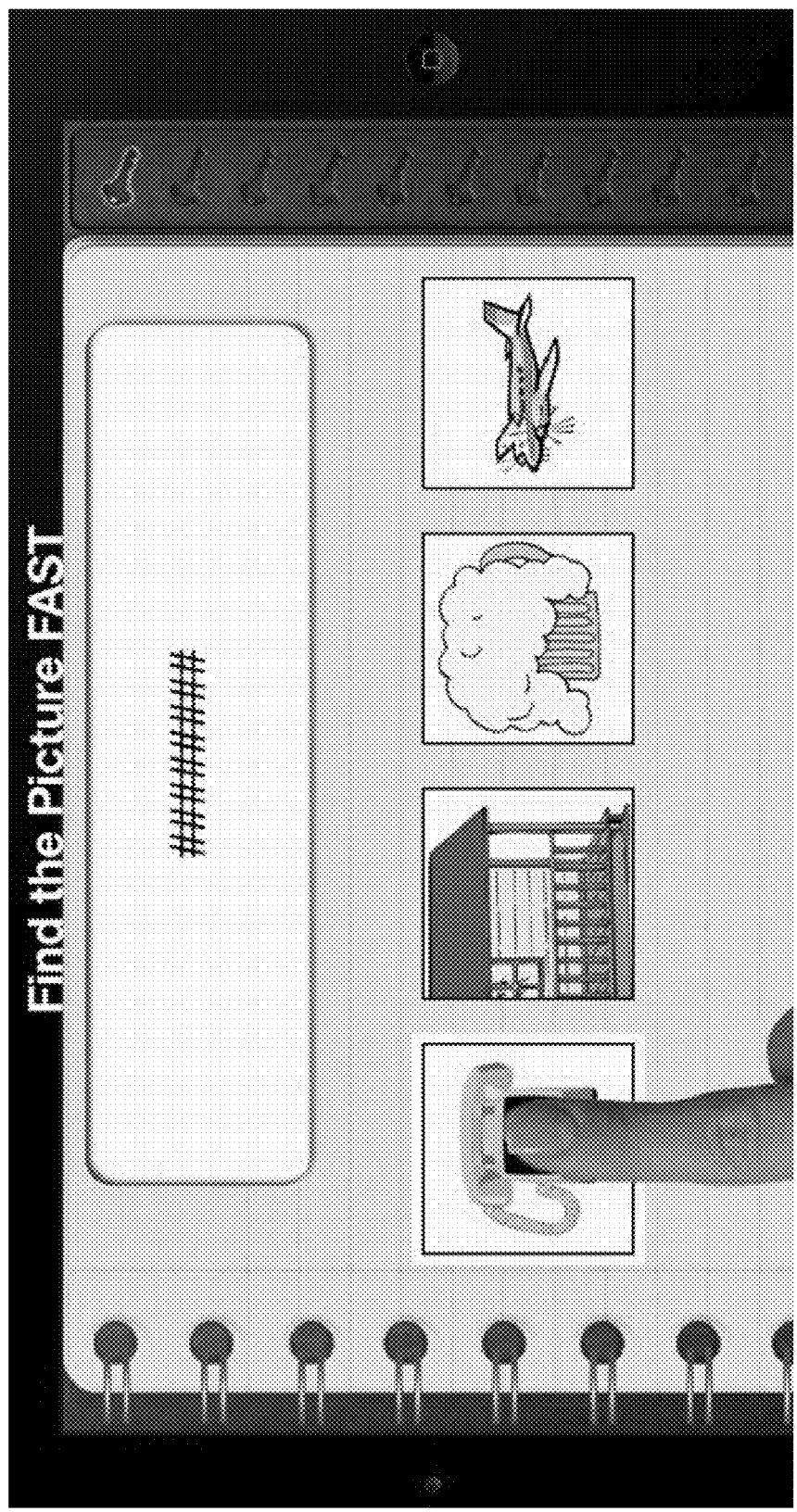

FIGS. 18I-L illustrate the task in "masking" mode. The program cycles to the next trial under "Picture matching". Four graphical pictures are displayed below a blank area. FIG. 18I. The target word "phone" is briefly displayed above the four choices. FIG. 18J. The word "phone" is then masked. FIG. 18K. The student is asked to select the picture that best matches the briefly displayed word, and does so (in this embodiment which has a touch-screen display), by pushing one of the pictures. FIG. 18L.

Figure 18M:
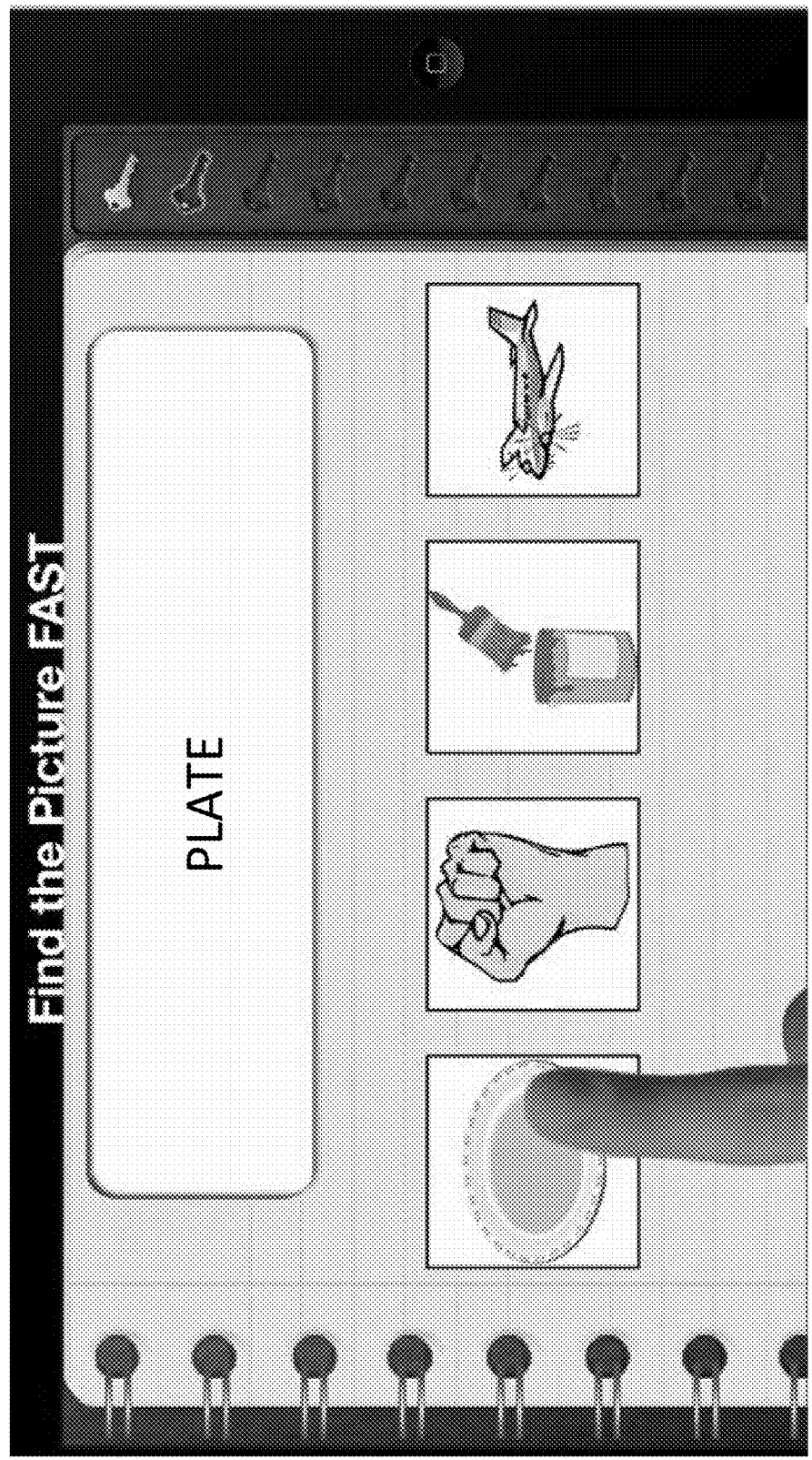

FIG. 18M shows another unmasked example of this task (for the word "plate"). In these examples, the selection might be timed. But alternatively, as discussed in Specific Example 1, the masked trial may not time the response and give as much time to the student as they want (or give a pre-determined, but relatively long time to select).

FIGS. 19A-D—Rhyme Identification

The FIG. 19A task displays an unmasked word (here "hound") and seeks a student response of a rhyming word from plural possible answers. In unmasked mode, the student can see the word "hound" displayed all the time he/she contemplates a selected answer (the correct answer being "found"). However, the answer may or may not be timed.

Figure 19B:
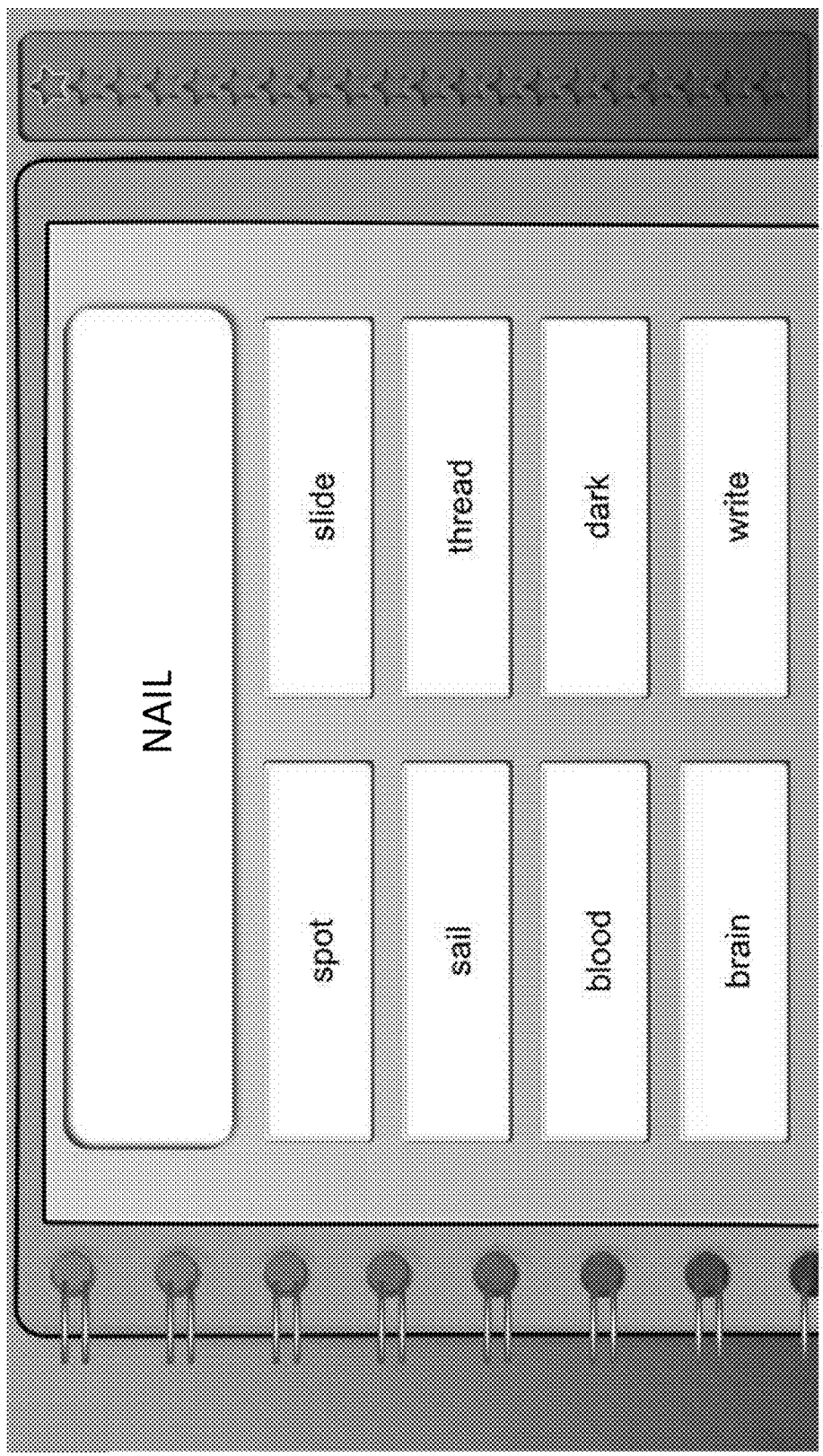
Figure 19C:
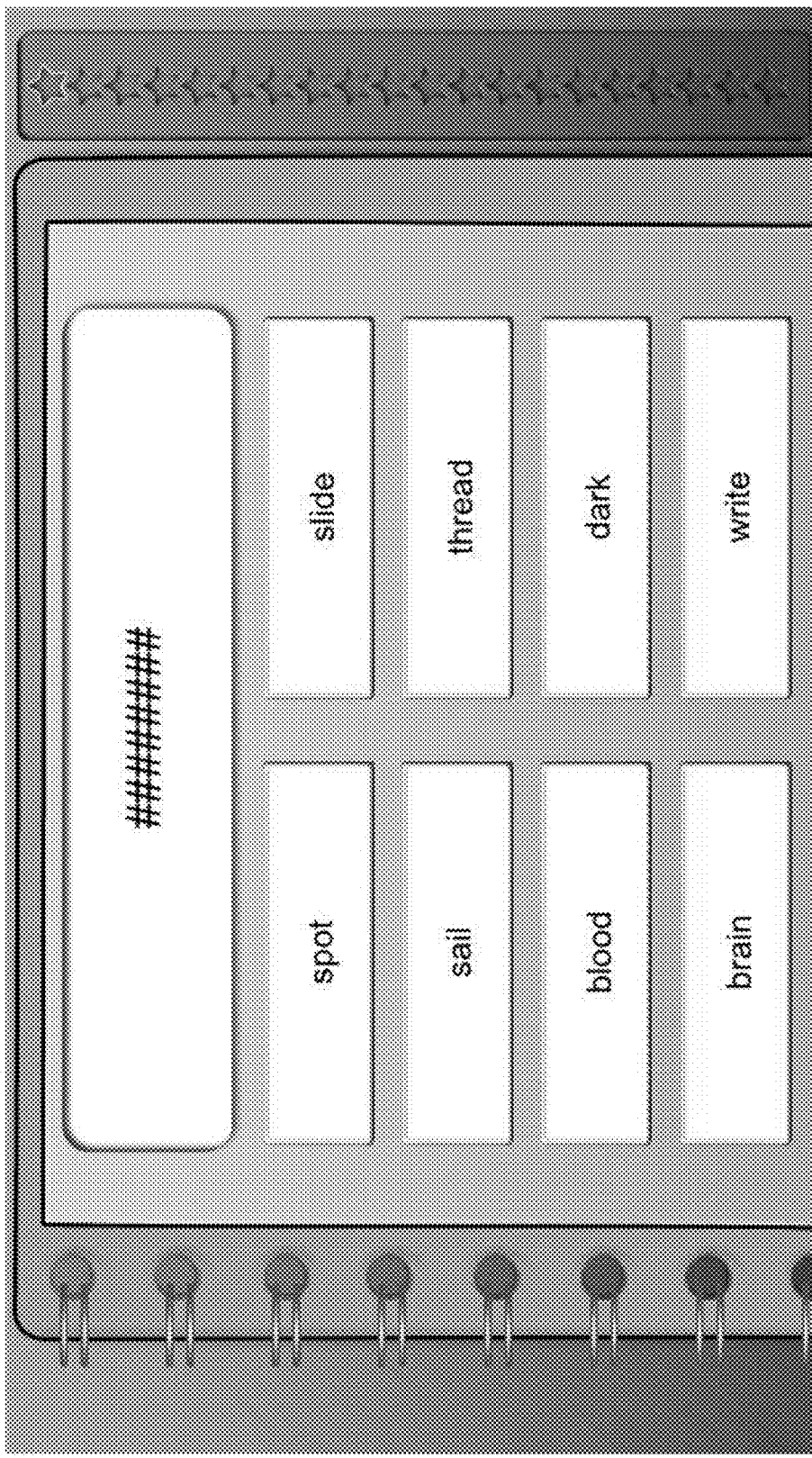

FIGS. 19B and C show a masking task. In masked mode, the word "NAIL" is briefly displayed (FIG. 19B), and then obscured (FIG. 19C) (e.g. by # signs). The correct answer being "sail"). The answer may or may not be timed. In one example, there would not be a timing of the response.

FIG. 19A gives one example of the "Rhyme Identification" task of Table 3. The student must read the target word and find a word that rhymes with the target. FIG. 19B shows how backward masking would work as an additional or alternative task for the word of FIG. 19A.

Figure 20:
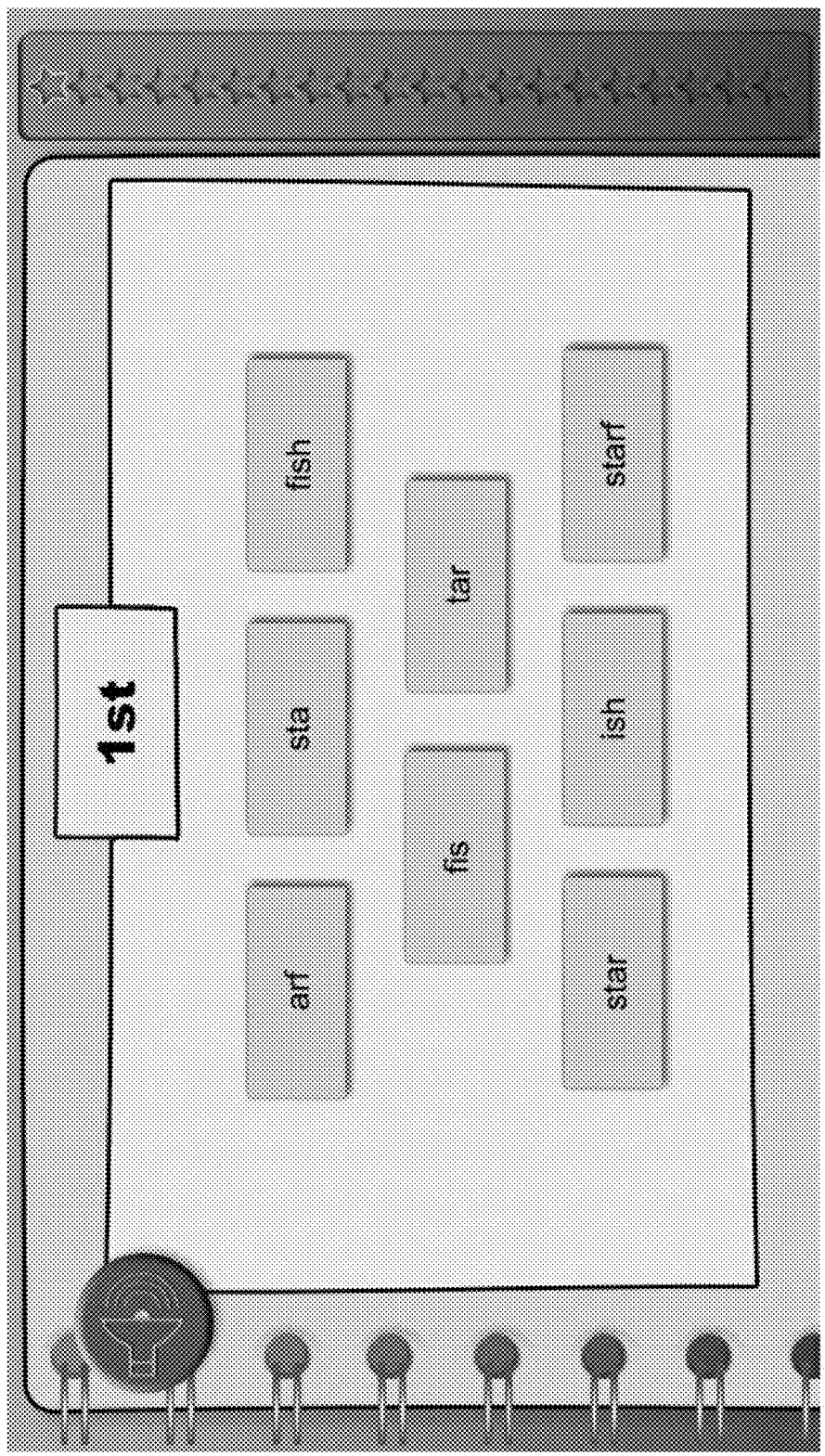

FIG. 20—Syllable ID: Auditory

This example illustrates the "Syllable ID: Auditory" task of Table 3.

Figure 21:
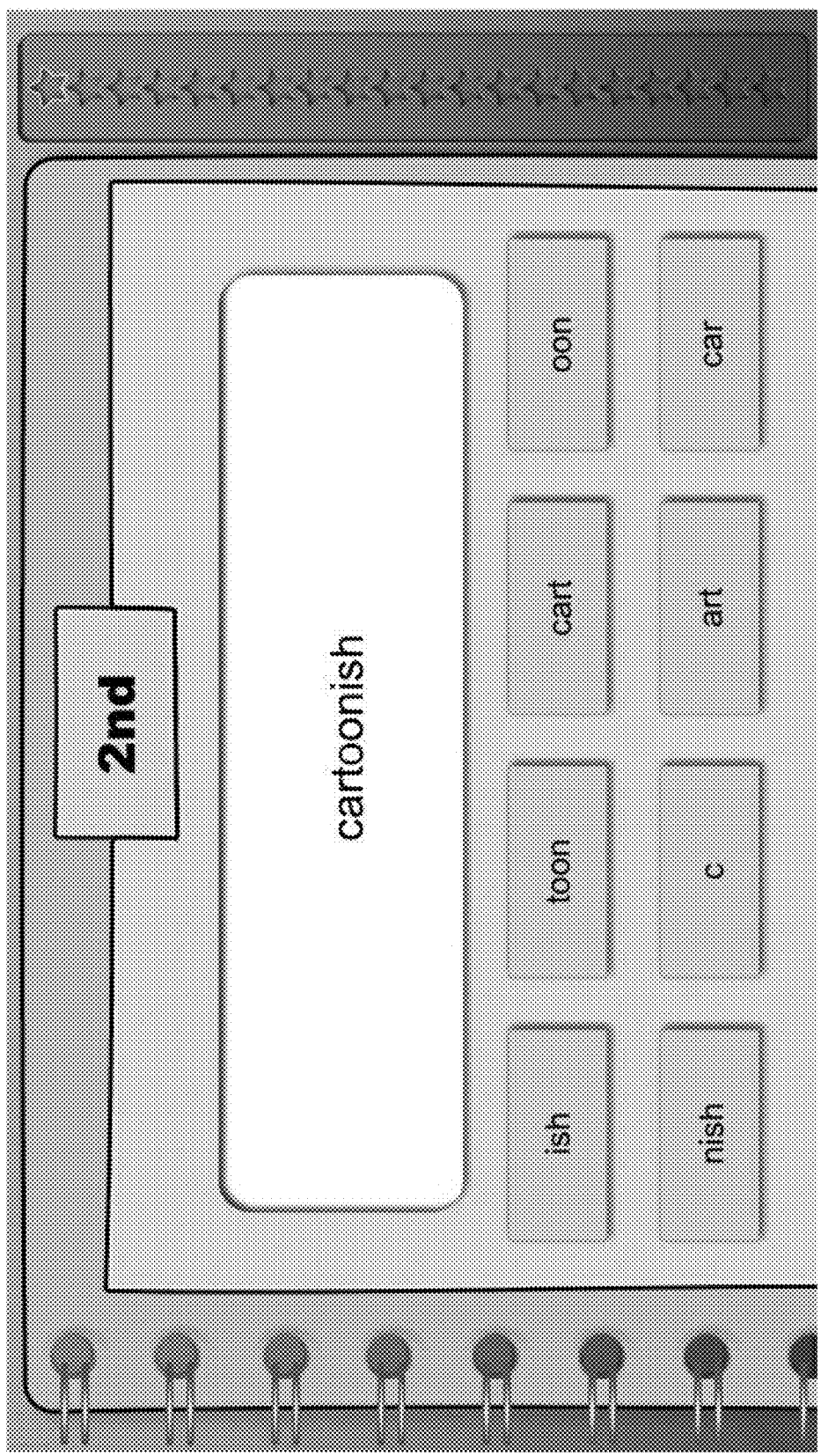

FIG. 21—Syllable ID: Visual

This example illustrates the "Syllable ID: Visual" task of Table 3.

Figure 22:
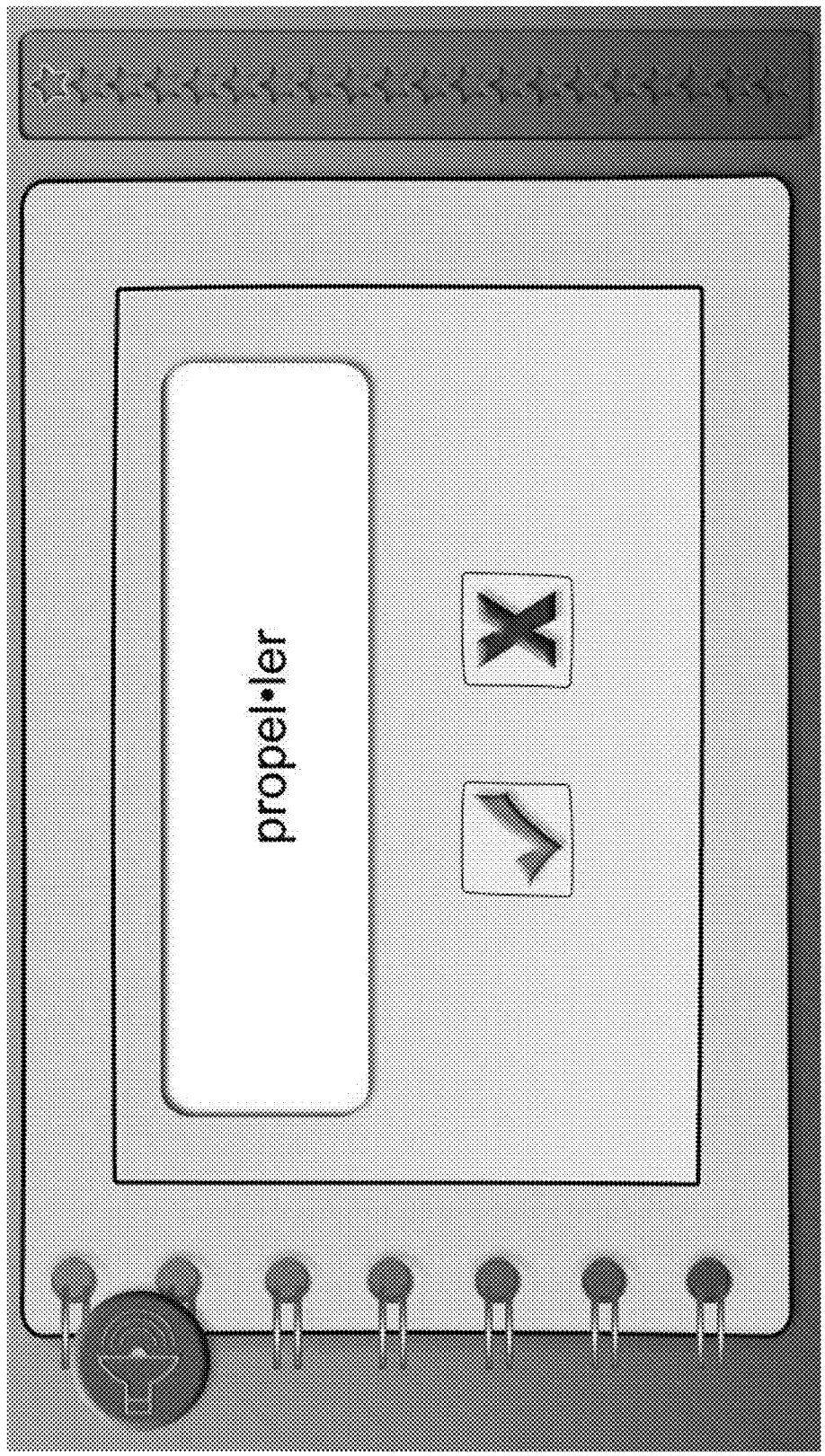

FIG. 22—Syllabification Verification

This example illustrates the "Syllabification verification" task of Table 3.

Figure 23:
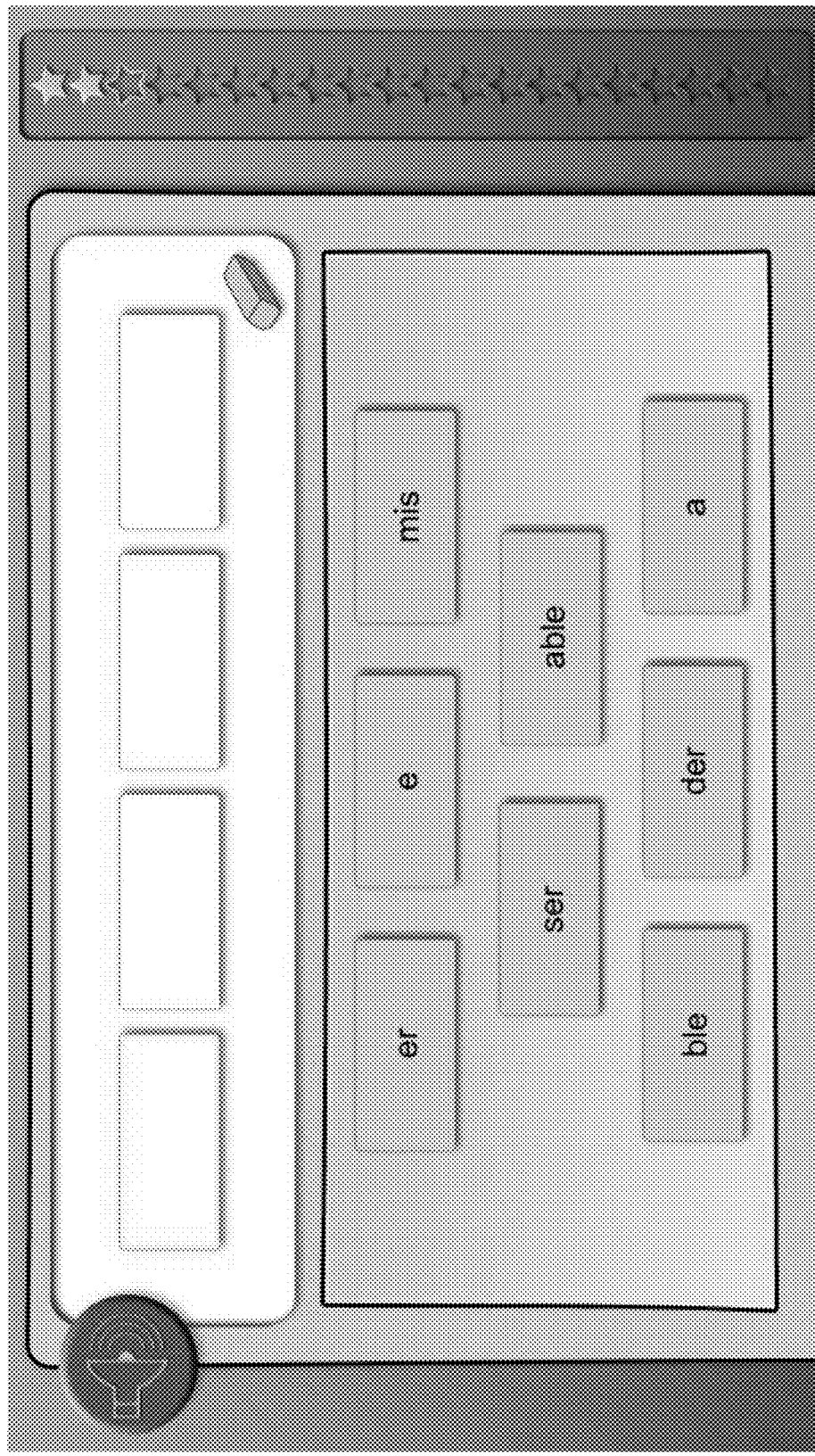

FIG. 23—Syllable Order

This example illustrates the "Syllable order" task of Table 3.

Figure 24:
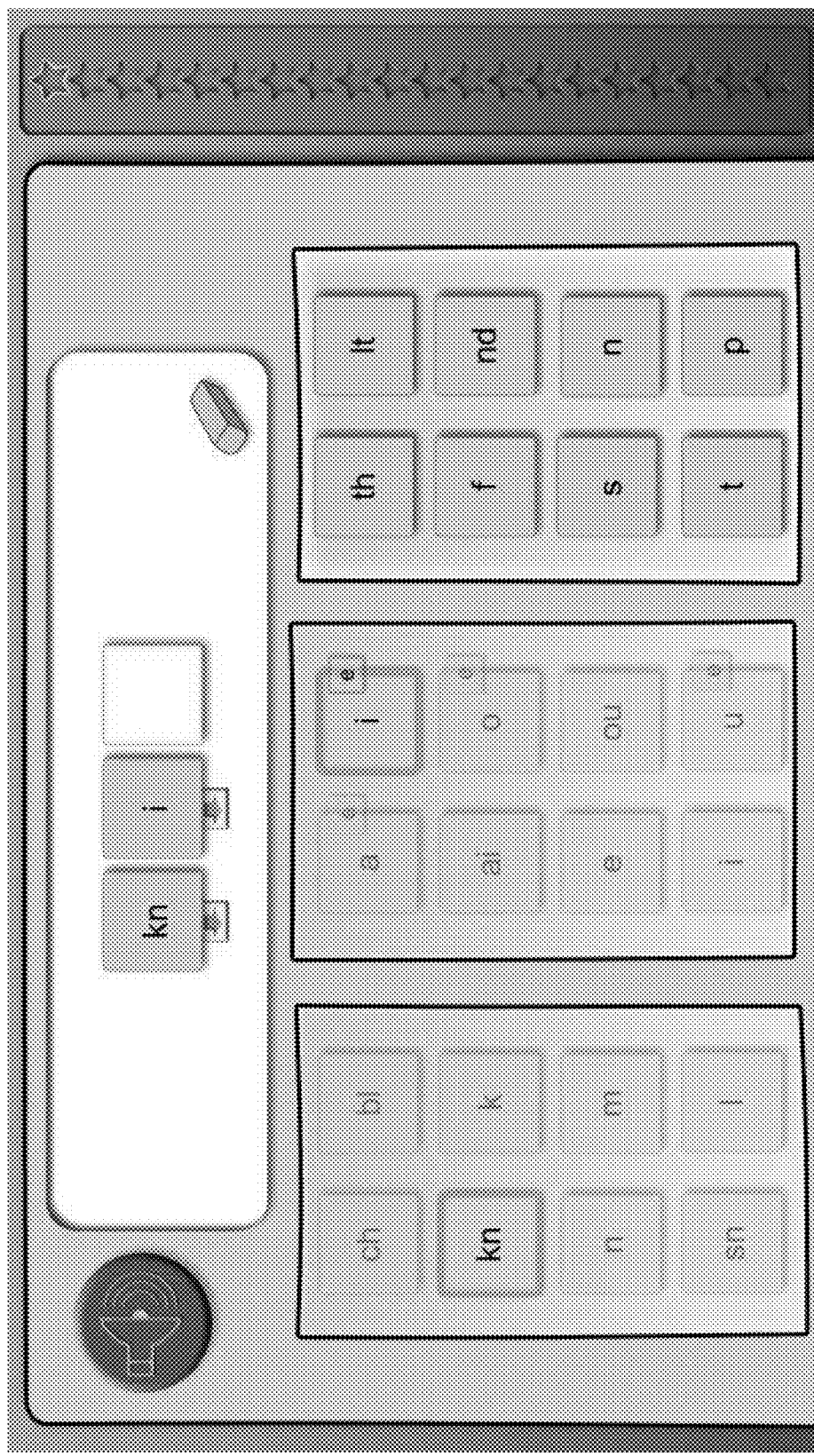

FIG. 24—Spell the Word

This example illustrates the "Spell the word" task of Table 3.

Again, the designer of the system can utilize libraries of pre-created and pre-selected recordings of pronunciation, related-pictures or graphics, textual presentations from which the software can select and present to students. They can be used in a VPM regime to efficiently gather information about knowledge and skills of students relative to a rules-based system. Although described principally in the context of literacy, as mentioned, it can be applied in analogous ways to other rules-based systems.

Student Profiles

FIGS. 25A-H illustrate examples of how student profiles can be generated. As discussed above, the designer has pre-selected certain rules related to GPC that are desired to be assessed in students.

In iASK, knowledge regarding such rules as applied to vowels can be: Short vowels, long vowels, digraphs, exception, and R-controlled/Diphthongs. See, e.g., Table 2 supra, relating to classifications for iASK for Specific Example 1. See FIG. 25A, which is an example of the categories or classifications of knowledge of the student relative to GPC that are checked by iASK. This is one aspect of assessment of the student.

Figure 25A:
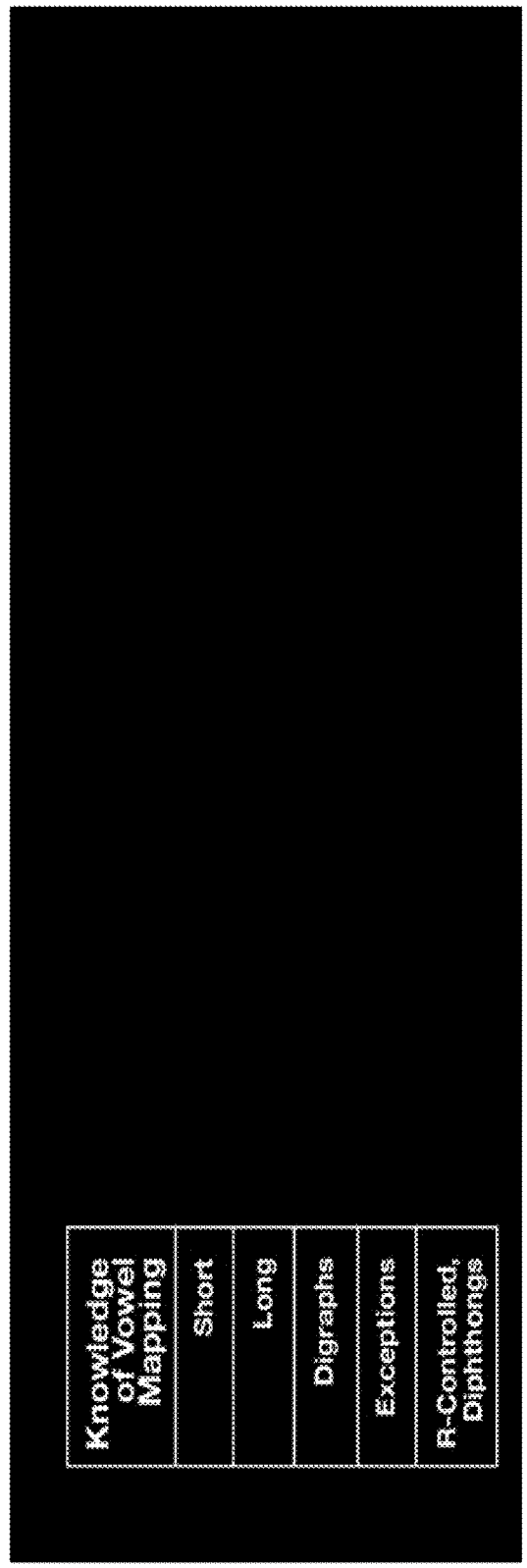
Figure 25B:
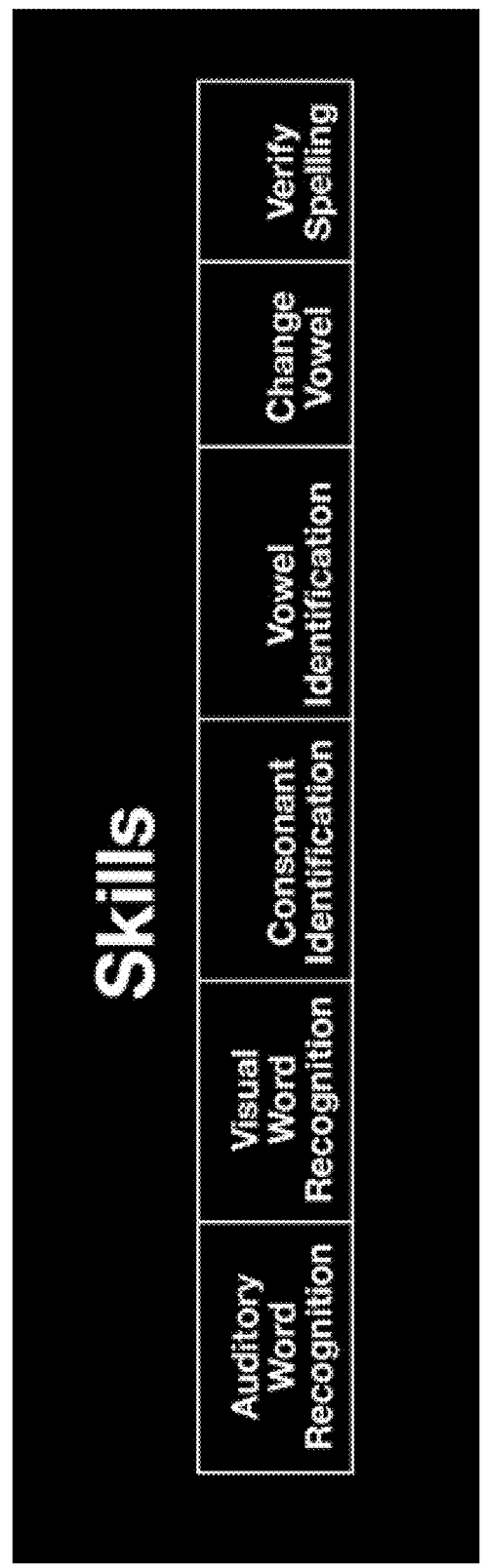

In iASK, skills regarding the rules of FIG. 25A could be as shown in FIG. 25B. FIG. 25B is an example of a set of specific skills correlated to GPC.

FIG. 25C shows how the skills factors (horizontal axis) informed from student responses to VPM-inspired tasks could be crossed with the knowledge factors (vertical axis). Thus, checking for knowledge, and then assessing this knowledge in many skills, can be articulated, in one example, in the two-dimensional chart or matrix of FIG. 25C (using the knowledge and skills of FIGS. 25A and B). An individualized profile for each student can be generated.

FIG. 25D shows one hypothetical individualized profile for a student once all trials or all tasks is completed and quantified. Checkmarks are used to indicate good performance. Blanks indicate possible gaps in knowledge or skills.

Figure 25E:
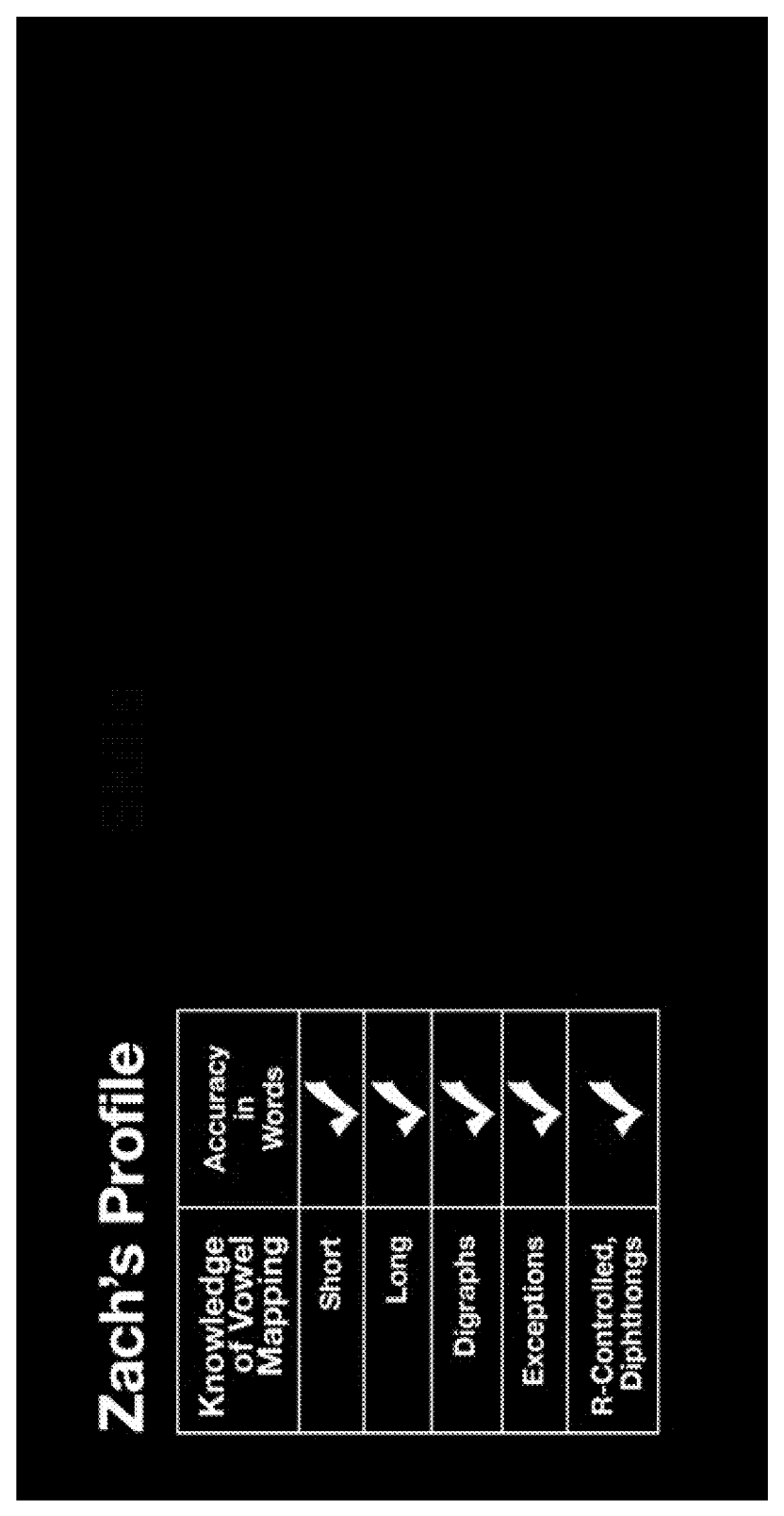
Figure 25F:
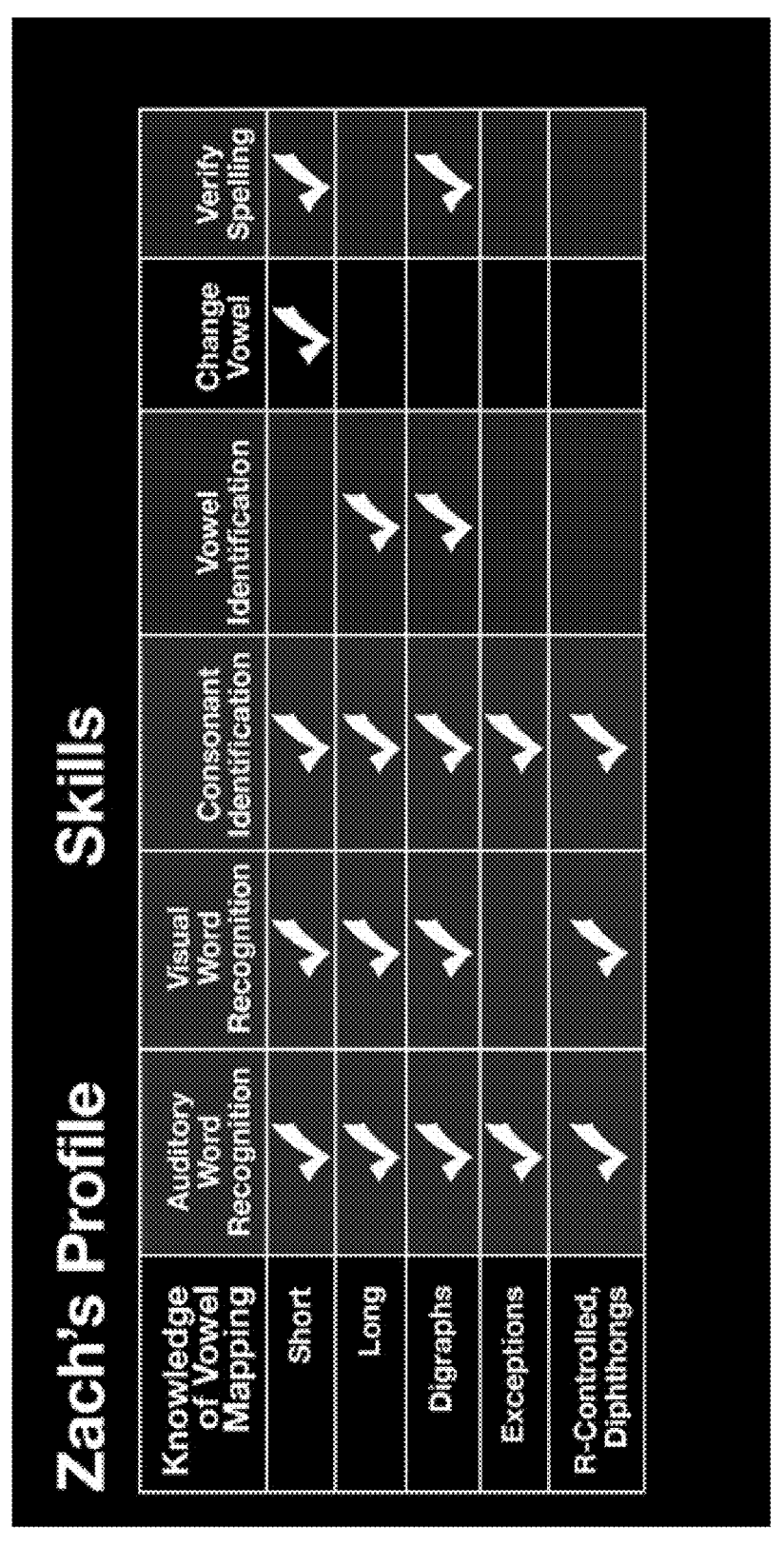

FIGS. 25E and F illustrate another hypothetical profile built from using the iASK tasks. Hypothetical student "Zach" showed good knowledge through the tasks of the rules relating to vowels. FIG. 25E. But looking only at performance relative to the skill "accuracy in words" is not the whole picture. FIG. 25F. A complete evaluation across other skills (e.g. auditory word recognition, visual word recognition, consonant identification, vowel identification, change vowel, and verify spelling) (see FIG. 25F) indicates potential gaps for this student. A teacher or other entity could use this to address those gaps. The profile gives assessment at a quite specific level. It shows that despite good knowledge of the vowels, Zach cannot apply his knowledge in several of the skills (no-checked boxes).

Figure 25H:
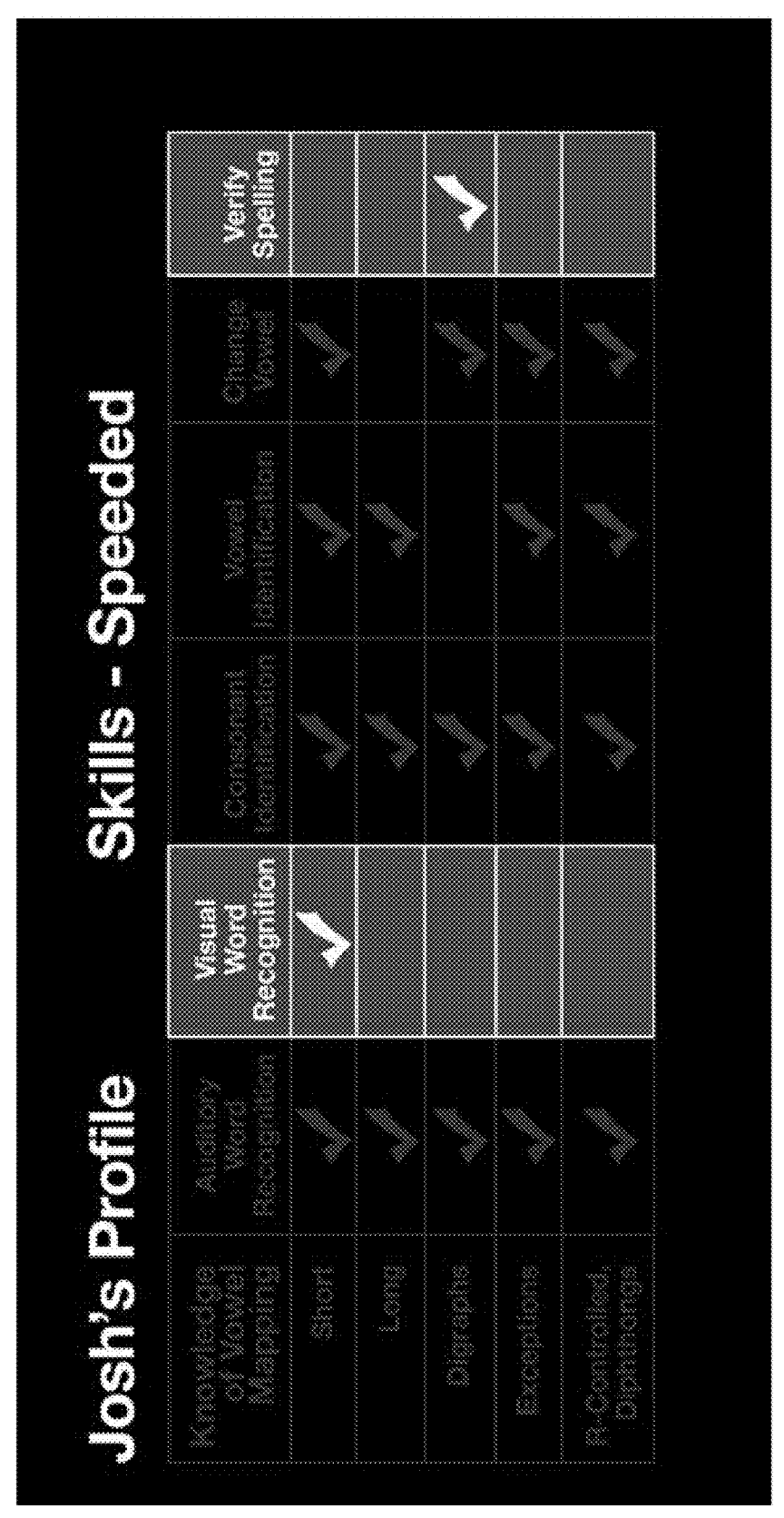

Hypothetical student "Josh" shows a profile that has fewer indicated gaps than "Zach". But it still can inform a teacher or the like of areas that can be focused upon. See FIG. 25G. In contrast to Zach, Josh has good knowledge of the skills but his difficulties with timed tasks (FIG. 25H) reveals he cannot apply his knowledge of skills sufficiently. FIG. 25H shows knowledge and skills relative to only a certain set of tasks (here "speeded"). This can supplement, indicate or corroborate a different set of "gaps" in knowledge or skills.

Thus, it can be seen that iASK has flexibility and capabilities to probe deep into a student's specific needs and help inform what remediation is indicated. The type and level of information in each individualized profile specifics the reasons a student lacks automaticity.

This provides teachers a new analytical framework to plan targeted intervention. The system efficiently and effectively promotes automaticity transfer from less complex to more complex words. The system can first distinguish what the student knows and what he/she doesn't know. It then applies skills through practice and varied experiences. The result is identification of gaps in individualized profiles. The trials presented to the student are "game-like", can go quickly, and are controlled in presentation and time. The resulting profiles are, in a sense, a constellation of knowledge and skills for each student. It can therefore be seen that the exemplary embodiments meet at least all of the objects of the invention.

REFERENCES (EACH INCORPORATED BY REFERENCE HEREIN)

Alonzo, J., & Tindal, G. (2009). Alternate Form and Test-Retest Reliability of easyCBM Reading Measures. Eugene, Oreg.: Behavioral Research and Teaching, University of Oregon.

Apfelbaum, K. S., Hazeltine, R. E., & McMurray, B. (2013). Statistical learning in reading: Variability in irrelevant letters helps children learn phonics skills. *Developmental Psychology,* 49(7), 1348-1365.

Archer, A. L., Gleason, M. M., & Vachon, V. L. (2003). Decoding and fluency: Foundation skills for struggling older readers. *Learning Disability Quarterly,* 26, 89-101.

Bhattacharya, A., & Ehri, L. C. (2004). Graphosyllabic Analysis Helps Adolescent Struggling Readers Read and Spell Words. *Journal of Learning Disabilities,* 37(4), 331-348

Bion, R. A. H., Borovsky, A., & Fernald, A. (2013). Fast mapping, slow learning: Disambiguation of novel word-object mappings in relation to vocabulary learning at 18, 24, and 30 months. *Cognition,* 126(1), 39-53.

Blomberg, T. G., Bales, W. D., Mann, K., Piquero, A. R., & Berk, R. A. (2011). Incarceration, education and transition from delinquency. *Journal of Criminal Justice,* 39, 355-365.

Burns, M. K. (2004). Using curriculum-based assessment in consultation: A review of three levels of research. *Journal of Educational and Psychological Consultation,* 15, 63-78.

Calhoon, M. B., & Petscher, Y. (2013). Individual and group sensitivity to remedial reading program design: examining reading gains across three middle school reading projects. *Reading & Writing,* 26(4), 565-592.

Carey, M. A., & Smith, M. W. (1994). Capturing the group effect in focus groups: A special concern in analysis. *Qualitative Health Research,* 4(1), 123-127.

Cirino, P. T., Romain, M. A., Barth, A. E., Tolar, T. D., Fletcher, J. M., & Vaughn, S. (2013). Reading skill components and impairments in middle school struggling readers. *Reading and Writing,* 26(7), 1059-1086.

Corrin, W., Somers, M. A., Kemple, J., Nelson, E., & Sepanik, S. (2008). The enhanced reading opportunities study: Findings from the second year of implementation. Washington, D.C.: National Center for Education Evaluation and Regional Assistance, Institute of Education Sciences, U.S. Department of Education.

Cummings, K. D., Biancarosa, G., Schaper, A., & Reed, D. K. (2014). Examiner error in curriculum-based measurement of oral reading. *Journal of School Psychology,* 52(4), 361-375.

De Graaf, S., Bosman, A., Hasselman, F., & Verhoeven, L. (2009). Benefits of Systematic Phonics Instruction. *Scientific Studies of Reading,* 13(4), 318-333.

Dunn, L. M., & Dunn, L. M. (1997). *Examiner's manual for the PPVT-III Peabody Picture Vocabulary Test* (3rd ed.). Circle Pines, Minn.: American Guidance Service.

Edmonds, M. S., & Briggs, K. L. (2003). The Instructional Content Emphasis Instrument: Observations of reading Instruction. In S. Vaughn & K. L. Briggs (Eds.), Reading in the classroom: Systems for the observation of teaching and learning (pp. 31-52). Baltimore: Brookes.

Edmonds, M. S., Vaughn, S., Wexler, J., Reutebuch, C. K., Cable, A., K., T. K., & Schnakenberg, J. W. (2009). A synthesis of reading interventions and effects on reading comprehension outcomes for older struggling readers. *Review of Educational Research, 79,* 262-300.

Edwards, K. (2008). Examining the impact of phonics intervention on secondary students' reading improvement. *Educational Action Research,* 16(4), 545-555.

Ehri, L. C., Nunes, S. R., Stahl, S., & Willows, D. (2001). Systematic Phonics Instruction Helps Students Learn to Read: Evidence from the National Reading Panel's Meta-Analysis. *Review of Educational Research,* 71(3), 393-447.

Fall, A. M., & Roberts, G. (2012). High school dropouts: Interactions between social context, self-perceptions, school engagement, and student dropout. *Journal of Adolescence, 35,* 787-798.

Fletcher, J. M., & Vaughn, S. (2009). Response to intervention: Preventing and remediating academic deficits. *Child Development Perspectives, 3,* 30-37.

Fowler, C. A., Liberman, I. Y., & Shankweiler, D. P. (1977). On interpreting the error pattern in beginning reading. *Language and Speech, 20,* 162-173.

Frank, M. C., Goodman, N. D., & Tenenbaum, J. (2009). Using speakers' referential intentions to model early cross-situational word learning. *Psychological Science, 20,* 578-585.

Fuchs, D., Fuchs, L. S., & Compton, D. L. (2004). Identifying reading disabilities by responsiveness-to-instruction: Specifying measures and criteria. *Learning Disabilities Quarterly, 27,* 216-227.

Gómez, R. (2002). Variability and detection of invariant structure. *Psychological Science, 13,* 431-436.

Gravois, T. A., & Gickling, E. E. (2008). Best practices in curriculum-based assessment. In A. Thomas & J. Grimes (Eds.), *Best practices in school psychology V* (pp. 503-518). Bethesda, Md.: National Association of School Psychologists.

Gupta, P., & Tisdale, J. (2009). Does phonological short-term memory causally determine vocabulary learning? Toward a computational resolution of the debate. *Journal of Memory and Language,* 61(4), 481-502.

Hamilton, L., Halverson, R., Jackson, S., Mandinach, E., Supovitz, J., & Wayman, J. (2009). Using student achievement data to support instructional decision making Washington, D.C.: National Center for Education Evaluation and Regional Assistance, Institute of Education Sciences, U.S. Department of Education.

Hammill, D. D., Wiederholt, J. L., & Allen, E. A. (2006). *Test of silent contextual reading fluency.* Austin, Tex.: Pro-Ed.

Harm, M. W., & Seidenberg, M. S. (1999). Phonology, Reading Acquisition, and Dyslexia: Insights from Connectionist Models. *Psychological Review,* 106(3), 491-528.

Harrell, F. E. (2001). *Regression modeling strategies: with applications to linear models, logistic regression, and survival analysis*: Springer.

Hazeltine, R. E., & McMurray, B. (2013). Common Principles in Reading and Skill Learning. University of Iowa: National Science Foundation: Perception, Action & Cognition Program.

Hock, M. F., Brasseur, I. F., Deshler, D. D., Catts, H. W., Marques, J., Mark, C. A., & Stribling, J. (2009). What is the reading component skill profile of adolescent struggling readers in urban schools? *Learning Disability Quarterly,* 32(1), 21-38.

Huet, M., Camachon, C., Gray, R., Jacobs, D. M., Missenard, O., & Montagne, G. (2011). The Education of Attention as Explanation of Variability of Practice Effects: Learning the Final Approach Phase in a Flight Simulator. *Journal of Experimental Psychology: Human Perception and Performance,* 37(6), 1841-1854.

Jeynes, W. H. (2008). A meta-analysis of the relationship between phonics instruction and minority elementary school students' academic achievement. *Education and Urban Society,* 40(2), 151-166.

Kamil, M. L., Borman, G. D., Dole, J., Kral, C. C., Salinger, T., & Torgesen, J. (2008). Improving adolescent literacy: Effective classroom and intervention practices: A Practice Guide. Washington, D.C.: National Center for Education Evaluation and Regional Assistance, Institute of Education Sciences, U.S. Department of Education.

Kidd, P. S., & Parshall, M. B. (2000). Getting the focus and the group: Enhancing analytical rigor in focus group research. *Qualitative Health Research, 10,* 293-308.

Kitzinger, J. (1995). Qualitative research: Introducing focus groups. *British Medical Journal, 311,* 299-302.

Lang, L., Torgesen, J., Vogel, W., Carol, C., Lefiky, E., & Petscher, Y. (2009). Exploring the relative effectiveness of reading interventions for high school students. *Journal of Research on Educational Effectiveness, 2,* 149-175.

Lindamood, P. C. (2004). *Lindamood Auditory Conceptualization Test: Examiners Manual*: Pro-Ed.

Lively, S. E., Logan, J. S., & Pisoni, D. B. (1993). Training Japanese listeners to identify English /r/ and /l/ II: The role of phonetic environment and talker variability in learning new perceptual categories. *Journal of the Acoustical Society of America, 94,* 1242-1255.

Loe, S. A., Kadlubek, R. M., & Marks, W. J. (2007). Administration and scoring errors on the WISC-IV among graduate student examiners. *Journal of Psychoeducational Assessment, 25,* 237-247.

MacGinitie, W. H., MacGinitie, R. K., Maria, K., Dreyer, L. G., & Hughes, K. E. (2000). *Gates-MacGinitie Reading Tests® (GMRT®) Fourth Edition* Itasca, Ill.: Riverside Publishing.

Magill, R. A., & Hall, K. G. (1990). A review of the contextual interference effect in motor skill acquisition. *Human Movement Science, 9,* 241-289.

McCandliss, B., Beck, I., Sandak, R., & Perfetti, C. (2003). Focusing Attention on Decoding for Children With Poor Reading Skills: Design and Preliminary Tests of the Word Building Intervention. *Scientific Studies of Reading,* 7(1), 75-104.

McMurray, B., Brown, C., & Zimmermann, J. (2014). Preliminary Results on the Access Code Decoding Intervention, Revised. Iowa City, Iowa: Foundations in Learning, Inc.

McMurray, B., & Hazeltine, R. E. (2010). Scaling learning theory to multiple pathways: Early reading as a model system. University of Iowa: National Science Foundation: Perception, Action & Cognition Program.

McMurray, B., Horst, J. S., & Samuelson, L. (2012). Word learning emerges from the interaction of online referent selection and slow associative learning. *Psychological Review,* 119(4), 831-877.

McMurray, B., Samelson, V. S., Lee, S. H., & Tomblin, J. B. (2010). Individual differences in online spoken word recognition: Implications for SLI. *Cognitive Psychology,* 60(1), 1-39.

McMurray, B., Zhao, L., Kucker, S., & Samuelson, L. K. (2013). Probing the limits of associative learning: generalization and the statistics of words and referents. In L. Gogate & G. Hollich (Eds.), Theoretical and Computational Models of Word Learning: Trends in Psychology and Artificial Intelligence (pp. 49-80). Hershey, Pa.: IGI Global.

Näslund, J. (1999). Phonemic and graphemic consistency: Effects on decoding for German and American children. *Reading and Writing*, 11(2), 129-152.

National Center for Education Statistics [NCES]. (2013). The nation's report card: A first look: 2013 mathematics and reading. Washington, D.C.: National Center for Education Statistics, Institute of Education Sciences, U.S. Department of Education.

Perfetti, C. A., Bell, L. C., & Delaney, S. M. (1988). Automatic (prelexical) phonetic activation in silent word reading: Evidence from backward masking. *Journal of Memory and Language*, 27(1), 59-70.

Ramos, E., Alfonso, V. C., & Schermerhorn, S. M. (2009). Graduate students' administration and scoring errors on the Woodcock-Johnson III tests of cognitive abilities. *Psychology in the Schools*, 46, 650-657.

Reed, D. K. (in press). Data-based decision making for middle school reading instruction: An exploratory study. *Research in Middle Level Education*.

Reed, D. K., & Vaughn, S. (2010). Reading interventions for older students. In T. A. Glover & S. Vaughn (Eds.), *The Promise of Response to Intervention: Evaluating Current Science and Practice* (pp. 143-186). New York., N.Y.: Guilford Press.

Reed, D. K., & Wexler, J. (2014). Our teachers ... don't give us no help, no nothin': Juvenile offenders' perceptions of academic support. *Residential Treatment for Children and Youth*, 31, 188-219.

Reed, D. K., Wexler, J., & Vaughn, S. (2012). *RTI for reading at the secondary level: Recommended literacy practices and remaining questions*. New York: Guildford Press.

Seidenberg, M. S., & McClelland, J. L. (1989). A distributed developmental model of visual word recognition and naming. *Psychological Review*, 96, 523-568.

Shankweiler, D. P., & Liberman, I. Y. (1972). Misreading: A search for causes. In J. F. Kavanagh & I. G. Mattingley (Eds.), *Language by ear and by eye: The relationships between speech and reading* (pp. 293-317). Cambridge, Mass.: MIT Press.

Shea, J., & Morgan, R. L. (1979). Contextual interference effects on the acquisition, retention, and transfer of a motor skill. *Journal of Experimental Psychology: Human Learning and Memory*, 5, 179-187.

Shinn, M., & Shinn, M. (2002). AIMSweb training workbook: Administration and scoring of reading curriculum-based measurement (R-CBM) for use in general outcome measurement. Eden Prairie, Minn.: Edformation, Inc. Available at: www.aimsweb.com/uploads/files/adminandscoringrcbm09292005.pdf.

VanDerHeyden, A. M., Witt, J. C., & Gilbertson, D. A. (2007). Multi-Year Evaluation of the Effects of a Response to Intervention (RTI) Model on Identification of Children for Special Education. *Journal of School Psychology*, 45, 225-256.

Vaughn, S., Wanzek, J., Wexler, J., Barth, A., Cirino, P. T., Fletcher, J., . . . Francis, D. (2010). The relative effects of group size on reading progress of older students with reading difficulties. *Reading and Writing*, 23(8), 931-956.

Vaughn, S., Wexler, J., Roberts, G., Barth, A. A., Cirino, P. T., Romain, M. A., . . . Denton, C. A. (2011). Effects of individualized and standardized interventions on middle school students with reading disabilities. *Exceptional Children*, 77(4), 391-407.

Wagner, M., Kutash, K., Duchnowski, A. J., Epstein, M. H., & Sumi, W. C. (2005). The children and youth we serve: A national picture of the characteristics of students with emotional disturbance receiving special education services. . *Journal of Emotional and Behavioral Disorders*, 13, 79-96.

Watts, M., & Ebbutt, D. (1987). More than the sum of the parts: Research methods in group interviewing. *British Educational Research Journal*, 13, 25-34.

Wexler, J., Reed, D. K., Barton, E. E., Mitchell, M., & Clancy, E. (submitted). The effects of a supplemental peer-mediated reading intervention on the informational text comprehension of incarcerated adolescents.

Wexler, J., Reed, D. K., & Sturges, K. (in press). Reading practices in the juvenile correctional facility setting: Incarcerated adolescents speak out. *Exceptionality*.

Woodcock, R. W. (1987). *Woodcock Reading Mastery Tests—Revised/Normative Update*. Bloomington, Minn.: Pearson Assessments.

Wulf, G., & Shea, C. H. (2002). Principles derived from the study of simple skills do not generalize to complex skill learning. *Psychonomic Bulletin & Review*, 9, 185-211.

What is claimed is:

1. A method of assessing an individual's knowledge and skills related to a rules-based system having a large number of rules having regularities, the rules-based system comprising word recognition reading and literacy, the method comprising:
   a. selecting and storing in a database a subset of rules from the large number of literacy system rules designated as problematic for or relevant to deficiencies in knowledge and skills of the literacy system rules, the subset of rules comprising grapheme-phoneme-correspondence (GPC) rules;
   b. designating and storing in a database a limited set of classifications of regularities related to the GPC subset of selected rules, the classifications differing in GPC complexity and comprising at least two or more of:
      (1) GPC regularities related to single letter consonants;
      (2) GPC regularities related to short vowels;
      (3) GPC regularities related to long vowels;
      (4) GPC regularities related to dominant digraphs;
      (5) GPC regularities related to secondary digraphs;
      (6) GPC regularities related to diphthongs;
      (7) consonant digraphs;
      (8) long and short secondary digraphs;
   c. designing and storing in a database a limited set of tasks and correct responses to each task, each task comprising one or more of digital audio and digital graphics related to knowledge or skills for the set of classifications of regularities of and the GPC subset of selected rules, the set of tasks comprising:
      (1) filling in one or more blanks in words or syllables with a consonant or vowel;
      (2) selecting a correct word from a list of words;
      (3) spelling a word based on a prompt;
   d. automatically presenting to the individual via at least one of the digital audio and digital graphics on a digital display the set of tasks related to different classifications of the set of classifications with systematic variations to the individual, the presented tasks systematically varied on the display by;
      (1) type of presentation, including audio and/or graphic;
      (2) which of the classifications of regularities;
      (3) type of the task;
      (4) complexity of the task;

e. storing the individual's responses to each said task and for selected tasks automatically quantifying:
  (1) accuracy of the response relative to the correct response; and
  (2) speed of the response;
f. automatically comparing the stored responses and quantified accuracy and speed of responses in a plurality of ways comprising:
  (1) evaluating quantified accuracy of responses as a function of the GPC classification averaged across each task to access knowledge of the individual relative a GPC rule using different classifications of the GPC rules; and
  (2) evaluating quantified accuracy of responses as a function of each task across the GPC classifications to access skills of the individual relative a GPC rule;
g. producing and storing a digital individual profile of the individual's knowledge and skills related to the subset of rules based on the comparisons;
h. so that an automated assessment of intervention needs for the individual relative to both knowledge and skills for the rules-based system can be made from use of the databases and display; and
i. using the automated assessment of intervention to select further literacy skills and knowledge training.

2. The method of claim 1 wherein the comparisons further comprise one or more of:
  a. evaluating speed of responses;
  b. evaluating response when target is masked after a given duration;
  c. evaluating differences between correct and incorrect responses;
  d. evaluating responses based on complexity or difficulty of that task;
  e. generalizing a rule to more complex syllable structure or nonwords.

3. The method of claim 1 wherein:
  a. the set of classifications further comprises
    (1). "R-controlled vowels".

4. The method of claim 3 wherein the tasks are correlated to:
  a. GPC system knowledge;
  b. automaticity;
  c. syllable usage; and
  d. memory and seriation.

5. The method of claim 4 wherein:
  a. GPC system knowledge tasks comprise:
    i. Fill in the blank (vowel);
    ii. Fill in the blank (consonant);
    iii. Change the word/nonword;
    iv. Find the word/nonword;
  b. automaticity tasks comprise:
    i. Word verification;
    ii. Picture matching,
  c. syllable usage comprises:
    i. Syllable ID; auditory;
    ii. Syllable ID; Visual;
    iii. Syllabification verification;
  d. memory and seriation comprises:
    i. Syllable order; and
    ii. Spell the word.

6. The method of claim 1 wherein the tasks are varied according to Varied Practice Model (VPM).

7. The method of claim 1 applied to a plurality of different individuals via a software application over a wide area network.

8. The method of claim 7 wherein the software application is accessible via a website.

9. The method of claim 8 wherein each individual is assigned access to the website by a unique identifier.

10. A method of assessing an individual's knowledge and skills related to a rules-based system having a large number of rules having regularities comprising:
  a. selecting and storing in a database a subset of rules from the large number of system rules designated as problematic for or relevant to deficiencies in knowledge and skills of the system rules;
  b. designating and storing in a database a limited set of classifications of regularities related to the subset of selected rules;
  c. designing and storing in a database a set of tasks and correct responses to each task, each task comprising one or more of digital audio and digital graphics related to knowledge or skills for the set of classifications of regularities of and the subset of selected rules;
  d. automatically presenting to the individual via at least one of the digital audio and digital graphics on a digital display the set of tasks related to different classifications of the set of classifications with systematic variations to the individual, the presented tasks systematically varied on the display by;
    (1) type of presentation, including audio and/or graphic;
    (2) which of the classifications of regularities;
    (3) type of the task;
    (4) complexity of the task;
  e. storing the individual's responses to each said task and automatically quantifying based on accuracy relative to the correct response and at least one other parameter relevant to the rules-based system;
  f. automatically comparing the stored responses and the quantified accuracy and the at least one other parameter in a plurality of ways comprising:
    (1) evaluating quantified accuracy of responses as a function of the classification averaged across each task to access knowledge of the individual relative a rule of the rules-based system using different classifications of the rules; and
    (2) evaluating quantified accuracy of responses as a function of each task across the classifications to access skills of the individual relative a rule of the rules-based system;
  g. producing and storing a digital individual profile of the individual's knowledge and skills related to the subset of rules based on the comparisons;
  h. so that an automated assessment of intervention needs for the individual relative to both knowledge and skills for the rules-based system can be made for use of the databases and display.

11. The method of claim 10 wherein at least one other parameter is response:
  a. response time;
  b. untimed response to backward masking of variations of a word or syllable;
  c. timing of backward masking.

12. The method of claim 1 wherein the limited set of tasks comprises between three and thirty tasks.

13. The method of claim 1 wherein the limited set of classifications comprises between three and eight.

14. The method of claim 1 wherein the tasks further comprise:

backward masking of works comprising presenting a word or syllable for a limited initial time and then masking the word or syllable for a remainder of the time of the task.

15. The method of claim 14 wherein the limited initial time comprises a fraction of a second.

16. The method of claim 15 wherein masked tasks are further compared to unmasked tasks.

17. The method of claim 1 wherein the words comprise one of:
  a. real words; and
  b. non-words.

* * * * *